United States Patent [19]

Nunokawa et al.

[11] Patent Number: 5,980,133
[45] Date of Patent: Nov. 9, 1999

[54] TAPE PRINTING DEVICE

[75] Inventors: Masahiko Nunokawa, Suwa; Kenji Watanabe, Tokyo, both of Japan

[73] Assignees: Seiko Epson Corporation; King Jim Co., Ltd., both of Tokyo, Japan

[21] Appl. No.: 09/173,460

[22] Filed: Oct. 14, 1998

Related U.S. Application Data

[62] Division of application No. 08/132,572, Oct. 6, 1993, Pat. No. 5,651,619, and a division of application No. 08/900,374, Jul. 12, 1997, Pat. No. 5,868,504.

[30] Foreign Application Priority Data

| Oct. 6, 1992 | [JP] | Japan | 4-267164 |
| Oct. 6, 1992 | [JP] | Japan | 4-267167 |
| Oct. 6, 1992 | [JP] | Japan | 4-267169 |
| Nov. 4, 1992 | [JP] | Japan | 4-294990 |
| Nov. 5, 1992 | [JP] | Japan | 4-322792 |

[51] Int. Cl.$^6$ ................................................. B41J 5/30
[52] U.S. Cl. ................ 400/61; 400/3; 400/62; 400/88; 340/521; 340/825.36; 340/815.47; 340/815.49
[58] Field of Search ................ 400/3, 62, 83, 400/88, 61; 340/500, 501, 321, 825.06, 825.36, 815.47, 815.49

[56] References Cited

U.S. PATENT DOCUMENTS

| 3,654,609 | 4/1972 | Bluethman | 340/172.5 |
| 4,623,418 | 11/1986 | Gombrick et al. | 400/88 |

(List continued on next page.)

FOREIGN PATENT DOCUMENTS

| 0497352A2 | 1/1992 | European Pat. Off. . |
| 0506460A2 | 3/1992 | European Pat. Off. . |
| 0497352A3 | 5/1992 | European Pat. Off. . |
| 0506461A3 | 9/1992 | European Pat. Off. . |
| 0534794A2 | 3/1993 | European Pat. Off. . |
| 3838934A1 | 11/1988 | Germany . |
| 3916234A1 | 5/1989 | Germany . |
| 58-175671 | 10/1983 | Japan . |

(List continued on next page.)

OTHER PUBLICATIONS

Neues Aus Der Technik, Feb. 15, 1990, No. 1, Wurzburg, DE.

PC Magazine, Envelope Printers, Dec. 13, 1988, pp. 221–222.

IBM Technical Disclosure Bulletin, Method to Display Paper Edges With Pitch Changes in a Word Processor Dec. 1986, New York, p. 3147.

IBM Technical Disclosure Bulletin, Implicit Object Definition in a Multiple Data Editor, Mar. 1985, New York, p. 6002.

*Primary Examiner*—Eugene Eickholt
*Attorney, Agent, or Firm*—Beyer & Weaver, LLP

[57] ABSTRACT

The present invention provides an improved tape printing device for printing a desirable series of characters in a preferable balance on a tape through a simple operation. The tape printing device of the invention is used for printing text data in a plurality of lines along a width of the tape and in a plurality of 'paragraphs' along a predetermined length of the tape. The 'paragraph' in the tape printing device is different from a paragraph in a word processor and includes a fixed number of lines. Even when text data in a certain line of a paragraph is deleted, the certain line is kept in the paragraph as a vacant line. In another application, the tape printing device of the invention includes a predetermined menu for printing text data in a plurality of lines. The plurality of lines are arranged in a good balance when the user selects one of possible choices for each required information in the predetermined menu. Since these possible choices are automatically varied according to the width of the tape, the user can obtain a label with rows of characters printed in a preferable balance, without setting required information according to each tape width. The invention also provides a novel technique for displaying a distinct printing image and improves printing with a shade pattern and creation of a foreign character.

14 Claims, 56 Drawing Sheets

U.S. PATENT DOCUMENTS

| | | |
|---|---|---|
| 4,651,288 | 3/1987 | Zeising . |
| 4,710,866 | 12/1987 | Heath . |
| 4,749,289 | 6/1988 | Sugiura et al. . |
| 4,815,874 | 3/1989 | Richardson et al. . |
| 4,815,875 | 3/1989 | Richardson et al. . |
| 4,839,742 | 6/1989 | Nakatani et al. ............... 400/83 |
| 4,846,597 | 7/1989 | Bryant et al. ............... 400/83 |
| 4,917,514 | 4/1990 | Richardson et al. . |
| 4,924,411 | 5/1990 | Kashiwagi . |
| 4,966,476 | 10/1990 | Kuzuya et al. . |
| 4,983,058 | 1/1991 | Nagae . |
| 5,022,771 | 6/1991 | Paque . |
| 5,038,138 | 8/1991 | Akiyama et al. ............... 340/724 |
| 5,078,523 | 1/1992 | McGourty et al. . |
| 5,131,772 | 7/1992 | Yamaguchi . |
| 5,133,610 | 7/1992 | Sukigara ............... 400/83 |
| 5,179,648 | 1/1993 | Hauck ............... 395/145 |
| 5,222,818 | 6/1993 | Akiyama et al. ............... 400/61 |
| 5,223,939 | 6/1993 | Imaizumi et al. ............... 358/296 |
| 5,230,572 | 7/1993 | Hirono et al. ............... 400/3 |
| 5,253,334 | 10/1993 | Kimura et al. ............... 395/102 |
| 5,267,800 | 12/1993 | Petteruti et al. ............... 400/88 |
| 5,294,782 | 3/1994 | Kumar ............... 400/88 |
| 5,302,038 | 4/1994 | Hirono et al. ............... 400/615.2 |
| 5,314,256 | 5/1994 | Niwa . |
| 5,322,375 | 6/1994 | Niwa et al. . |
| 5,393,147 | 2/1995 | Ueno . |
| 5,399,030 | 3/1995 | Niwa et al. ............... 400/61 |
| 5,403,101 | 4/1995 | Nagase et al. ............... 400/3 |
| 5,435,659 | 7/1995 | Ueno ............... 400/615.2 |
| 5,462,372 | 10/1995 | Hirono ............... 400/615.2 |
| 5,492,420 | 2/1996 | Nunokawa et al. . |
| 5,494,360 | 2/1996 | Watanabe et al. ............... 400/83 |
| 5,651,619 | 7/1997 | Nunokawa et al. ............... 400/83 |

FOREIGN PATENT DOCUMENTS

| | | |
|---|---|---|
| 60-207951 | 10/1985 | Japan ............... G06F 15/20 |
| 62-24360 | 2/1987 | Japan ............... G06F 15/20 |
| 5-305748 | 4/1992 | Japan ............... B41J 21/00 |
| 4237097 | 8/1992 | Japan . |
| 4-294172 | 10/1992 | Japan . |
| 5-84975 | 6/1993 | Japan . |
| 5-177876 | 7/1993 | Japan . |
| 5-177901 | 7/1993 | Japan . |
| 5-177905 | 7/1993 | Japan ............... B41J 29/36 |
| 5-305738 | 11/1993 | Japan . |
| 5-305749 | 11/1993 | Japan . |
| 6-15909 | 1/1994 | Japan ............... B41J 21/00 |
| 6-40116 | 2/1994 | Japan ............... B41J 21/00 |
| 7-285242 | 10/1995 | Japan ............... B41J 3/36 |
| 2077970 | 2/1981 | United Kingdom . |

Fig.8

| Type Width | Depth of detection holes 18K | | |
|---|---|---|---|
| [mm] | 18Ka | 18Kb | 18Kc |
| 6 | S | D | D |
| 9 | D | S | D |
| 12 | S | S | D |
| 18 | D | D | S |
| 24 | S | D | S |

S:Shallow     D:Deep

Fig. 20A

| 1 | A B C D
| 2 |
| 3 |

| 1 |
| 2 | A B C D
| 3 |

| 1 |
| 2 |
| 3 | A B C D

Fig. 20B

| 1 | A B C D
| 2 | K
| 3 |

| 1 | A B C D
| 2 |
| 3 | K

| 1 |
| 2 | K
| 3 | A B C D

Fig. 21

| FONT NAME | DOT POINT | NOTES |
|---|---|---|
| P | 16 dot | STANDARD FONT |
| S | 24 dot | STANDARD FONT |
| M | 32 dot | STANDARD FONT |
| L | 48 dot | STANDARD FONT |
| XM | 32 dot × 64 dot | 32 dot × 2 |
| XL | 48 dot × 96 dot | 48 dot × 2 |
| G | 64 dot × 64 dot | 32 dot × 4 |
| U | 96 dot × 96 dot | 48 dot × 4 |
| XG | 64 dot × 128 dot | 32 dot × 8 |
| XU | 96 dot × 192 dot | 48 dot × 8 |

Fig. 22

FONT MAP FOR 3 LINE PRINTING

| TAPE WIDTH \ COMBINATION | SAME×3 | A A B | A B B | B A A | B B A |
|---|---|---|---|---|---|
| ⋮ | ⋮ | ⋮ | ⋮ | ⋮ | ⋮ |
| 12 mm | P × 3 | P P S | P S S | S P P | S S P |
| 18 mm | S × 3 | S S M | P M M | M S S | M M S |
| ⋮ | ⋮ | ⋮ | ⋮ | ⋮ | ⋮ |

A : SMALL   B : LARGE

Fig. 23
| | | |
|---|---|---|
| a |  | SAME×2 |
| b |  | S+L |
| c |  | L+S |
| d |  | SAME×3 |
| e | 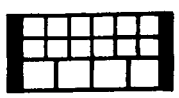 | SSL |
| f |  | SLL |
| g | 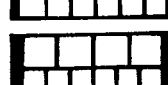 | LSS |
| h |  | LLS |
| i | 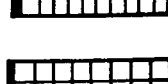 | SAME×4 |
| j | 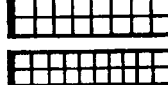 | SSSL |
| k |  | SSLS |
| l |  | SLSS |
| m | 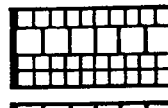 | LSSS |
L : LARGE
S : SMALL Fig. 24
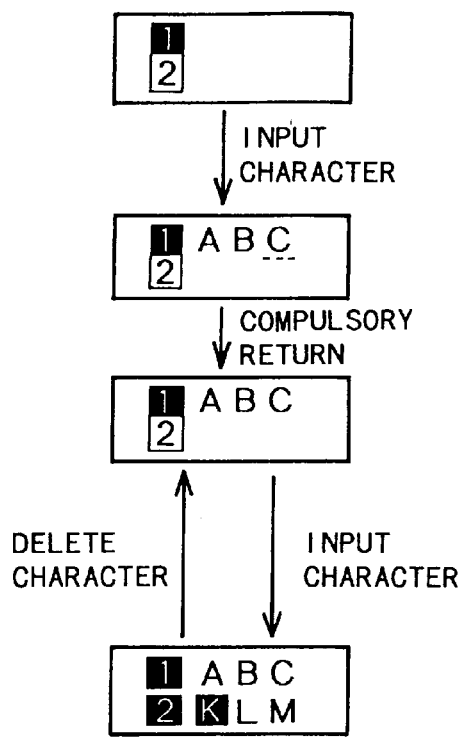
Fig. 26
NO TAPE SET
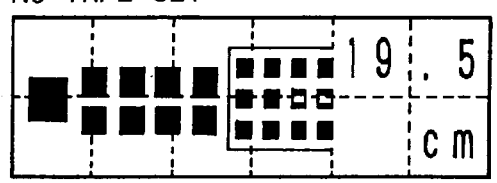
INSUFFICIENT TAPE WIDTH
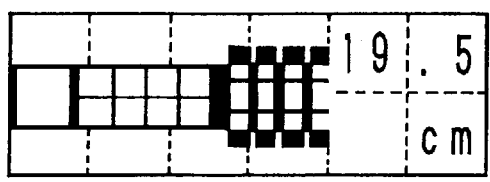

Fig. 27A — INPUT ONRY ONE LINE IN 'AUTO'
Fig. 27B — INPUT TWO LINES IN 'AUTO'
Fig. 27C — INPUT ONRY ONE LINE IN 'MANUAL' AND '2LINE' SETTING

Fig. 30

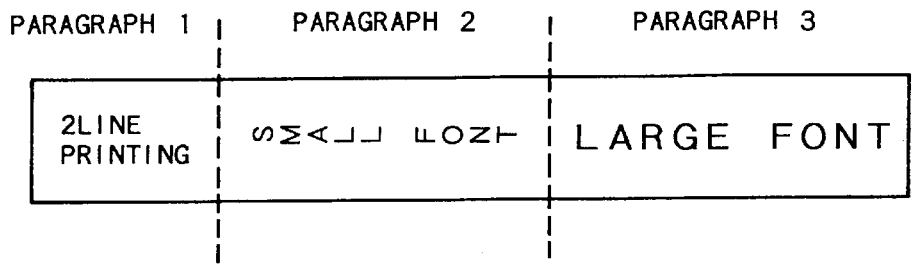

Fig. 31

PARAGRAPH ATTRIBUTE INFOMATION(STYLE)

| TITLES | SUB-TITLES | ▨ = DEFAULT VALUE | ⋯ = PREFERENTIAL CHOICE | | |
|---|---|---|---|---|---|
| VERTICAL/ HORIZONTAL SIZE | AUTO | VERTICAL HORIZONTAL (DETERMINE ACCORDING TO TAPE WIDTH AND NUMBER OF LINES) | | | |
| | 1LINE | S | M | L | XL XL×2 |
| | 2LINE | SAME×2 | S+L | L+S | |
| | 3LINE | SAME×3 | SSL | SLL | LSS LLS |
| | 4LINE | SAME×4 | SSSL | SSLS | SLSS LSSS |
| ORNAMENT | | NO ORNAMENT | KEYLINE BOX | KEYLINE BOX +SCREEN | |

S : SMALL
M : MIDIUM
L : LARGE
XL : EXTRA LARGE

| TITLE (CHARACTER ATTRIBUTE) | | | | | | | |
|---|---|---|---|---|---|---|---|
| | STANDARD SPECIAL | | | | | | |
| ORNAMENT | SMALLEST | SMALL | STANDARD | BOLD | SLANT | HIGH-LIGHTED | SHADE | HIGH-LIGHTED + SHADE |
| ROM ** | INTERNAL | EXTERNAL | **DISPLAYED WHEN EXTERNAL RAM IS APPLIED | | | | |
| INTER-CHARACTER | VERY NARROW | NARROW | STANDARD | WIDE | | | |

EFFECTIVE LINE IN 'AUTO'    NON-EFFECTIVE LINE IN 'AUTO'

Fig. 56

| TAPE WIDTH AND KEY LINE | SAM×3 | SSL | SLL | LSS | LLS |
|---|---|---|---|---|---|
| 6/9mm Tape + KEY LINE | X / X | X / X | X / X | X / X | X / X |
| 12mm Tape + KEY LINE | PPP 64 / PPP+KL | PPS 64 / PPS+KL | PSS 68 / PSS+KL | SPP 64 / SPP+KL | SSP 68 / SSP+KL |
| 18/24mm Tape + KEY LINE | SSS 88 / SSS+KL | SSM 88 / SSM+KL | PMM 88 / PMM+KL | MSS 88 / MSS+KL 96 | MMP 88 / MMP+KL 96 |

P: 16×16 DOT
P: 24×24 DOT
P: 32×32 DOT

L: Large
S: Small
KL: KEYLINE

TOTAL DOT ELEMENTS DRIVEN ON THERMAL HEAD

Fig. 57

NOT EFFCTIVE

| LINE | P | S | M | XM | L | XL | G | XG | U | XU |
|---|---|---|---|---|---|---|---|---|---|---|
| SMALLEST | P | P | P | S | S | M | M | L | L | G |
| SMALL | P | P | S | M | M | L | L | G | G | U |
| STANDARD | P | S | M | XM | L | XL | G | XG | U | XU |

P(16×16), S(24×24),
M(32×32), L(48×48),
XM(32×64), XL(48×96),
G(64×64), U(96×96),
XG(64×128), XU(96×192)

Fig. 60
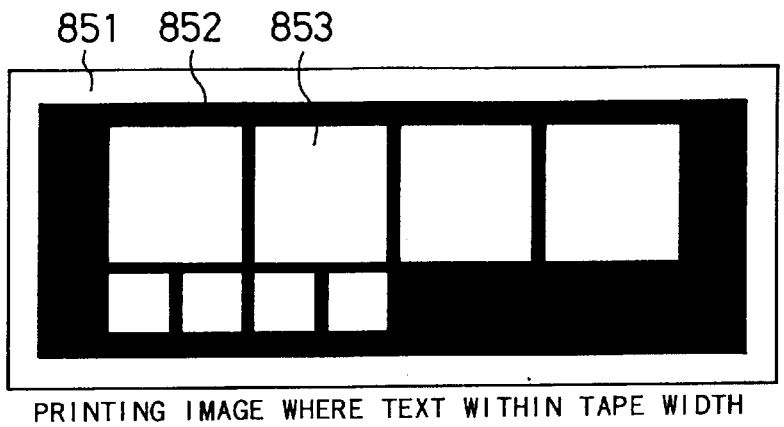
PRINTING IMAGE WHERE TEXT WITHIN TAPE WIDTH
Fig. 61
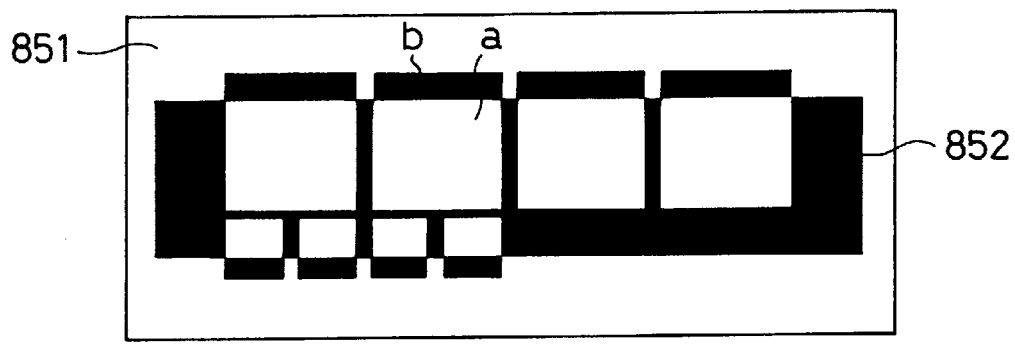
PRINTING IMAGE WHERE TEXT OUT OF TAPE WIDTH
Fig. 62
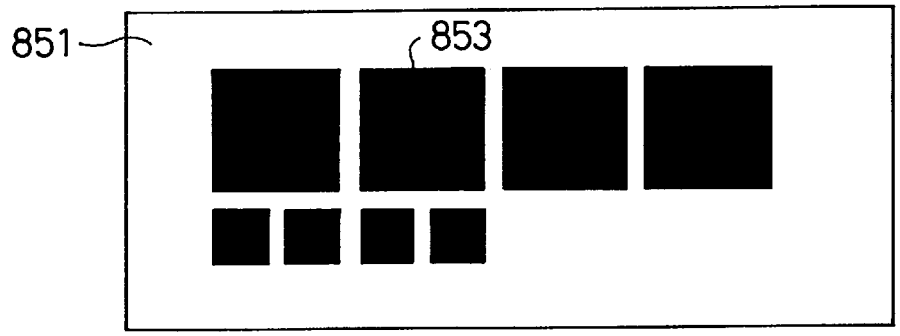
PRINTING IMAGE WHERE NO TAPE IS SET
Fig. 63
A B C D
a b c d

HORIZONTAL ADDRESS →

VERTICAL ADDRESS ↓

TAPE PRINTING DEVICE

This is a Divisional application of prior application Ser. No. 08/132,572 (U.S. Pat. No. 5,651,619) filed on Oct. 6, 1993 and 08/900,374 filed on Jul. 12, 1997.

BACKGROUND OF THE INVENTION

1. Field of the Invention

The present invention relates to a printing device for printing a text including a desirable series of characters on a tape, and more specifically to a novel printing device having a function of printing the text in a plurality of lines on a tape. The invention also pertains to an improved printing device where attribute data such as character sizes are simply specified for plural-line printing. The invention further relates to a printing image display unit, incorporated in a printing device for printing a text on a tape medium, for displaying a printing image of the text on a liquid-crystal display prior to actual printing operation.

2. Description of the Related Art

Tape printing devices generally known are used for printing a desirable series of characters on a surface of an adhesive tape having an adhesive rear face. With such a tape printing device, a desirable title or name is printed on a label (cut piece of a tape) through simple operation. These labels with an adhesive are applied in both domestic and business fields, for example, on the spine of business files or the back of video tapes.

The tape printing device is used for printing one or plural rows of input characters including letters and symbols (hereinafter referred to as text) on a tape and cutting the tape at a desirable position to a label of a predetermined length. Improved tape printing devices allowing plural-line printing have been proposed to meet the recent expansion of label application.

In the tape printing device, the user can arbitrarily specify the number of lines and the character size and line-spacing for each line. With increased application range of labels, a variety of tapes with different widths and colors are set in tape cartridges. Diversity of tapes, printing lines, and printing styles makes the operation and control process undesirably complicated. When a large font is selected while the tape cartridge with a narrow tape is set in the tape printing device, or when a standard font is changed to a wider font, a print may be out of the tape width or a predetermined length. The user is thus required to manage plural types of tape cartridges with different widths and colors and check the character size and balance in the printing process.

In plural-line printing, for example, two-line printing, text data may exist only in one line. In such a case, sometimes a desirable print can not be obtained.

As described previously, in the conventional tape printing device, the character size of each line and the line-spacing are separately specified. When the text includes a large number of lines, this specification process consumes a long time period. In many cases, the user prefers a similar layout for a certain text on any width of the tape. The conventional device, however, requires specification of the character size and line spacing for every width of the tape.

The user sometimes specifies the wrong character size with respect to the tape width, which may cause an undesirable print, especially in plural-line printing.

Some improvement has been proposed in tape printing devices for printing only one line as disclosed in Japanese Utility Model Laying-Open Gazette No. 3-72461. Such an improved device detects the width of a tape set in the device and automatically determines the character size according to the tape width. This makes the user free from troublesome specification of the character size and effectively prevents printing out of the tape width.

This method is, however, not preferably applicable to tape printing devices for printing a text in plural lines. In this application, the character size is made equal for all the plural lines and the user can not obtain labels with a desirable layout including plural lines having different character sizes. Since the character size is fixed with respect to each tape width in this method, the user can not specify a desirable character size.

A text editing process conventionally applied to the tape printing device iscompletely different from that used in a word processor. While an input format and a printing format are separately determined and set in word processors, the tape printing devices have only one format. Some of tape printing devices use a format similar to the concept of the 'page' used in the word processor to allow processing and printing of a text in a plurality of blocks. In such a tape printing device, part of the text exceeding a last line of a certain page is automatically input in a first line of a next page. In this manner, the user obtains a label with a long text printed thereon by repeated printing of a page unit along the length of the tape.

When a text is input and printed based on the concept of the 'page', insertion of one or plural lines in the middle of a certain page often moves the last line of the certain page to a next page. On the contrary, deletion of several lines from a certain page often causes some lines on a next page to move into the certain page. When some lines in a page are out of the tape width or when the specified character size is too large for the tape width, the lines out of the tape width are forcibly moved to a next page.

This does not cause any problem in character information processing apparatuses such as word processors but makes a serious problem in the tape printing device.

A typical text printed on a label with the tape printing device is significantly different from those printed in word processors. For example, an exemplified text includes a company logo on a left side and a company name and its address on a right side. In such a case, it is not desirable that some lines in a certain page move to a different page through deletion or insertion of one or plural lines, or that some lines in a certain page are automatically printed in a different page. The tape printing device occasionally changes an arrangement of the text printed on the label against the intention of the user. In this automatic modification system of the printing layout, the user can not recognize an exact printing layout prior to actual printing.

The tape printing device generally includes a display unit for displaying an input text. This allows the user to input a text while checking the screen of the display unit. The text is, however, typically displayed according to a predetermined character size because of the limited screen area irrespective of the character size specified by the user. Accordingly the user can not see or check a real printing image of the text.

In this device, the user checks the printing image by a trial print of an input text after completion of the whole input procedure. This method wastes an expensive tape and is thereby quite uneconomical.

A printing image display unit may be incorporated in the tape printing device to display a printing image of the input text. In the display unit, a label (tape with the text printed thereon) is typically shown as a contour as in the word processors. Display of the label as a contour requires a separate software for displaying the printing image and increases the required memory capacity, thus making the whole device bulky and expensive.

When some characters in a text are surrounded by a keyline box, the keyline is significantly close to or even overlapped with the contour of the label in a limited screen area. This prevents the user from clearly distinguishing the keyline from the contour.

Some additional functions have been proposed for easier identification of labels. For example, a proposed tape printing device has a screening function to make some characters prominent and distinct by screening. Thick screening makes target characters distinctive whereas thin screening can not sufficiently emphasize the target characters. Since labels are often seen and read from a certain distance, thin screening makes the shade unobservable.

In the a tape printing device, the user sometimes requires use of specific characters and symbols which the user independently determines and defines (hereinafter referred to as foreign characters). These foreign characters include company logos, special marks, and characters in a specific language. Since the tape printing device is generally used for preparing labels with desirable prints thereon, a foreign character registration function is essential.

A conventional method of registering a foreign character in the tape printing device is similar to that in other character information processing apparatuses as given below.

When a foreign character input mode is selected, a working dot pattern of NxN dots (for example, N=16, 24, 32, 48) is displayed in a color identical with that of a background of a display unit, where all the NxN dots represent background dots and the cursor is displayed on a certain dot in flickering manner. The cursor is moved according to operation of the cursor keys while the certain dot with the cursor is inversely displayed as a dot element constituting part of a foreign character according to operation of the dot-on key. After the user selects one or a plurality of dots as dot elements constituting a foreign character, the user presses the registration key to register the whole NxN dot pattern as a foreign character dot pattern.

In this conventional foreign character registration method, the user easily confuses the background of the working dot pattern with the background of the display unit.

SUMMARY OF THE INVENTION

One object of the invention is thus to provide an improved tape printing device which allows the user to obtain a label with a desirably arranged text printed thereon through a simple operation.

Another object of the invention is to provide a tape printing device for printing a text in one or a plurality of lines according to a desirable layout and easily specifying attribute information including a character size.

Still another object of the invention is to display a printing image without increasing a memory capacity and lowering discriminating power of keylines, especially boxing with keylines.

A further object of the invention is to provide a novel screening method which makes characters sufficiently prominent and distinct even in low screening density.

Still another object of the invention is to provide a novel foreign character registration method for displaying an input area for a foreign character without a frame and generating a foreign character dot pattern well balanced with those of characters and symbols originally prepared and set in a tape printing device.

In the first printing device of the invention, the line number specification unit specifies a number of lines for printing text data on a tape while the attribute specification unit specifies attribute information of the text data. The cartridge identification unit identifies a type of a tape cartridge set in the printing device. The printing condition determination unit determines a printing condition on the printing tape according to the type of the tape cartridge, the number of lines, and the attribute information. The print control unit finally executes a predetermined process according to the printing condition.

When a tape cartridge accommodating a printing tape with a certain printable range is set in the first printing device of the invention thus constructed, the first printing device executes the predetermined process required for printing, based on the number of lines and the attribute information. The predetermined process executed by the print control unit includes selecting a font combination, recognizing a printing range partly out of the width of the printing tape, interfering with print of a specific area out of the tape width, reducing the printing range to be within the tape width, and modifying the specified number of lines or the attribute information when a printing range is out of the tape width.

The attribute information specified by the attribute specification unit includes at least one of character size, type face (or font style), line spacing, and inter-character spacing information for the text data printed in the specified number of lines.

In a preferable structure, a relative size specification unit allows the user to select a desired relative character size combination for the text data printed in the specified number of lines out of a plurality of choices previously prepared. In this case, the attribute specification unit specifies a number of dots of each character printed in the number of lines according to the selected relative character size combination.

In the second printing device of the invention, the printing position is determined according to existence or non-existence of text data in each of the specified number of lines. For example, under such a condition that two-line printing is specified, when no text data exists in a second line, the printing device executes printing according to the same printing condition as that for one-line printing.

In the third printing device of the invention, first text data previously input from the text data input unit is stored with a first print mode assigned to the first text data in the text data memory unit, and read out of the text data memory unit without erasing second text data newly input from the text data input unit. When a second print mode assigned to the second text data is different from the first print mode, the first text data and second text data are displayed in different manners. The user can thus distinctly distinguish the first print mode of the first text data from the second print mode of the second text data.

For example, one of the first and second text data is displayed positively while the other is displayed negatively. In another application, a predetermined code is displayed on a boundary between the first and second text data. In a preferred structure, the third tape printing device further includes a line number specification unit for specifying a number of lines for printing the input text data, and a line number display unit for displaying a sequence of the number of lines by giving a code to each line end.

A concept of the 'paragraph' is introduced in the fourth tape printing device of the invention, where the paragraph defines an arrangement of a text on a label (a predetermined length of the tape cut at a desirable position). Each paragraph having specific paragraph attribute information consists of one or plural lines disposed along a width of the tape and printed simultaneously. Introduction of the paragraph ensures printing of a desirable arrangement.

The fourth tape printing device includes the paragraph process unit for processing the text data by each paragraph, and the text data edit unit for editing text data according to an instruction from the user without modifying the paragraph attribute information of each paragraph. For example, when the user instructs compulsory return, the paragraph process unit works in cooperation with the text data edit unit not to change the predetermined number of lines set in each paragraph. When an instruction of compulsory return is input in a last line of a last paragraph, this instruction is ignored. When the instruction of compulsory return is input in a certain line of a certain paragraph other than a last line of a last paragraph, on the other hand, a predetermined return process is executed without changing the number of lines specified for the certain paragraph. In a preferable structure, the paragraph attribute information is specified and modified only through operation of the edit command input unit. This prevents a label design from being changed against the intention of the user.

When line deletion is instructed, the paragraph process unit keeps a target line as a vacant line not to change the specified number of lines. In this manner, the structure of the fourth tape printing device effectively prevents paragraph attribute information including the number of lines from being modified against the intention of the user.

When a target paragraph for specification or modification of paragraph attribute information includes one or a plurality of substantial lines with at least one character, the paragraph process unit preferably sets numbers of lines equal to or greater than the number of the substantial lines as possible choices of the paragraph attribute information. This effectively prevents the substantial line with text data from being deleted by accident.

The edit command input unit preferably stores a menu including a plurality of character size combinations for each paragraph consisting of only one line, and another menu including a plurality of character size and line spacing combinations for each paragraph consisting of two or more lines. The user may change the character size for each line only by selecting a desirable combination.

The character size combinations and the character size and line spacing combinations may be defined as relative values. When the user selects one of the relative combinations, the print unit converts the relative values to absolute values according to the width of a tape set in the tape printing device. This makes the user free from troublesome setting of absolute values for each tape width.

In the fourth tape printing device of the invention, the edit command input unit may preferably include an automatic paragraph setting function for determining paragraph attribute information according to input of text data. This makes the user free from specifying details of the paragraph attribute information.

The automatic paragraph setting function determines paragraph attribute information, for example, the number of lines, according to input of text data. When a certain paragraph includes a plurality of lines, the user can not distinguish a vacant line without text data from a line with blank data. The text data edit unit may preferably distinguish a substantial line with input data from a pending line with no text data when the automatic paragraph setting function is selected for the certain paragraph.

The relative character size may be converted to an absolute value according to a conversion table or a predetermined operation. The former method easily determines the absolute value whereas the latter method saves the required memory capacity.

In the fifth tape printing device of the invention, a printing image of text data on a printing tape is displayed prior to actual printing, where the printing tape is displayed in a color different from that of a background color. This structure informs the user of a printing range out of the width of the printing tape or non-setting of the printing tape.

In the sixth tape printing device of the invention, certain characters in text data is decorated with a framed shade pattern according to an ornament instruction. Since a frame of the framed shade pattern functions as a keyline, the characters can be made sufficiently prominent and distinct even in low screening density. This structure allows screening of characters with the framed shade pattern to be specified only by one ornament instruction.

In the seventh tape printing device of the invention, specific dots constituting a foreign character are inversely displayed in the foreign character input area. The user can thus generates a foreign character dot pattern without confusing a background with part of the foreign character. This method does not require a frame for defining the size of the foreign character and allows the input area to be displayed in one screen even in a relatively small display unit. The foreign character registered is output and printed as part of text data according to the requirements.

These and other objects, features, aspects, and advantages of the present invention will become more apparent from the following detailed description of the preferred embodiments with the accompanying drawings.

BRIEF DESCRIPTION OF THE DRAWINGS

FIG. 8 shows a relationship between the width of a tape T accommodated in the tape cartridge 10 and the depth of three detection holes 18K;

FIGS. 20A and 20B show examples where print data do not exist in at least one of plural lines;

FIG. 21 shows printing fonts stored in a mask ROM 118;

FIG. 22 shows a font map used in three-line printing;

FIG. 23 shows exemplified layouts with a variety of relative character size combinations in two-, three-, and four-line printing;

FIG. 24 shows display of a line head mark in 'AUTO' mode.

FIG. 26A and 26B show exemplified layouts displayed on the display unit 50D when no tape T is set in the tape printing device 1 and when the tape width of the tape T is insufficient for printing conditions;

FIGS. 27A through 27C show printing in 'AUTO' mode and 'MANUAL' mode;

FIG. 30 shows concept of a 'Paragraph';

FIG. 31 shows attribute data of a paragraph style;

FIG. 56 shows a conversion table for converting relative values of each character size combination to absolute values;

FIG. 57 shows a conversion table for converting relative character sizes to absolute values;

FIG. 60 illustrates an example of a printing image where a text is within a tape width;

FIG. 61 illustrates another example of a printing image where a text is partly out of the tape width;

FIG. 62 illustrates still another example of a printing image where no tape is set in the tape printing device;

FIG. 63 shows an example of the text;

FIGS. 65A through 65C show expansion of pattern data where the text is within the tape width;

DESCRIPTION OF THE PREFERRED EMBODIMENT

Structures and functions of the present invention will become more apparent through description of the following preferred embodiments of the invention.

Figure 1:
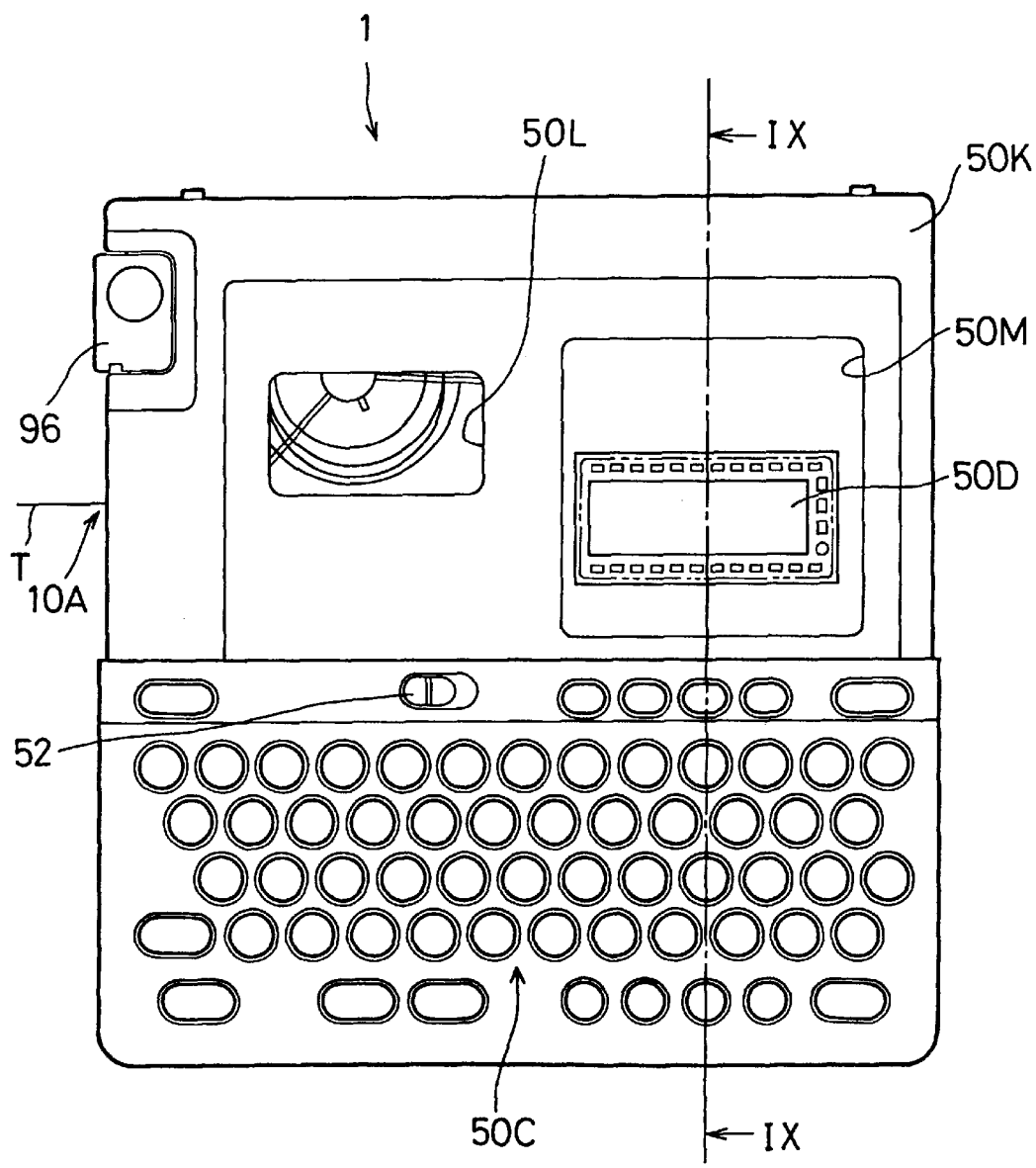
FIG. 1 is a plan view illustrating a tape printing device 1 as a first embodiment according to the invention.
Figure 2:
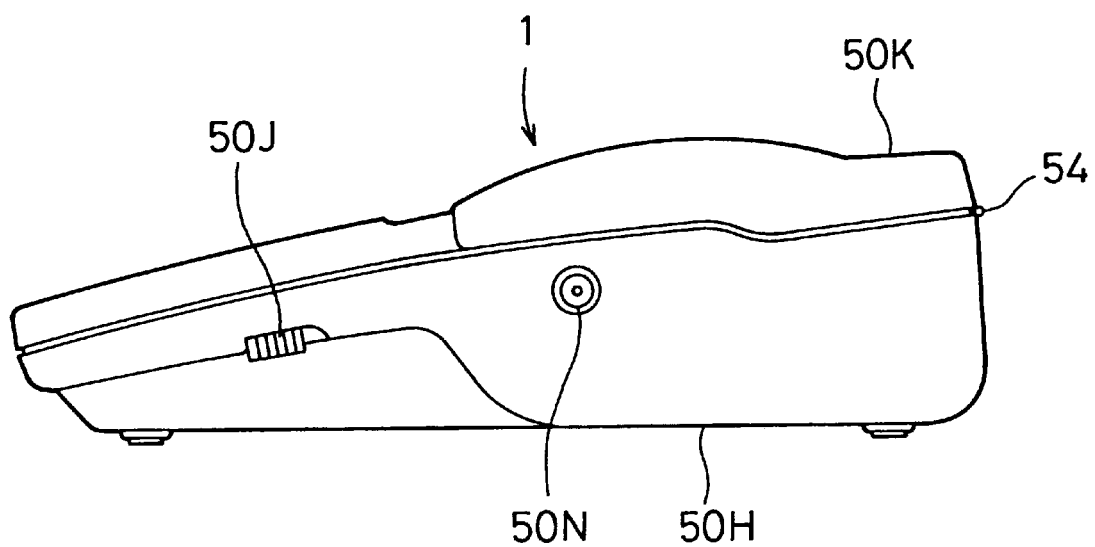
FIG. 2 is a right side view showing the tape printing device 1 of FIG. 1.

FIG. 1 is a plan view illustrating a tape printing device 1 embodying the invention, and FIG. 2 is a right side view of the tape printing device 1. In the description below, the relative position of each constituent, for example, right, left, upper, or lower, corresponds to the drawing of FIG. 1.

As shown in FIGS. 1 and 2, the tape printing device 1 includes a casing 50H for accommodating a variety of constituents, an input unit 50C having sixty-three keys, a freely openable cover 50K, a display unit 50D arranged visibly through a window 50M of the cover 50K for displaying a series of characters or other required information, and a tape cartridge holder unit 50A (see FIG. 10) disposed on a left upper portion of the device 1, which a tape cartridge 10 is detachably attached to. A window for checking attachment of the tape cartridge 10 is provided on the cover 50K. Both windows 50L and 50M are covered with transparent plastic plates.

Operation of the tape printing device 1 thus constructed is described briefly. In a first step, an operator opens the cover 50K and attaches the tape cartridge 10 to the tape cartridge holder unit 50A. After closing the cover 50K, the operator turns on a power switch 50J externally mounted on a right side wall of a main body of the device 1 as shown in FIG. 2. The device 1 subsequently executes an initial processing to ready for an input of letters or characters. The operator then inputs a desirable series of letters or characters with the keys on the input unit 50C. Although input of letters is implemented directly through key operation of the input unit 50C, an additional process such as conversion from the input letters into Chinese characters may be required in certain linguistic areas using two-bite characters like Chinese characters. When the operator instructs printing through a key operation, the device 1 drives a thermal transfer printer unit 50B to start printing on a tape T fed from the tape cartridge 10. The tape T with the letters or characters printed thereon is fed out of a tape outlet 10A disposed on a left side wall of the tape printing device 1.

The tape T used in the embodiment has a printing surface specifically processed for preferable ink spread by thermal transfer and an adhesive rear face which a peel tape is applied on. After the printed tape T is cut by a desirable length to a label with a built-in blade cutter and the peel tape is peeled off, the label with characters and symbols printed thereon is applied onto any desirable place.

Figure 3:
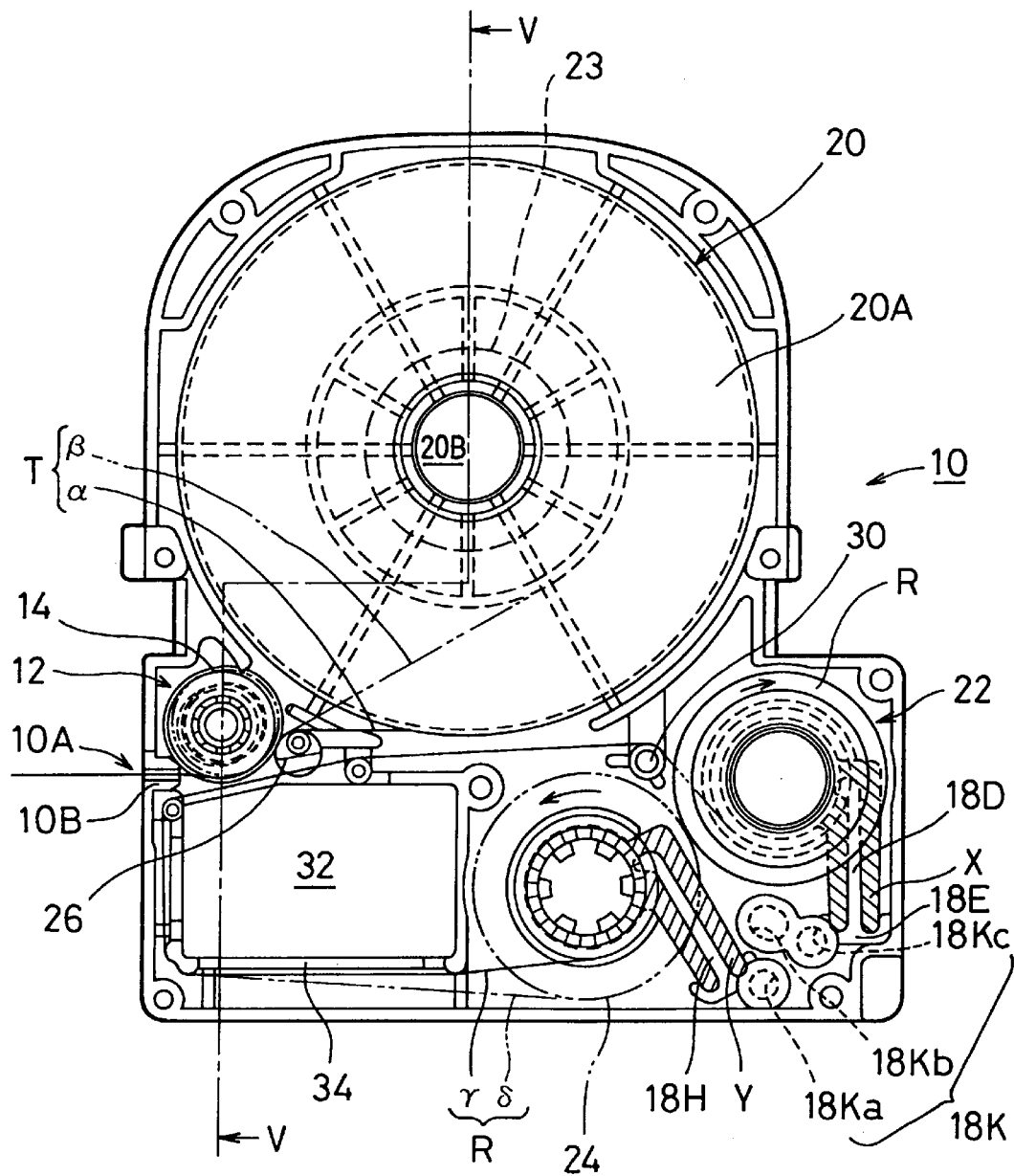
FIG. 3 is a plan view showing assembly of a tape cartridge 10 in the first embodiment.
Figure 4:
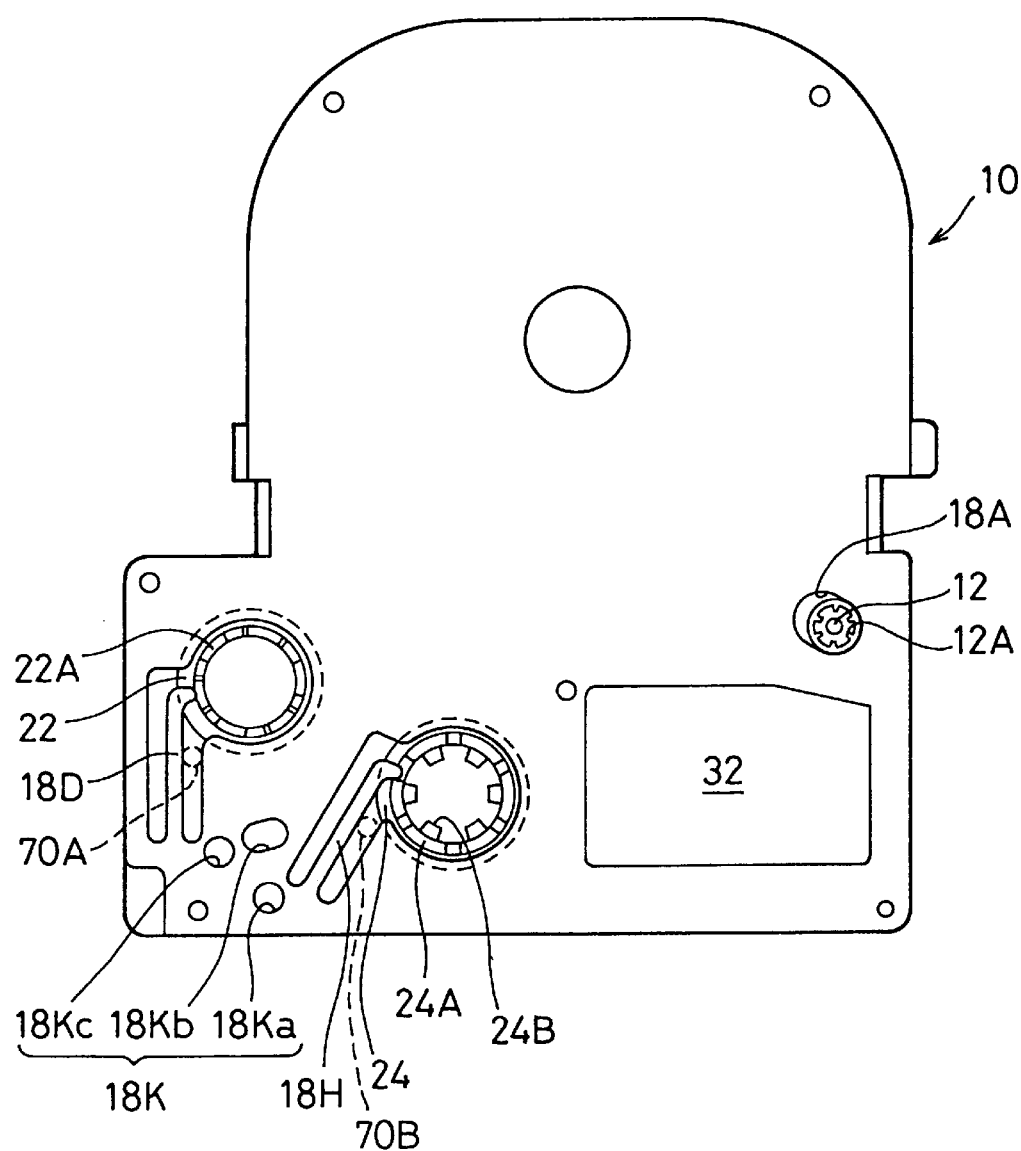
FIG. 4 is a bottom view showing the tape cartridge 10 of FIG. 3.
Figure 5:
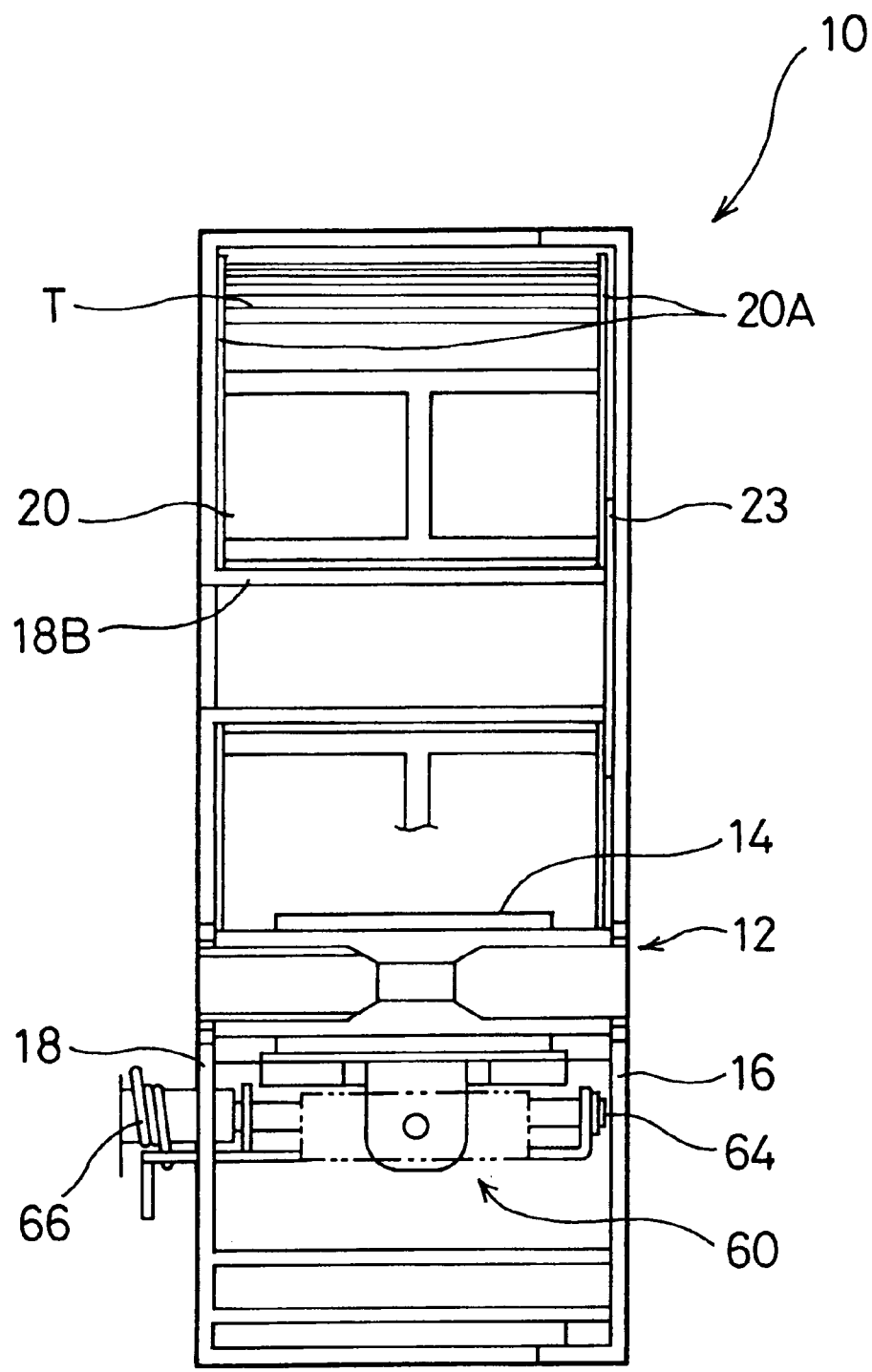
FIG. 5 is an end view illustrating the tape cartridge taken on the line V—V of FIG. 3.
Figure 6:
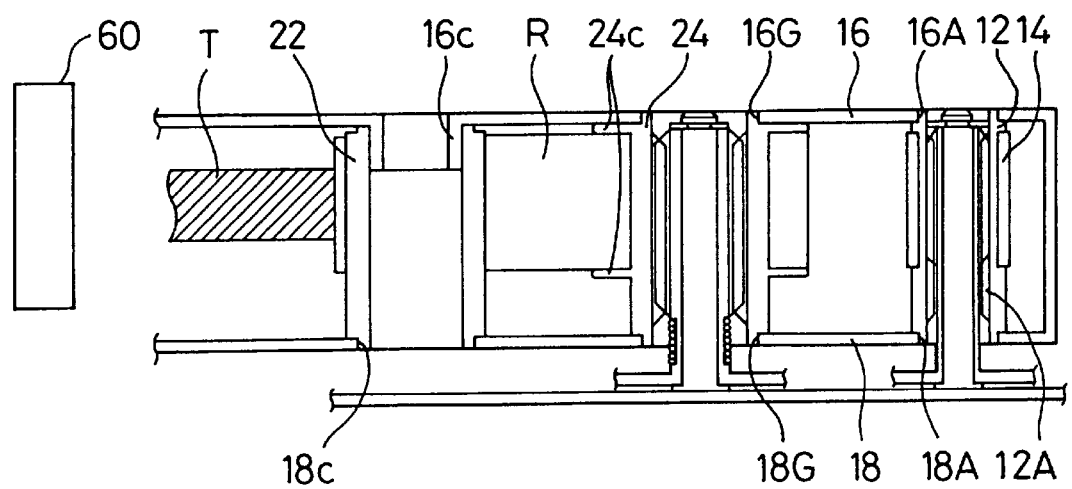
FIG. 6 is an end view showing an internal structure of the tape cartridge 10 with a 6 mm wide tape.
Figure 7:
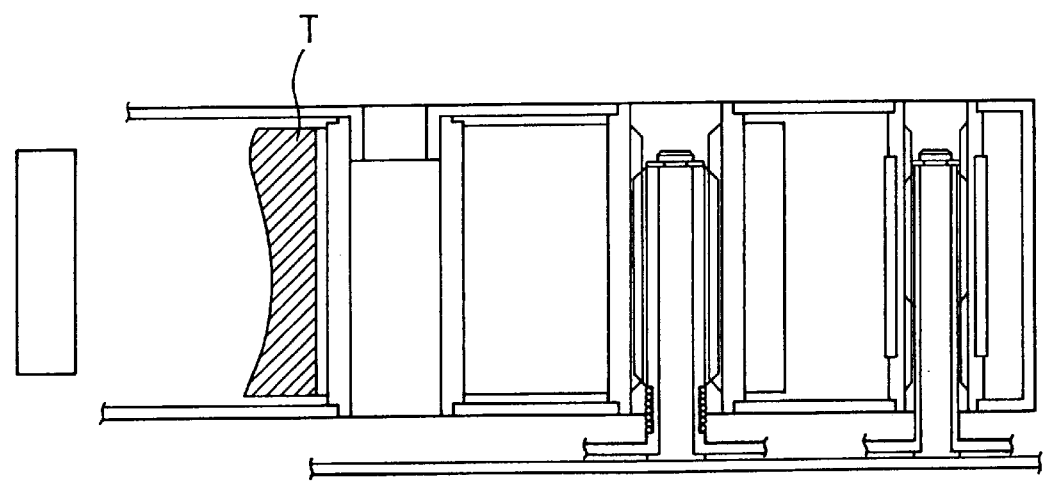
FIG. 7 is an end view showing an internal structure of the tape cartridge 10 with a 24 mm wide tape.

Structure and functions of the tape cartridge 10 are described mainly based on the plan view of FIG. 3, the bottom view of FIG. 4, and the cross sectional view of FIG. 5 taken on the line V—V of FIG. 3. Each tape cartridge 10 having a similar structure can hold a tape of a predetermined width. Five types of tape cartridges for tapes of 6 mm, 9 mm, 12 mm, 18 mm, and 24 mm in width are prepared in the embodiment. FIG. 6 is a partly broken cross sectional view showing an internal structure of the tape cartridge 10, which includes a 6 mm wide tape T running through centers of an ink ribbon core 22, a ribbon winding core 24, and a platen 12. FIG. 7 is also a cross sectional view showing the same with a 24 mm wide tape T. Numbers or symbols representing respective constituents are omitted in FIG. 7 for clarity of the drawing. In FIGS. 6 and 7, part of a printing head 60 is drawn together with the cross section of the tape cartridge 10 to show attachment of the tape T in the tape printing device 1.

The platen 12 is a hollow cylindrical member covered with a platen rubber 14 of a predetermined width corresponding to the width of the tape T. The platen rubber 14 improves contact of the tape T to an ink ribbon R and the printing head 60 for desirable printing. In the embodiment, two types of the platen rubber 14 are used; a 12 mm wide platen rubber for 6 mm, 9 mm, and 12 mm tapes (see FIG. 6), and a 18 mm wide platen rubber for 18 mm and 24 mm tapes (see FIG. 7).

The platen 12 has a smaller-diametral upper end and a smaller-diametral lower end. The platen 12 is freely rotatable since the smaller-diametral upper end and the smaller-diametral lower end are rotatably fit in apertures 16A and 18A of a top wall 16 and a bottom wall 18 of the tape cartridge 10, respectively. The apertures 16A and 18A are formed in substantially elliptic shape as seen in FIG. 4. The hollow platen 12 accommodated in the tape cartridge 10 is attached to and detached from a platen driving shaft (described later) disposed in the tape printing device 1 according to attachment and detachment of the tape cartridge 10. The platen 12 has six engagement grooves 12A arranged at the equal intervals on an inner surface thereof along a rotational axis of the platen 12 as shown in FIGS. 4 and 6. The engagement grooves 12A engage with the platen driving shaft to transmit a driving force of the driving shaft.

The tape cartridge 10 is also provided with a tape core 20 which a long tape T is wound on, the ink ribbon core 22, and the ribbon winding core 24. The tape cartridge 10 further includes a printing head receiving hole 32 which the printing head 60 enters and goes in. The printing head receiving hole 32 is defined by a guide wall 34.

The tape core 20 is a hollow, large-diametral cylindrical reel for placing a long tape T wound on a relatively large-diametral bobbin in the tape cartridge 10. Since a total thickness of the wound tape T on the tape core 20 is small as compared with the diametral of the tape core 20, a rotational angular velocity of the tape core 20 for pulling an outer-most wind of the tape T (shown as α in FIG. 3) out of the tape core 20 at a certain rate is approximately same as a rotational angular velocity of the tape core 20 for pulling an inner-most wind of the tape (shown as β in FIG. 3) at the same rate. A sufficiently large radius of curvature of tape core 20 allows even a tape T having poor resistance to a bending stress to be wound on the tape core 20 without difficulty.

As shown in FIG. 3, the tape core 20 has a shaft hole 20B on a center thereof, which rotatably receives a shaft member 18B uprightly projecting from the bottom wall 18 of the tape cartridge 10 as clearly seen in FIG. 5. The tape core 20 is provided with a pair of circular thin films 20A respectively applied on axial upper and lower ends of the tape core 20. The thin film 20A has an adhesive layer. Since the film 20A functioning as a flange with respect to the tape T has the adhesive layer facing the tape T, side edges of the tape T lightly adhere to the film 20A. This keeps the roll of the tape T wound when rotation of the platen 12 pulls the tape T out and makes the tape core 20 drivingly rotate.

As shown in FIG. 3, the tape T wound and accommodated in the tape core 20 runs to the platen 12 via a tape guide pin 26 uprightly projecting from the bottom wall 18 of the tape cartridge 10 and goes out of the tape outlet 10A of the tape cartridge 10. The tape outlet 10A has a guide element 10B of a predetermined length formed along a feeding direction of the tape T. While the tape cartridge 10 is set in the tape cartridge holder unit 50A, the printing head 60 is placed in the printing head receiving hole 32. Under such conditions, the tape T is held between the printing head 60 and the platen 12 and fed according to rotation of the platen 12.

The apertures 16A and 18A receiving the upper and lower ends of the platen 12 are formed in elliptic shape as mentioned above, and the platen 12 is movable along longitudinal axes of the apertures 16A and 18A when the tape cartridge 10 is not set in the tape printing device 1. When the tape T outside the tape cartridge 10 is being pressed into the tape cartridge 10, the platen 12 moves along a feeding direction of the tape T. Movement of the platen 12 causes the platen rubber 14 on the platen 12 to be in contact with a circumference of the tape guide pin 26 and securely holds the tape T between the platen rubber 14 and the tape guide pin 26. This interferes with further movement of the tape T. Such a structure effectively prevents from the tape T being mistakenly pressed into the tape cartridge 10.

Winding procedure of the ink ribbon R is now described. The ink ribbon core 22 includes a hollow, small-diametral cylindrical member having smaller-diametral upper and lower ends as clearly seen in FIGS. 6 and 7. The smaller-diametral lower end has six engagement grooves formed as first engaging elements 22A arranged at the equal intervals as shown in FIGS. 3 and 4. The smaller-diametral lower end of the ink ribbon core 22 is loosely fitted in a circular first fitting aperture 18C formed on the bottom wall 18 of the tape cartridge 10. The upper hollow end of the ink ribbon core 22 is loosely fitted in a cylindrical guide projection 16C protruded from the top wall 16 of the tape cartridge 10. The ink ribbon core 22 is accordingly held to be drivingly rotatable according to pull-out of the ink ribbon R.

As shown in FIGS. 3 and 4, a substantially L-shaped first engagement piece 18D is formed on the bottom wall 18 of the tape cartridge 10 to be positioned in the vicinity of the lower ends of the ink ribbon core 22 and the ribbon winding core 24 (described later). The first engagement piece 18D is formed by cutting part of the bottom wall 18 of the tape cartridge 10 (hatched portion designated as x in FIG. 3). Resilience of the material of the bottom wall 18 allows a free end of the first engagement piece 18D to be movable around a base portion 18E integrally formed with the bottom wall 18 along the plane of the bottom wall 18. When no force is applied onto the first engagement piece 18D, the free end of the first engagement piece 18D is positioned inside the circumference of the first fitting aperture 18C and engages with one of the six engaging elements 22A formed on the lower end of the ink ribbon core 22 loosely fitted in the fitting aperture 18C. This effectively prevents the ink ribbon core 22 from being unintentionally rotated and the ink ribbon R from being slack.

The ink ribbon R wound and accommodated in the ink ribbon core 22 is pulled out via a ribbon guide roller 30 and runs along the guide wall 34 to the ribbon winding core 24. In the middle of the ribbon path, the ink ribbon R reaches a position facing the platen 12 to be overlapped with the tape T. In FIG. 3, γ and δ respectively show the running conditions of the ink ribbon R when the tape cartridge 10 is still unused and new, that is, when only a starting end of the ink ribbon R is on the ribbon winding core 24, and when the whole ink ribbon R is wound on the ribbon winding core 24.

The ribbon winding core 24 includes a hollow cylindrical member of substantially the same shape as the ink ribbon core 22 as shown in FIGS. 3 and 4. The hollow cylindrical member has smaller-diametral upper and lower ends in the same manner as the ink ribbon core 22. The lower end has six engagement grooves formed as second engaging elements 24A arranged at the equal intervals. As is the platen 12, the ribbon winding core 24 rotates through engagement with a ribbon winding core driving shaft (described later) disposed in the tape printing device 1. The ribbon winding core 24 thus has six engagement grooves 24B arranged at the equal intervals on an inner surface of the hollow cylindrical member along a rotational axis of the ribbon winding core 24. The smaller-diametral upper and lower ends of the ribbon winding core 24 are loosely and rotatable fitted in a top circular fitting aperture 16G and a bottom circular fitting aperture 18G formed on the top wall 16 and the bottom wall 18 of the tape cartridge 10, respectively.

In the same manner as the ink ribbon core 22, a substantially L-shaped second engagement piece 18H is formed on the bottom wall 18 of the tape cartridge 10 to prevent unintentional rotation of the ribbon winding core 24. The second engagement piece 18H is formed by cutting part of the bottom wall 18 of the tape cartridge 10 (hatched portion designated as Y in FIG. 3). When the tape cartridge 10 is not set in the tape printing device 1, a free end of the second engagement piece 18H is positioned inside the circumference of the bottom fitting aperture 18G and engages with one of the six second engaging elements 24A formed on the lower end of the ribbon winding core 24. The ribbon winding core 24 is thereby not rotated in such a direction as to slacken the ink ribbon R wound thereon. The free ends of the first engagement piece 18D and the second engagement piece 18H are respectively positioned not to be perpendicular but to be inclined to the first and second engaging elements 22A and 24A. This prevents the ink ribbon core 22 and the ribbon winding core 24 from rotating in undesirable directions as described above. The ribbon winding core 24 readily rotates in a normal winding direction of the ink ribbon R.

Engagement of the first engaging element 22A of the ink ribbon core 22 with the first engagement piece 18D and that of the second engaging element 24A of the ribbon winding core 24 with the second engagement piece 18H effectively prevent the ink ribbon R from undesirably slackening while the tape cartridge 10 is not set in the tape printing device 1. The engagement is released when the tape cartridge 10 is set in the tape cartridge holder unit 50A. The releasing procedure is described later with a typical structure of the tape cartridge holder unit 50A.

The ink ribbon R wound on the ribbon winding core 24 is a thermal transfer ribbon having a predetermined width corresponding to the width of the tape T used for printing. In the embodiment, a 12 mm wide ink ribbon R is used for 6 mm, 9 mm, and 12 mm wide tapes T as shown in FIG. 6, a 18 mm wide ink ribbon R for a 18 mm wide tape T (not shown), and a 24 mm wide ink ribbon R for a 24 mm wide tape T as shown in FIG. 7.

When the width of the ink ribbon R is equal to the height of the tape cartridge 10 (see FIG. 7), the top wall 16 and the bottom wall 18 of the tape cartridge 10 guide the ink ribbon R. No additional flange is thus required on the circumference of the ribbon winding core 24 for controlling and adjusting a winding position of the ink ribbon R. When the width of the ink ribbon R is smaller than the height of the tape cartridge 10, on the other hand, a flange 24C is formed on the circumference of the ribbon winding core 24 to guide the ink ribbon R to go through a printing position of the platen 12. The flange 24C is formed in a certain size corresponding to the width of the ink ribbon R.

In the embodiment, there are tape cartridges 10 of five different sizes corresponding to the width of the tape T as described above. Since a printable area of the tape T differs according to the width of the tape T, a variety of condition setting procedures are required. The tape printing device 1 detects the size of the tape cartridge 10 and automatically executes required setting, thus making the user free from troublesome setting. The tape cartridge 10 of the embodiment has first through third detection holes 18Ka, 18Kb, and 18Kc formed on the bottom wall 18 corresponding to the size of the tape T as shown in FIG. 4. Namely, depths of the three detection holes 18Ka, 18Kb, and 18Kc are changed according to the width of the tape T accommodated in the tape cartridge 10.

FIG. 8 shows a relationship between the width of the tape T accommodated in the tape cartridge 10 and the depths of the three detection holes 18Ka, 18Kb, and 18Kc. As shown in FIG. 8, the first detection hole 18Ka is formed shallow and the second and third detection holes 18Kb, 18Kc of the tape cartridge 10 are formed deep for a 6 mm wide tape. The first and third detection holes 18Ka, 18Kc are formed deep for a 9 mm wide tape; only the third detection hole 18Kc is deep for a 12 mm wide tape; and the first and second detection holes 18Ka, 18Kb are deep for a 18 mm wide tape. Only second detection hole 18Kb is formed deep for a 24 mm wide tape. Since the size of the tape cartridge 10 is designated as a combination of the depths of the three detection holes 18Ka through 18Kc, the user can also check the tape cartridge 10 with eyes.

Figure 9:
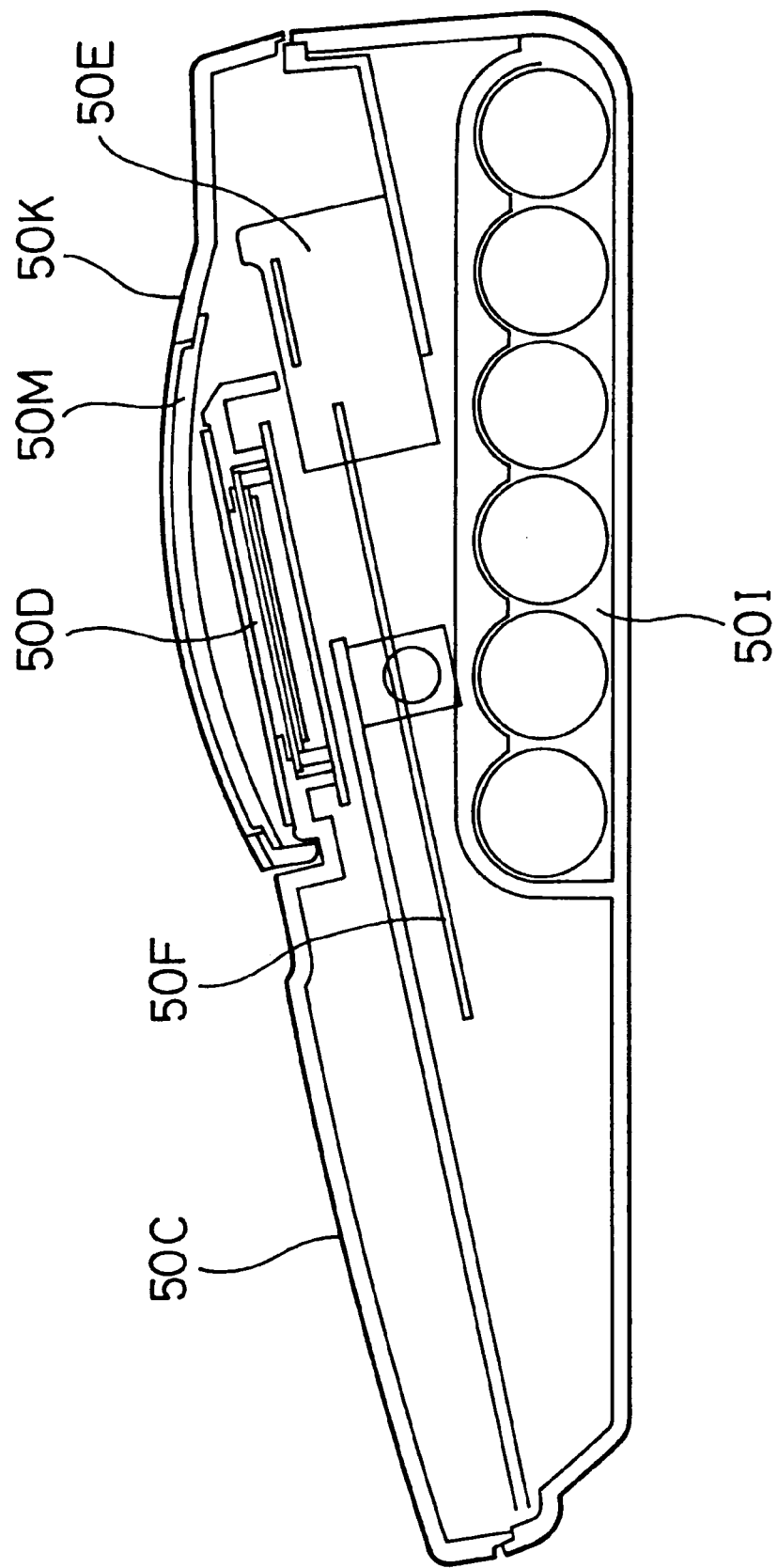
FIG. 9 is an end view illustrating the tape printing device 1 taken on the line IX—IX of FIG. 1.

The tape cartridge 10 thus constructed is set in the tape cartridge holder unit 50A of the tape printing device 1. The tape printing device 1 includes an extension unit 50E for connecting various packs optionally supplied as external memory elements, the input unit 50C, and a control circuit unit 50F for controlling the display unit 50D and the printer unit 50B as shown in the cross sectional view of FIG. 9 taken on the line IX—IX of FIG. 1.

The tape printing device 1 is also provided on a bottom face thereof with a battery holder unit 50I for receiving six SUM-3 cells working as a power source of the whole device 1. The power switch 50J is mounted on the right side wall of the tape printing device 1 (see FIG. 2). Power may be supplied from a plug 50N (see FIG. 2) formed on the right side wall of the device 1 to be connectable with an AC adapter (not shown).

Figure 10:
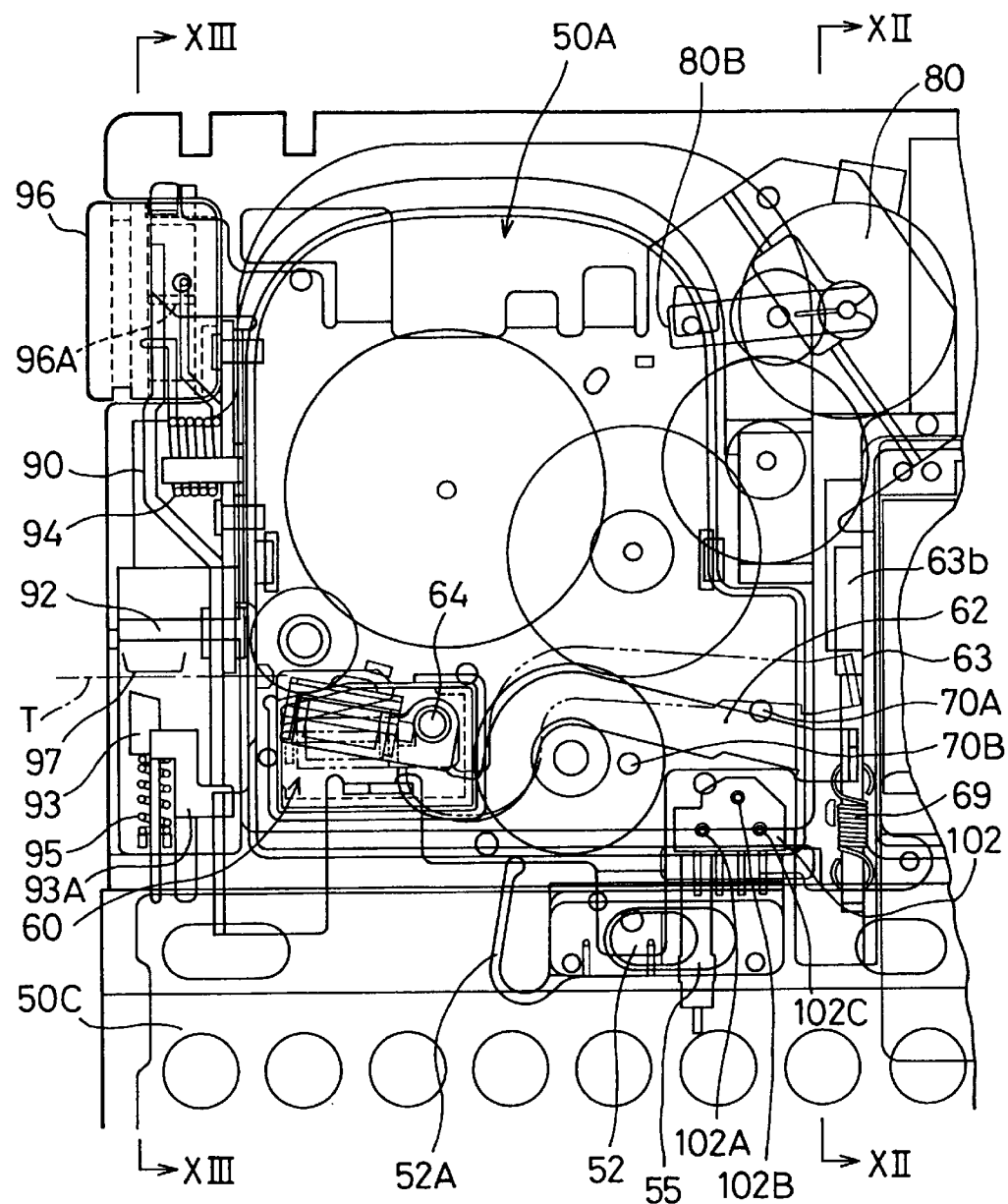
FIG. 10 is a plan view showing a typical structure of a tape cartridge holder unit 50A.
Figure 11:
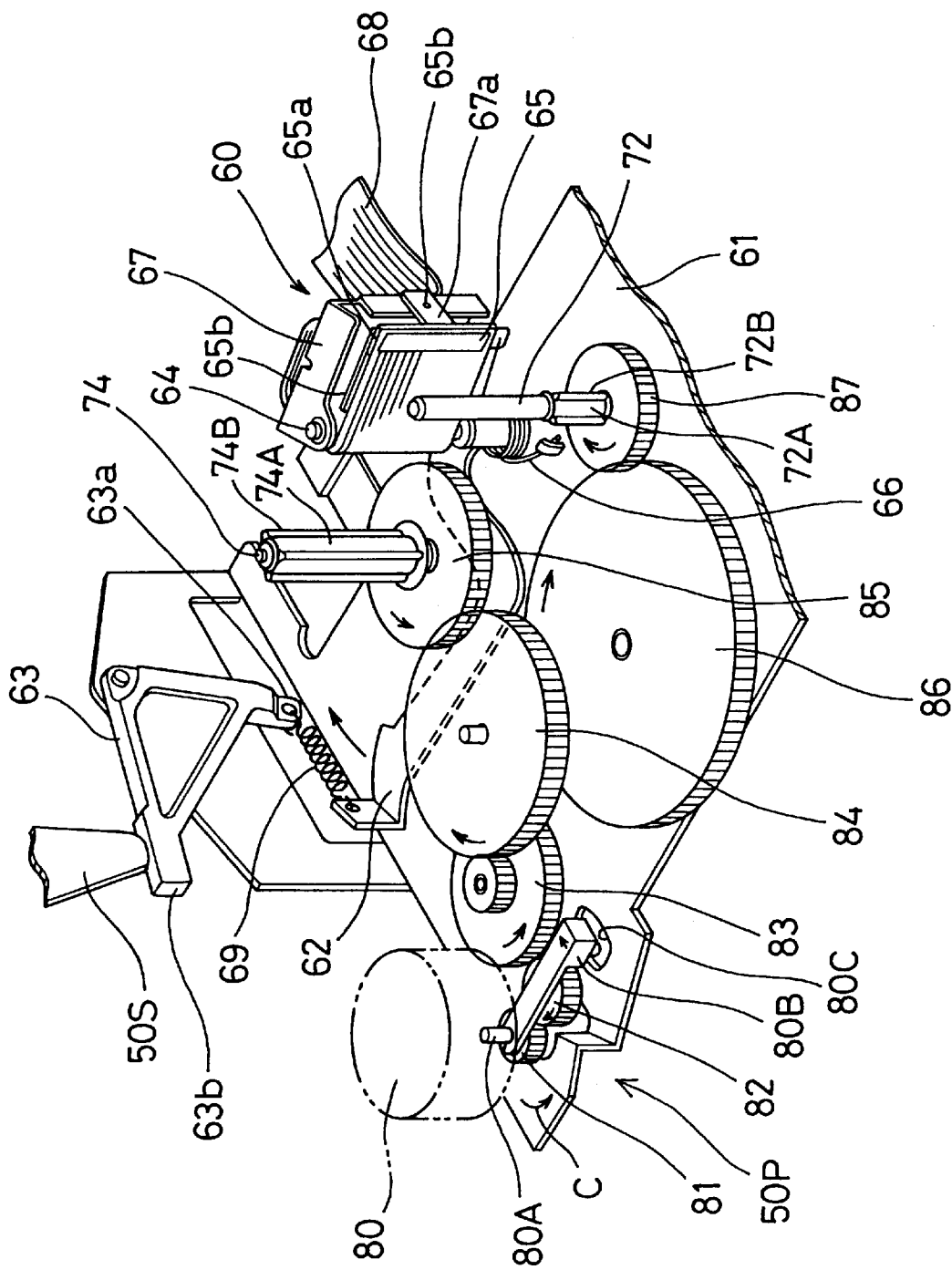
FIG. 11 is a perspective view illustrating a gear train and a mechanism for shifting a printing head 60 between a retreated position and a printing position.

Mechanical constituents of the tape printing device 1 are described hereinafter. FIG. 10 is a plan view showing a typical structure of the tape cartridge holder unit 50A, and FIG. 11 is a perspective view illustrating an essential structure of a driving mechanism 50P for driving the platen 12 and the other elements by means of power of a stepping motor 80.

The tape cartridge holder unit 50A is disposed in a left upper position of a main body of the tape printing device 1 and defines an attachment space corresponding to the shape of the tape cartridge 10 as shown in FIG. 10. The platen driving shaft and the ribbon winding core driving shaft respectively engaging with the hollow members of the platen 12 and the ribbon winding core 24 as well as the printing head 60 are uprightly disposed in the attachment space of the tape cartridge holder unit 50A as shown in FIG. 11. The tape cartridge holder unit 50A is also provided on a lower portion thereof with the driving mechanism 50P for transmitting rotation of the stepping motor 80 to the platen 12 and other elements. The driving mechanism 50P disposed below the tape cartridge holder unit 50A is not observable even when the cover 50k is open. FIG. 11 shows the driving mechanism 50P when the inner case of the tape cartridge holder unit 50A is eliminated. The attachment space of the tape cartridge holder unit 50A is covered with the cover 50K while the tape printing device 1 is in service.

The tape cartridge 10 is attached to or replaced in the tape cartridge holder unit 50A while the cover 50K is open. When a slide button 51 (see FIGS. 1 and 10) disposed before the tape cartridge holder unit 50A is slid rightward (in the drawing), engagement of the cover 50K with the main body of the device 1 is released, so that the cover 50K rotates around a cover hinge 54 mounted on a rear portion of the main body of the device 1 to be opened. A spring arm 52A integrally formed with the slide button 52 engages with an engaging element of the main body of the device 1 to continuously apply a leftward (in the drawing) pressing force to the slide button 52.

When the cover 50K is opened through operation of the slide button 52, the printing head 60 for printing the tape T of the tape cartridge 10 is retreated to allow the tape cartridge 10 to be attached or detached. The printing head 60 is rotatably mounted on a head rotating shaft 64 projected from a base board 61 as clearly seen in FIG. 11. The printing head 60 includes a head body 65 having a plurality of heating dot elements, a radiator plate 65b holding the head body 65 via an insulator 65a, a frame element 67 for supporting the radiator plate 65b through a connection plate 67a, a coil spring 66 pressing the printing head 60 in an initial direction, and a flexible cable constituting an electric wiring to the head body 65.

The printing head 60 is only roughly aligned with the platen 12 in the tape cartridge 10 through attachment of the tape cartridge 10 in the tape printing device 1. Namely, the printing head 60 is not always in contact with the platen rubber 14 along the height of the platen 12 uniformly when the tape cartridge 10 is set in the device 1. In the tape printing device 1 of the embodiment, the connection plate 67a is fixed to the frame element 67 via a pin 67b inserted into an opening of the connection plate 67a, and the radiator plate 65b holding the head body 65 is thus rotatable around the pin 67b. This allows the head body 65 to hold the tape T between the platen 12 and the head body 65 and to be uniformly in contact with the height of the platen 12 irrespective of the attachment conditions of the tape cartridge 10 with respect to the tape cartridge holder unit 50A when the printing head 60 is pressed towards the platen 12.

A lower end of the frame element 67 is extended to form a link plate 62. The link plate 62 is positioned in a gear train shown in FIG. 11, and has a free end positioned in the vicinity of a boundary of the display unit 50D (see FIG. 10). The free end of the link plate 62 holds one end of a coil spring 69 to connect a driving member 63 with the link plate 62. The driving member 63 having a substantially triangular shape has a first end 63a holding the other end of the coil spring 69 and a second end 63b placed opposite to the cover 50K as shown in FIG. 11. An operation arm 50S is extended from the cover 50K to be positioned opposite to the second end 63b of the driving member 63, and presses the second end 63b when the cover 50K is closed.

Figure 12:
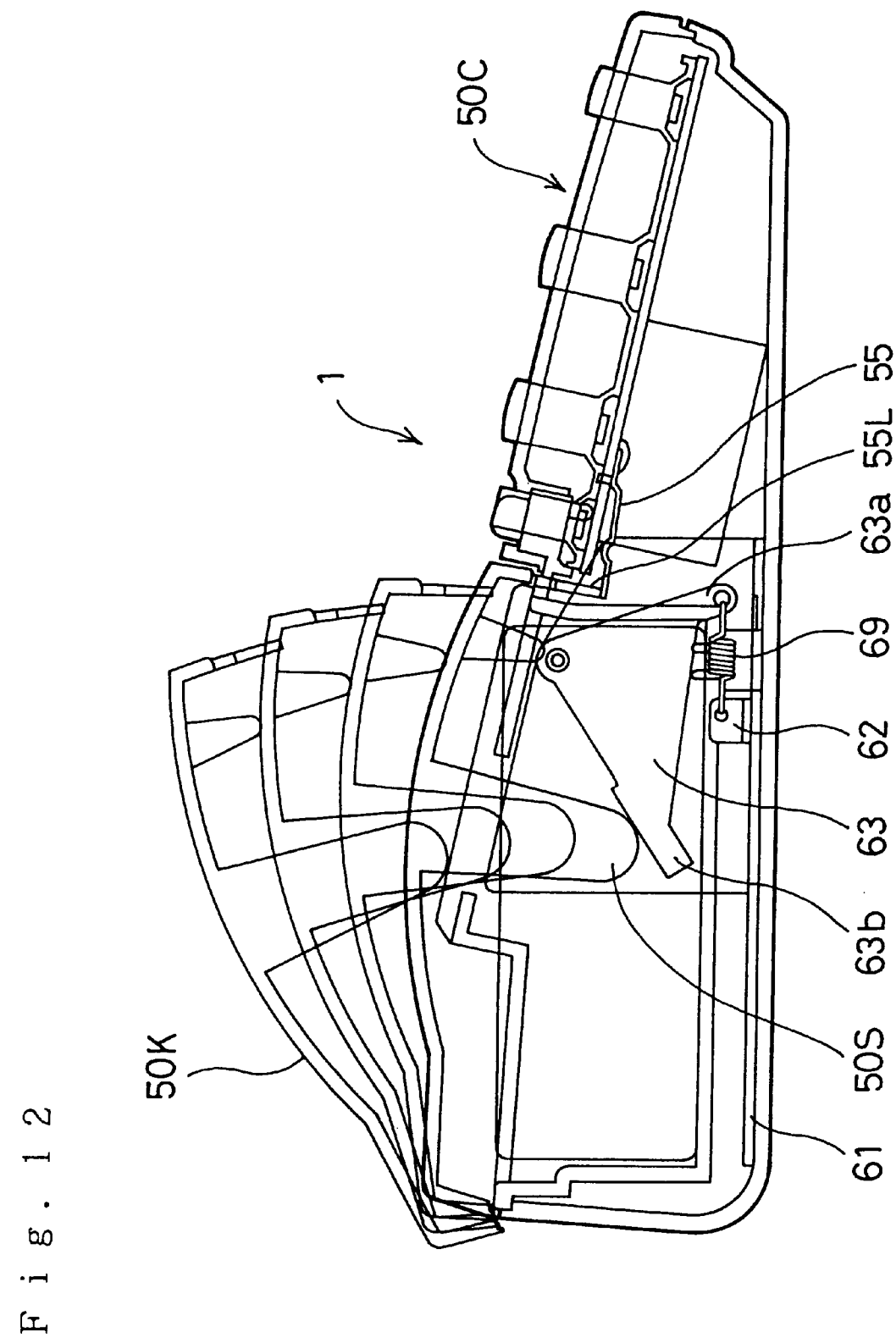
FIG. 12 is an end view showing the mechanism for shifting the printing head 60 taken on the line XII—XII of FIG. 10.

FIG. 12 is a cross sectional view schematically showing such a movement described above, taken on the line XII—XII of FIG. 10. When the cover 50K is pressed downward, the operation arm 50S presses the second end 63b of the driving member 63 downward, and the link plate 62 rotatingly moves rightward (in FIG. 11) via the coil spring 69, accordingly. Such a rotating movement of the link plate 62 rotates the printing head 60 against the pressing force of the coil spring 66. The printing head 60 thereby moves from its retreated position to a printing position facing the platen 12 of the tape cartridge 10 set in the tape printing device 1. When the cover 50K is closed, the printing head 60 is accordingly shifted to the printing position. When the cover 50K is opened, on the contrary, the printing head 60 is shifted to the retreated position to allow the tape cartridge 10 to be detached or attached. The printing head 60 once retreated is kept in the retreated position by means of the coil spring 66 while the cover 50K is open, and goes back to the printing position to press against the platen 12 when the cover 50K is closed.

As described previously, the first engagement piece 18D and the second engagement piece 18H are formed on the bottom wall 18 of the tape cartridge 10 to engage with the first engaging element 22A and the second engaging element 24A so as to prevent unintentional rotation of the ink ribbon core 22 and the ribbon winding core 24 (see FIGS. 3 and 4). The first engagement piece 18D and the second engagement piece 18H are formed respectively by cutting the parts of the bottom wall 18 (hatched portions designated as X and Y in FIG. 3). The tape cartridge holder unit 50A has two cone-shaped contact projections 70A and 70B at a position substantially in the middle of the hatched portions X and Y as shown in FIG. 10. When the tape cartridge 10 is set in the tape cartridge holder unit 50A, the contact projections 70A and 70B are fitted in the hatched portions X and Y of the bottom wall 18 of the tape cartridge 10 to press the first and the second engagement pieces 18D and 18H in a direction away from the first engaging element 22A of the ink ribbon core 22 and the second engaging element 24A of the ribbon winding core 24. This pressing movement releases engagement of the first and the second engagement pieces 18D and 18H with the ink ribbon core 22 and the ribbon winding core 24, thus allowing the ink ribbon core 22 and the ribbon winding core 24 to rotate without any additional load.

A transmission mechanism for transmitting rotation of the stepping motor 80 to a platen driving shaft 72 of the platen 12 is described in detail. As shown in FIG. 11, a first gear 81 is attached to a rotational shaft 80A of the stepping motor 80, and a clutch arm 80B engages with the rotational shaft 80A with predetermined friction. The clutch arm 80B, together with a second gear 82 and a third gear 83, constitutes a one-way clutch. When the stepping motor 80 is rotated in a direction shown by the arrow C in FIG. 11, the friction between the rotational shaft 80A and the clutch arm 80B rotates the clutch arm 80B with the second gear 82 in the directions shown by the arrow C to engage with the third gear 83. Rotation of the stepping motor 80 is thus transmitted to the third gear 83. Functions of the one-way clutch will be further described later.

Rotation of the third gear 83 is then transmitted to a fifth gear 85 and a sixth gear 86 via a fourth gear 84 through repeated gear-down operation. A rotational shaft of the fifth gear 85 is connected to a ribbon winding core driving shaft 74 to wind the ink ribbon R according to rotation of the stepping motor 80. A rim 74A actually driving the ribbon winding core 24 is attached to the ribbon winding core driving shaft 74 with a predetermined friction. Under normal operating conditions, the rim 74A rotates with the ribbon winding core driving shaft 74 rotated by the stepping motor 80. When the ribbon winding core 24 is made unrotatable, for example, due to completion of winding of the ink ribbon R, on the other hand, the rim 74A slips against rotation of the ribbon winding core driving shaft 74.

Rotation of the sixth gear 86 is further transmitted to a seventh gear 87 to rotate the platen driving shaft 72. The platen driving shaft 72 has a rim 72A which engages with the inner surface of the platen 12 to rotate the platen 12. Rotation of the stepping motor 80 transmitted to the third gear 83 by means of the one-way clutch finally rotates the platen driving shaft 72 and the ribbon winding core driving shaft 74, accordingly. The tape T held between the platen rubber 14 on the circumference of the platen 12 and the head body 65 of the printing head 60 is thus continuously fed with progress of printing, and the ink ribbon R is wound on the ribbon winding core 24 synchronously with feeding of the tape T.

The platen driving shaft 72 has, on an outer surface thereof, three engagement projections 72B which are formed at the equal intervals to engage with the engagement grooves 12A formed on the inner surface of the platen 12. The ribbon winding core driving shaft 74 also has three engagement projections 74B which are formed at the equal intervals on an outer surface thereof to engage with the engagement grooves 24B formed on the inner surface of the ribbon winding core 24. When the platen driving shaft 72 and the ribbon winding core driving shaft 74 are rotated at a predetermined rate by the stepping motor 80, the tape T and the ink ribbon R are respectively pulled by a predetermined amount out of the tape core 20 and the ink ribbon core 22 to be overlapped with each other and go through the platen rubber 14 and the printing head 60. In the meanwhile, power supplied to the printing head 60 controls heating of the dot elements on the printing head 60 to melt ink of the ink ribbon R corresponding to the heated dot elements. The melted ink is then thermally transferred to the tape T to complete printing on the tape T. After printing, the tape T with the print is fed out from the tape cartridge 10 while the ink ribbon R used for printing is wound on the ribbon winding core 24.

The tape T conveyed with progress of printing is finally fed out of the tape outlet 10A disposed on the left side wall of the main body of the tape printing device 1. The tape T with the print is normally cut with a cutting mechanism (described later). There is, however, a possibility that the user forcibly pulls out the tape T prior to cutting. Since the printing head 60 presses the tape T against the platen rubber 14 of the platen 12 while the cover 50K is closed, the forcible pull-out of the tape T makes the platen driving shaft 72 rotate. The gear-down operation and a certain amount of retaining torque of the stepping motor 80, however, prevent rotation of the platen driving shaft 72 and the ribbon winding core driving shaft 74 in a conventional driving mechanism. The forcible pull-out of the tape leads to unintentional pull-out of the ink ribbon R, accordingly. When the tape T is cut with the cutting mechanism under such circumstances, the ink ribbon R is also cut undesirably. This makes the tape cartridge 10 unusable any more.

In the embodiment, the one-way clutch including the clutch arm 80B, the second gear 82, and the third gear 83 solves such a problem. When the user forcibly pulls out the tape T, the platen driving shaft 72 rotates with the platen 12 in the structure of the embodiment. Rotation of the platen driving shaft 72 is transmitted to the third gear 83 via the gear train to rotate the third gear 83 clockwise. Rotation of the third gear 83 makes the second gear 82 rotate. However, since the rotational shaft 80A of the stepping motor 80 is not rotated, a rotational force of the third gear 83 presses the clutch arm 80B supporting the second gear 82 to release engagement of the third gear 83 with the second gear 82. This results in separating the third through seventh gears 83 through 87 from the stepping motor 80 to allow the ribbon winding core driving shaft 74 to rotate with rotation of the platen driving shaft 72 due to pull-out movement of the tape T. The rotation of the ribbon winding core driving shaft 74 makes the ink ribbon R wound on the ribbon winding core 24 with pull-out of the tape T, thus effectively preventing unintentional pull-out of the ink ribbon R with the tape T. When the stepping motor 80 starts rotating, the clutch arm 80B is shifted again towards the third gear 83 to engage the second gear 82 with the third gear 83. Since a free end of the clutch arm 80B is fitted in an opening 80C formed on a base 61 as shown in FIG. 11, the movement of the clutch arm 80B is defined in a relatively small range. This moving range is, however, sufficient to make the clutch arm 80B function as the one-way clutch.

Figure 13:
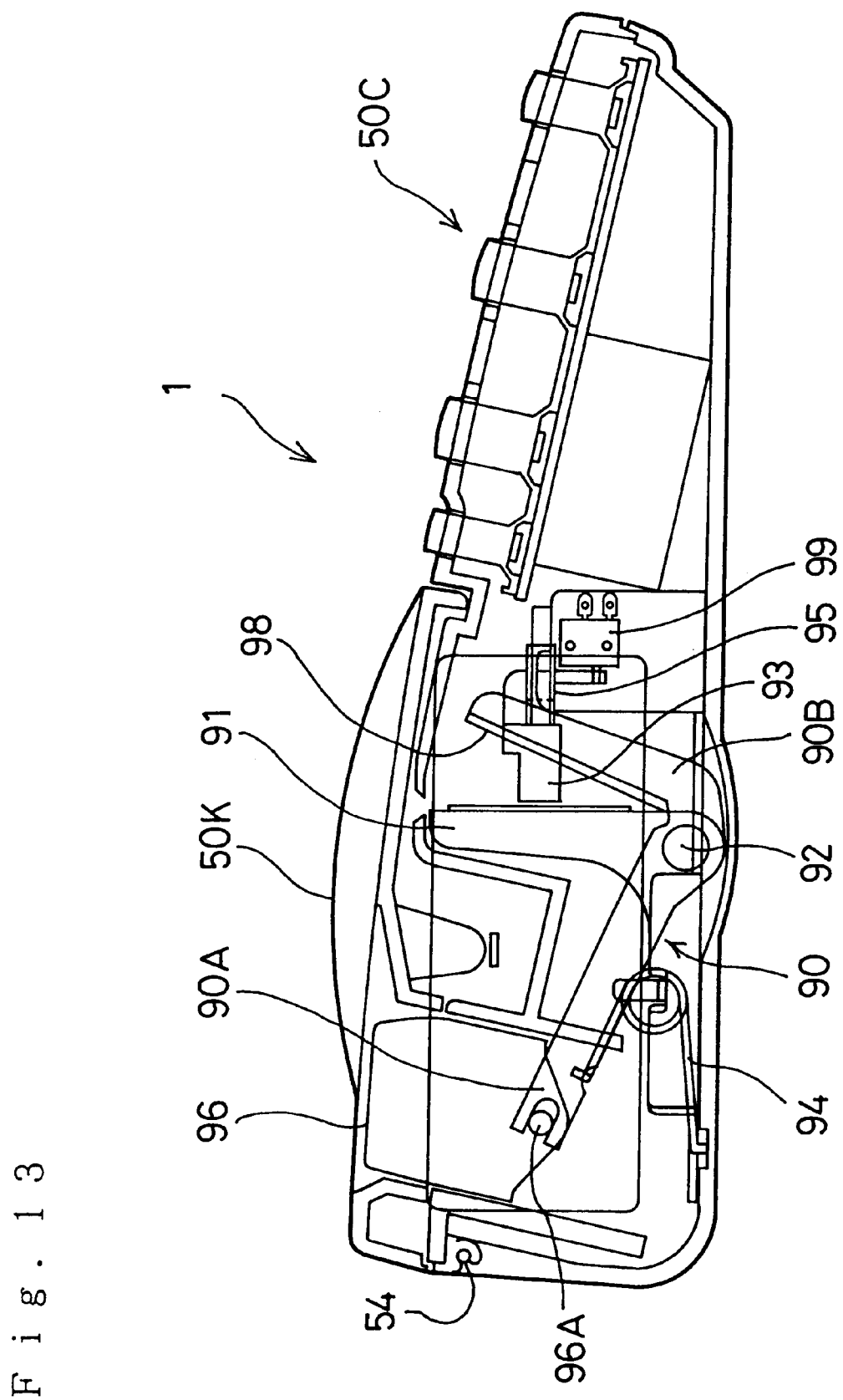
FIG. 13 is an end view showing a cutting mechanism taken on the line XIII—XIII of FIG. 10.

The tape T with the print fed leftward out of the tape cartridge 10 is readily cut with the cutting mechanism, which is shown in detail in FIGS. 10 and 13. FIG. 13 is a cross sectional view mainly showing the cutting mechanism, taken on the line XIII—XIII of FIG. 10. A cutter support shaft 92 protruded from a bottom face of the tape cartridge holder unit 50A holds a substantially L-shaped, pivotably movable tape cutter 90 and a spring 94. A resilient force of the spring 94 keeps the tape cutter 90 under such a condition that a clockwise rotational force is applied onto the tape cutter 90 as shown by the solid line in FIG. 13. With this clockwise rotational force, a left end 90A of the tape cutter 90 presses a cutter button 96 upward. The left end 90A of the tape cutter 90 is formed in a fork shape to receive a pin 96A mounted on a rear face of the cutter button 96. When the cutter button 96 is pressed downward, the left end 90A of the tape cutter 90 shifts downward, accordingly.

A right end 90B of the tape cutter 90 has a movable blade 98 for cutting the tape T, which is arranged at a: predetermined angle apart from a fixed blade 91 attached to a side face of the tape cartridge holder unit 50A. A shoulder 93A of a tape support finger 93 (see FIG. 10) is in contact with a rear face of the right end 90B of the tape cutter 90. The tape support finger 93 is pressed against a feeding path of the tape T by a spring 95 as shown in FIG. 10. When the tape cutter 90 rotates to shift the movable blade 98 towards the fixed blade 91, the tape support finger 93 moves towards the feeding path of the tape T. A fixed wall 97 is disposed opposite to the tape support finger 93 across the feeding path of the tape T. The tape T is fixed between the tape support finger 93 and the fixed wall 97 prior to cutting of the tape T by the movable blade 98 and the fixed blade 91. Movement of the tape support finger 93 is detected by a detection switch 99, which prevents printing during the cutting operation of the tape T as described later.

The tape T is cut by pressing the cutter button 96 downward against the resilient force of the spring 94. When the cutter button 96 is pressed downward to rotate the tape cutter 90 counterclockwise (in FIG. 13), the movable blade 98 formed on the right end 90B of the tape cutter 90 also rotates counterclockwise. The tape support finger 93 and the fixed wall 97 securely hold the tape T therebetween, and the movable blade 98 is gradually overlapped with the fixed blade 91 to cut the tape T.

Figure 14:
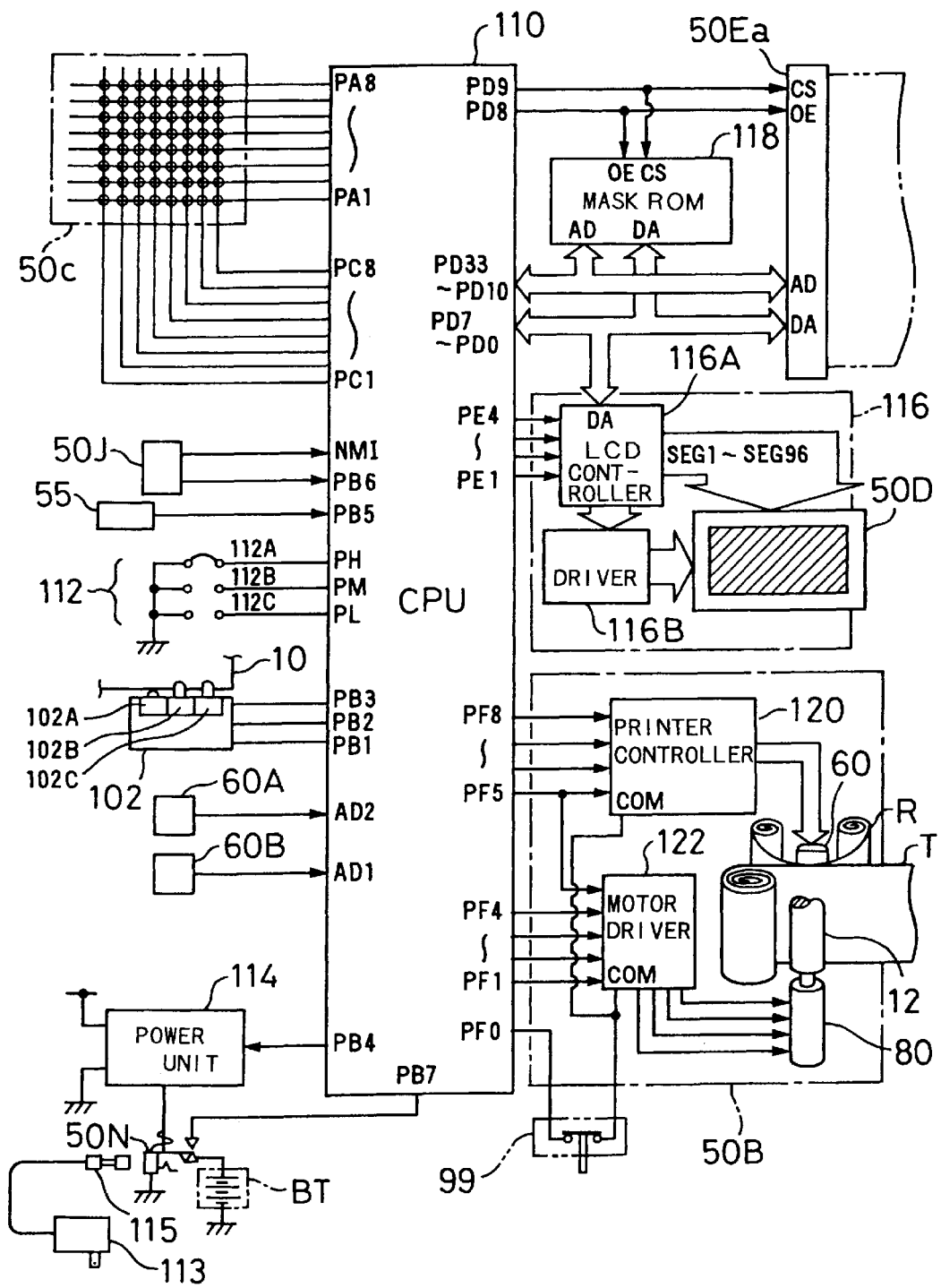
FIG. 14 is a block diagram showing an circuitry structure of tape printing device 1.

Details of the input unit 50C, the display unit 50D, and the printer unit 50B incorporated in the tape printing device 1 are described below after brief description of an electrical structure of the various units including the control circuit unit 50F. The control circuit unit 50F constituted as a printed circuit board is installed with the printer unit 50B immediately below the cover 50K. FIG. 14 is a block diagram schematically showing the general electric structure of the various units. The control circuit unit 50F of the tape printing device 1 includes a one-chip microcomputer 110 (hereinafter referred to as CPU) having a ROM, a RAM, and input and output ports integrally incorporated therein, a mask ROM 118, and a variety of circuits functioning as interfaces between the CPU 110 and the input unit 50C, the display unit 50D, and the printer unit 50B. The CPU 110 connects with the input unit 50C, the display unit 50D, and the printer unit 50B directly or the interface circuits to control these units.

Figure 15:
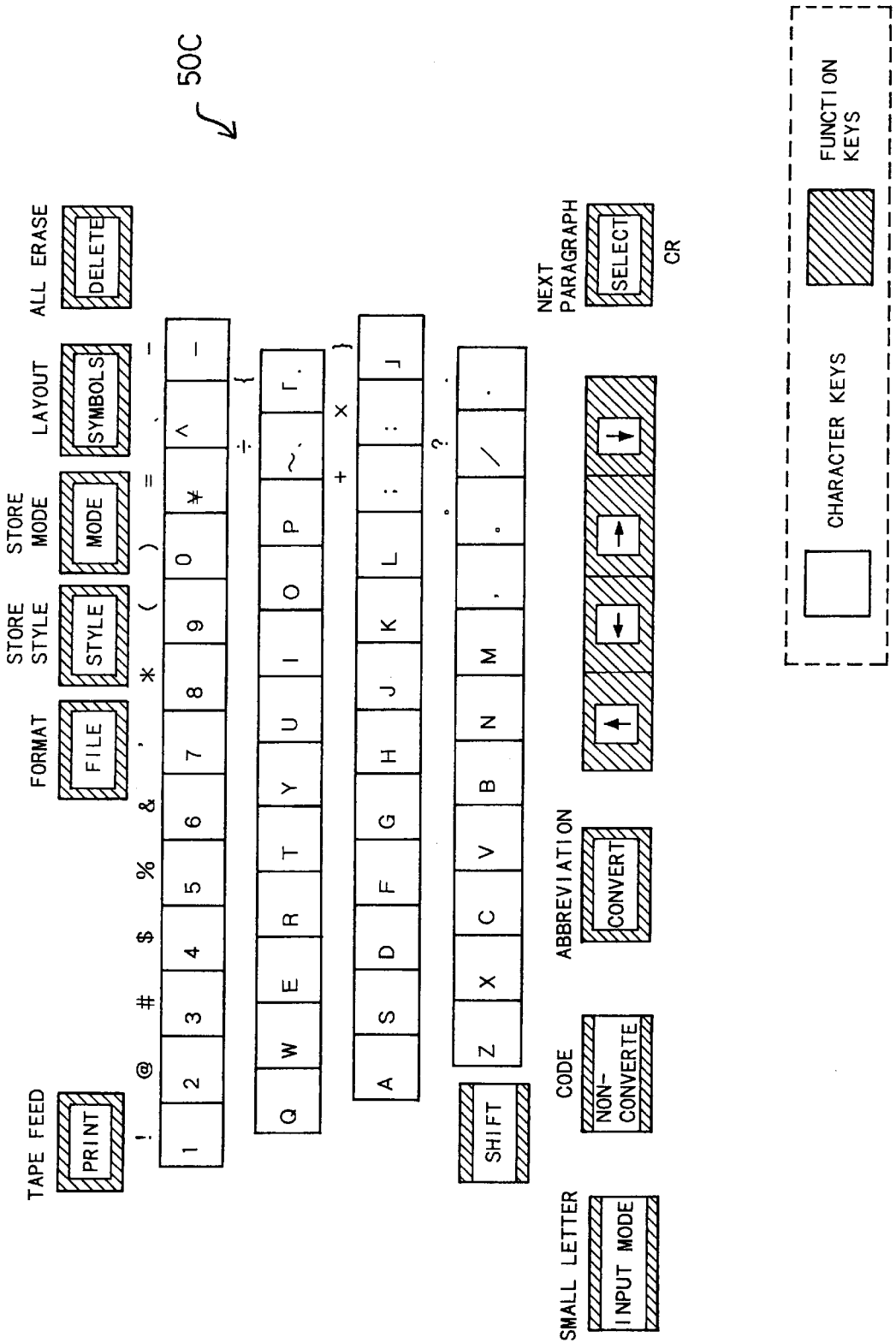
FIG. 15 shows a typical example of a key arrangement on an input unit 50C.

The input unit 50C has forty-eight character keys and fifteen functions keys, sixty-three keys in total, as shown in FIG. 15. The character keys form a so-called full-key structure according to a JIS (Japanese Industrial Standards) arrangement. Like a conventional word processor, the input unit 50C has a commonly known shift key to avoid undesirable increase in the number of keys. The functions keys enhance the ability of the tape printing device 1 by realizing quick execution of various functions for character input, editing, and printing.

These character keys and the function keys are allocated to an 8×8 matrix. As shown in FIG. 14, sixteen input ports PA1 through PA8 and PC1 through PC8 of the CPU 110 are divided into groups, and the sixty-three keys of the input unit 50C are arranged at the respective intersections of the input ports. The power switch 50J is formed independently of the matrix keys and connects with a non-maskable interrupt NMI of the CPU 110. When the power switch 50J is operated, the CPU 110 starts non-maskable interruption to supply or shut off the power.

An output from an opening/closing detection switch 55 for detecting opening and closing of the cover 50K is input to a port PB5, so that the CPU 110 interrupts to monitor the opening and closing conditions of the cover 50K. The opening/closing detection switch 55 detects the movement of the cover 50K according to a movement of an opening/closing detection switch engagement projection 55L (see FIG. 12) disposed on an end of the cover 50K. When the opening/closing detection switch 55 detects opening of the cover 50K while the printing head 60 is driven, the CPU 110 displays a predetermined error command on a main display element 50Da (see FIG. 16) of the display unit 50D and cuts the power supply to the printer unit 50B.

Ports PH, PM, and PL of the CPU 110 are connected with a head rank detection element 112 which adjusts a varied resistance of the printing head 60 by means of a software. The resistance of the printing head 60 significantly varies according to the manufacture process, which changes a power-supply time required for printing of a predetermined density. The head rank detection element 112 measures the resistance of the printing head 60 to determine a rank of the printing head 60 and set three jumper elements 112A, 112B, and 112C of the head rank detection element 112 based on the measurement results. The CPU 110 then reads the conditions of the head rank detection element 112 to correct a driving time or heating amount of the printing head 60, thus effectively preventing the varied density of printing.

Since the printer unit 50B implements thermal transfer printing, the density of printing varies with a temperature and a driving voltage as well as the power-supply time of the thermal printing head 60. A temperature detection circuit 60A and a voltage detection circuit 60B respectively detect the temperature and the driving voltage. These circuits 60A and 60B are integrally incorporated in the printing head 60 and connect with two-channel analog-digital conversion input ports AD1 and AD2 of the CPU 110. The CPU 110 reads voltages input and converted to digital signals through the input ports AD1 and AD2 to correct the power-supply time of the printing head 60.

A discriminating switch 102 disposed on a right lower corner of the tape cartridge holder unit 50A (see FIG. 10) is connected with ports PB1 through PB3 of the CPU 110. The discriminating switch 102 includes three cartridge discriminating switch elements 102A, 102B, and 102C respectively inserted into the three detection holes 18Ka, 18Kb, and 18Kc formed on the tape cartridge 10. Projections of the cartridge discriminating switch elements 102A, 102B, and 102C are designed according to the depths of the detection holes 18K formed on the bottom wall 18 of the tape cartridge 10. When the cartridge discriminating switch element 102 is inserted in a shallow detection hole 18K, the cartridge discriminating switch element 102 is in contact with and pressed by the detection hole 18K to be turned ON. When the cartridge discriminating switch element 102 is inserted in a deep detection hole 18K, on the other hand, the cartridge discriminating switch element 102 is loosely fitted in the detection hole 18K to be kept OFF. The CPU 110 determines the type of the tape cartridge 10 set in the tape cartridge holder unit 50A, that is, the width of the tape T accommodated in the tape cartridge 10 according to conditions of the three cartridge discriminating switch elements 102A, 102B, and 102C of the discriminating switch 102. Tape width information representing the width of the tape T is used for determining a printed character size and controlling the printer unit 50B (described later).

A port PB7 of the CPU 110 receives a signal from a contact of the plug 50N. While the plug 50N receives direct current from an AC adapter 113 through insertion of a jack 115, power supply from a battery BT to a power unit 114 is cut by means of a braking contact to avoid power consumption of the battery BT. In the meantime, a signal output from the contact on the plug 50N is input to the port PB7 of the CPU 110. The CPU 110 reads the signal to determine whether power is supplied from the AC adapter 113 or the battery BT and execute required controls. In the embodiment, when power is supplied from the AC adapter 113, a printing speed of the printer unit 50B is set at a maximum value. When power is supplied from the battery BT, on the other hand, the printing speed of the printer unit 50B is slowed down to reduce an electric current peak supplied to the printing head 60 and save power of the battery BT.

The twenty four mega-bit mask ROM 118 connected to an address bus and data bus of the CPU 110 stores four different fonts of 16×16 dots, 24×24 dots, 32×32 dots, and 48×48 dots. The mask ROM 118 stores alphabetical types such as elite, pica, and courier as well as Chinese characters and other specific characters and symbols required in the respective countries. A 24 bit address bus AD, an 8 bit data bus DA, a chip selecting signal CS, an output enabling signal OE of the mask ROM 118 are connected with ports PDO through PD33 of the CPU 110. These signals are also input to an external input/output connector 50Ea to allow the extension unit 50E attached to the external input/output connector 50Ea to be accessible in a similar manner to the mask ROM 118.

The extension unit 50E directly connectable with the control circuit unit 50F receives a ROM pack or RAM pack optionally supplied as an external memory element. The control circuit unit 50F is electrically connected with the external input/output connector 50Ea through insertion of the ROM pack or RAM pack into a slot of the extension unit 50E, so that information is transmittable between the CPU 110 and the ROM pack or RAM pack. The ROM pack inserted in the extension unit 50E may store specific characters and symbols for drawings, maps, chemistry, and mathematics as well as linguistic fonts other than English or Japanese, and character fonts such as Gothic and handwriting type faces so as to allow editing of a desirable series of characters. The battery backed-up RAM pack which information is freely written in may alternatively be inserted in the extension unit 50E. The RAM pack stores a greater amount of information than a memory capacity of an internal RAM area of the tape printing device to create a library of printing characters or to be used for information exchange with another tape printing device 1.

Character dot data read out of the mask ROM 118 or the extension unit 50E are input to an LCD controller 116A of a display control circuit 116 as well as the CPU 110.

Figure 16:
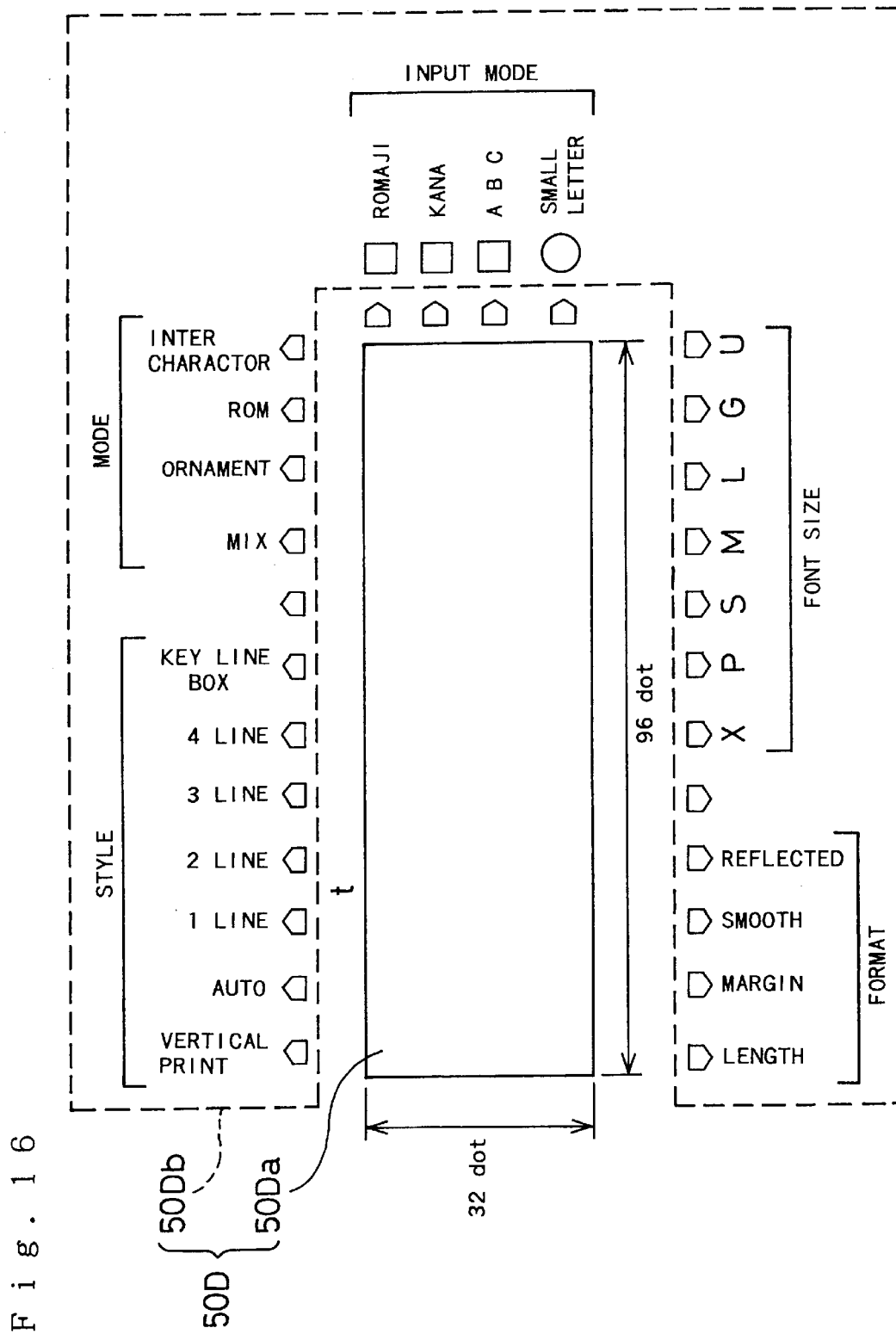
FIG. 16 shows a structure of a display unit 50D.

The display unit 50D controlled by the CPU 110 via the display control circuit 116 is laid under a transparent portion of the cover 50K. The user can thus see the display unit 50D through the cover 50K. The display unit 50D has two different electrode patterns on a liquid-crystal panel; that is, a dot matrix pattern of 32(height)×96(width) dots and twenty eight pentagonal electrode patterns surrounding the dot matrix pattern, as shown in FIG. 16. An area of the dot matrix pattern is designated as a main display element 50Da for displaying a printing image while an area of the pentagonal electrode patterns is referred to as an indicator element 50Db.

The main display element 50Da is a liquid crystal display panel allowing a display of 32 dots in height×96 dots in width. In the embodiment, since a character font of 15 dots in height×16 dots in width is used for character input and editing, a display on the main display element 50Da includes twelve characters×two lines. Alternatively, the main display element 50Da may include four lines of letters when only an alphabetical font is used. Each character is shown as a positive display, a negative display, or a flickering display according to the editing process.

Figure 17:
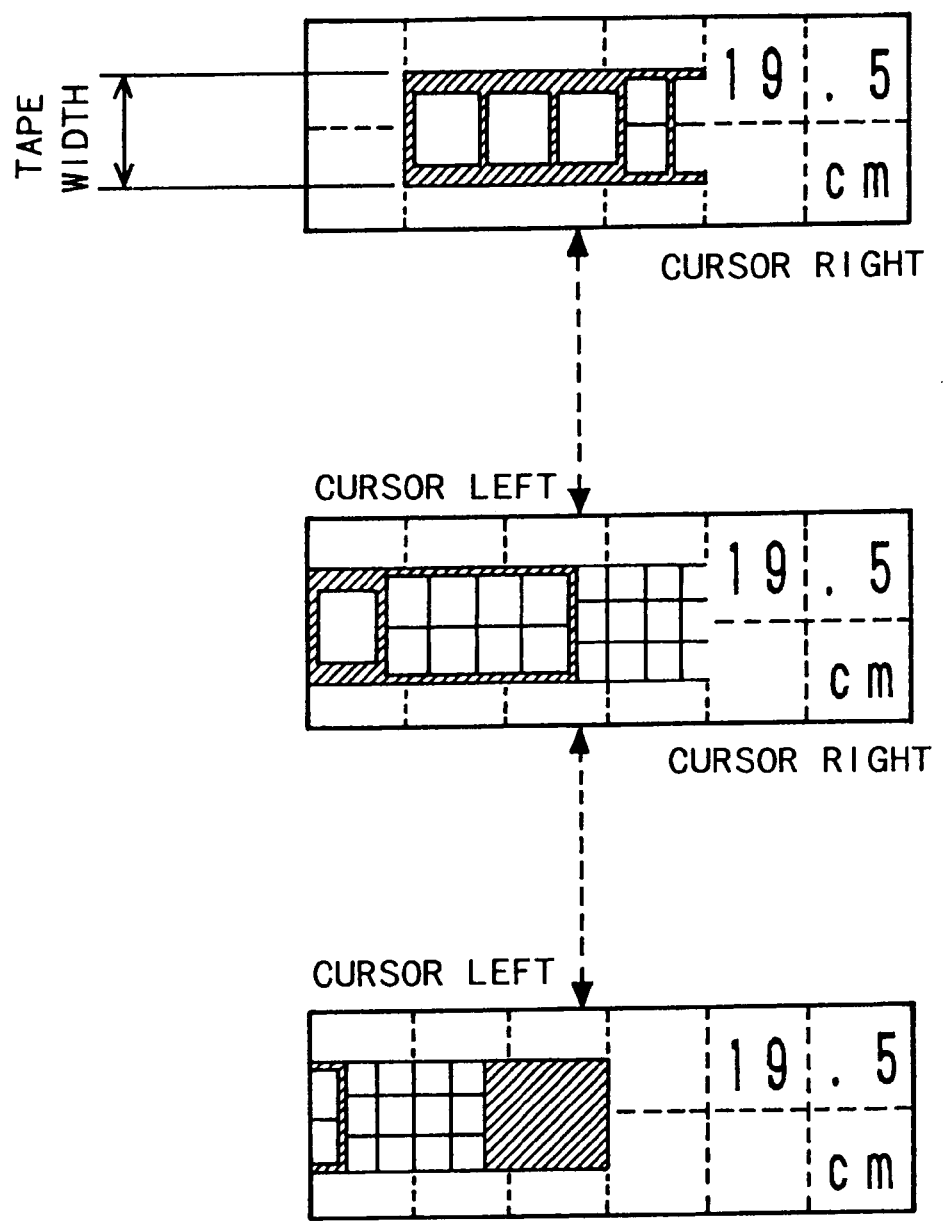
FIG. 17 shows an exemplified layout displayed on the display unit 50D.

The display on the dot-matrix main display element 50Da is controlled according to the requirement. For example, a layout of a printing image may be displayed after a certain key input operation. When the user instructs display of a layout, as shown in FIG. 17, a tape width is shown as a negative display and a series of printing characters are displayed in white, where each dot of the main display element 50Da corresponds to 4×4 dots in printing. A whole length of the tape is displayed numerically as supplementary information of the printing image. When the layout of the printing image is larger than the area of the main display element 50Da, the whole layout may be observed and checked through vertical or horizontal scroll with cursor keys operation.

The indicator element 50Db surrounding the main display element 50Da displays a variety of functions executed by the tape printing device 1. Display elements t each corresponding to a pentagonal electrode pattern of the indicator element 50Db represent a variety of functions and conditions printed around the pentagonal patterns of the display unit 50D. These functions and conditions include a character input mode such as 'romaji' (Japanese in Roman characters) or 'small letter', a printing and editing style such as 'line number' and 'keyline box', and a print format like 'justification' or 'left-weight'. When a function or a condition is executed or selected, the display element corresponding to the function or condition lights up to inform the user.

The printer unit 50B of the tape printing device 1 includes the printing head 60 and the stepping motor 80 as mechanical constituents, and a printer controller 120 for controlling the mechanical constituents and a motor driver 122 as electrical constituents. The printing head 60 is a thermal head having ninety-six heating points arranged in a column at a pitch of 1/180 inch, and internally provided with the temperature detection circuit 60A for detecting the temperature and the voltage detection circuit 60B for detecting the supply voltage as described previously. The stepping motor 80 regulates a rotational angle by controlling a phase of a four-phase driving signal. A tape feeding amount of each step by the stepping motor 80 is set equal to 1/360 inch according to the structure of the gear train functioning as a reduction gear mechanism. The stepping motor 80 receives a two-step rotation signal synchronously with each dot printing executed by the printing head 60. The printer unit 50B thereby has a printing pitch of 180 dots/inch in the longitudinal direction of the tape as well as the direction of the tape width.

A detection switch 99 for detecting operation of the cutting mechanism is connected to a common line of connecting signal lines between the printer controller 120, the motor driver 122, and the CPU 110 as shown in FIG. 14. When the cutting mechanism is driven during printing operation, the detection switch 99 detects operation of the cutting mechanism and inactivates the printer unit 50B. Since signals are continuously sent from the CPU 110 to the printer controller 120 and the motor driver 122, printing may, however, be continued after the user interrupts to use the cutting mechanism.

Actuation of the cutting mechanism during a printing process interferes with normal feeding of the tape T. The detection switch 99 of the embodiment is thus directly connected with the common line of the motor driver 122 to forcibly cut the power off so as to immediately stop the printing process or more specifically the tape feeding. In an alternative structure, an output of the detection switch 99 may be input to the CPU 110, and the printer unit 50B is inactivated according to a software as is the case of untimely opening of the cover 50K. The detection switch 99 may be replaced by a mechanical structure which presses the clutch arm 80B according to the movement of the movable blade 98 to prevent rotation of the stepping motor 80 from being transmitted to the platen driving shaft 72.

The tape printing device 1 is further provided with a power unit 114, which receives a stable back-up or logic circuit 5V power from the battery BT by an RCC method using an IC and a transformer. The CPU 110 includes a port PB4 for regulating the voltage.

Figure 18:
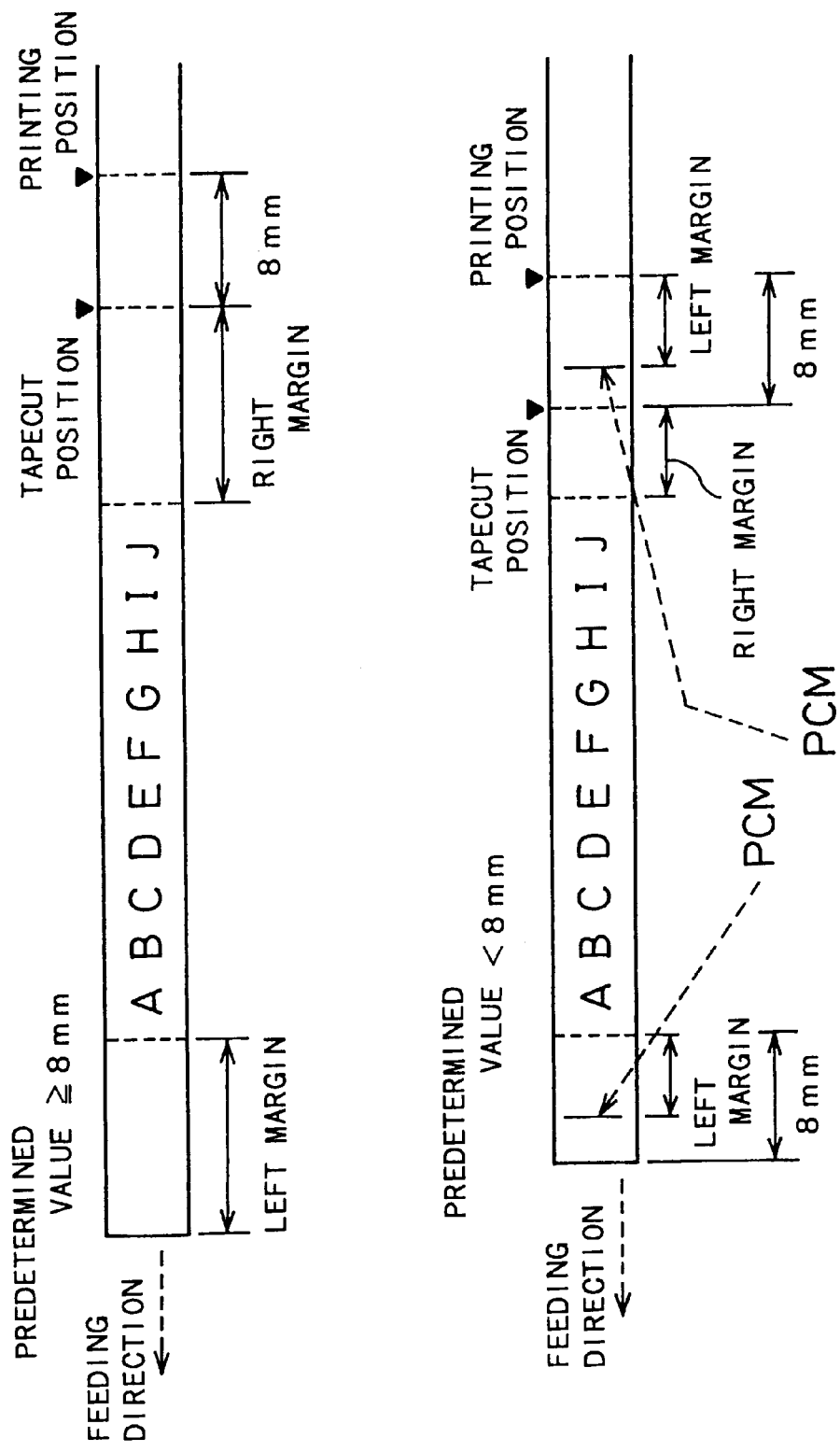
FIG. 18 shows typical examples of left and right margins set on the tape.

The tape printing device 1 of the embodiment has a margin setting function for setting specified lengths of left and right margins before and after a series of printing characters as shown in FIG. 18. The margin setting function is realized by a left margin tape-feeding phase control signal output prior to transmission of 96 bit serial printing data and a right margin tape-feeding phase control signal output after transmission of all the serial printing data. When a specified length of the left margin is smaller than a predetermined distance between a printing position and a tape cut position (less than 8 mm in the embodiment), the specified length of the left margin can not be set. In such a case, while the tape T is fed by a specified length of the right margin after completion of printing, a cut mark PCM is printed when the printing head 60 is positioned before a subsequent printing position by the specified length of a subsequent left margin. The user can cut the tape T fed out of the tape cartridge 10 at the position of the cut mark PCM. Labels having a desirable length of the left margin are obtained by such a simple process.

The internal ROM of the CPU 110 stores a variety of programs for controlling the peripheral circuits. The internal RAM of the CPU 110 includes a first part designated as a system's area used for execution of the variety of programs stored in the internal ROM and a second part defined as a user's area including a text area for character editing and a file area for storing contents of the text.

The text area receives 125 characters of fixed input at the maximum, and stores character codes as well as style data and mode data used for editing the characters. The memory contents in the text area may be supplemented or updated according to character input and editing operation.

The internal RAM has a file area of 1,500-character capacity while the optionally supplied RAM pack has a file area of 2,000-character capacity. The file area stores and manages a maximum of 99 variable length files having ID numbers of 1 through 99 according to a file management program stored in the internal ROM. The file management program is also used for basic operations such as file register and file delete.

Figure 19:
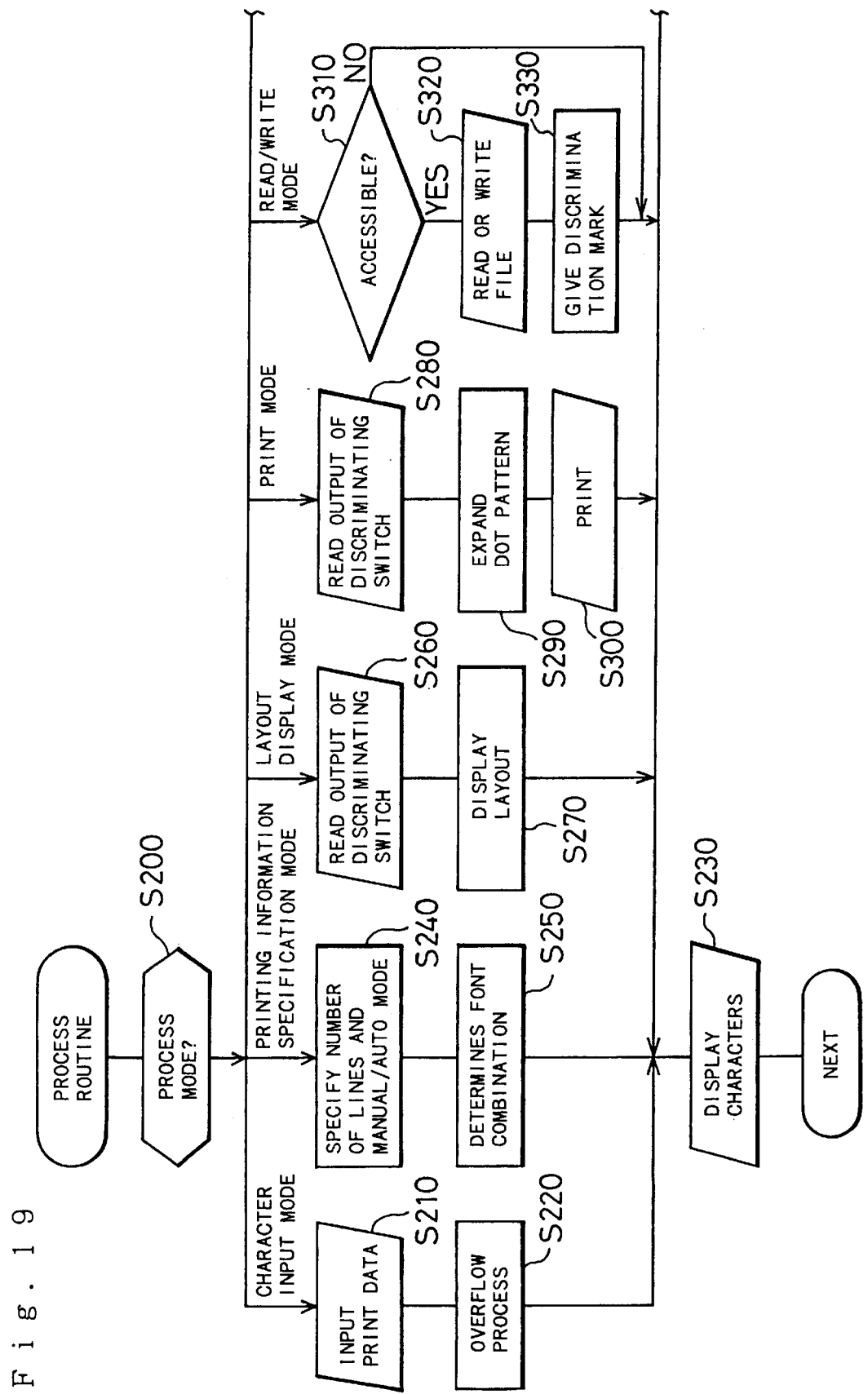
FIG. 19 is a flowchart showing an essential process routine executed by the CPU 110 of the tape printing device 1.

An essential process routine executed by the CPU 110 of the tape printing device 1 of the embodiment is described according to the flowchart of FIG. 19. The tape printing device 1 has a variety of operation modes including a printing information specification mode and a layout display mode. The tape printing device 1 is set in one of the operation modes in response to a press of a corresponding function key on the input unit 50C. When no function keys are operated but a character key is pressed, character data corresponding to the character key is input.

When the program enters the process routine of FIG. 19, the process mode is first identified at step 200. When no specific operation mode is specified, the tape printing device 1 is determined to be in a character input mode and wait for input of character data at step 210. Character data corresponding to alphabets and figures input from the input unit 50C are directly transferred to a print data buffer whereas those corresponding to 'kana' (Japanese alphabets) are sent to the print data buffer after a required conversion of some 'kana' to 'kanji' (Chinese characters).

Character data newly input from the input unit 50C are generally added to the end of print data stored in the print data buffer, or may be inserted into any desirable position of an existing series of input characters with the aid of cursor positioning. Alternatively, the newly input character data may be over-written to replace the existing input characters.

The print data buffer stores 125 characters at the maximum. When print data over the 125-character capacity are input from the input unit 50C, the CPU 110 executes an overflow process at step 220. In the case of 'kanal' input, the overflow process is executed after conversion to 'kanji'. The overflow process eliminates character data exceeding the 125-character limit from the end of print data stored in the print data buffer in either case when input character data are added to the end of the print data or when input character data are inserted at a desirable position of the print data.

After the overflow process, the program goes to step 230 at which a series of characters finally settled are displayed on the display unit 50D. The display unit 50D has a display range of six characters by two lines at most, where each line has a line head mark representing a line number. The line head mark occupies a one-character space (16 bits) in the print data buffer, and includes a flag for identifying a line head mark (2 bits), line number data (2 bits for the maximum of four lines), font style data (3 bits for 7 font styles), font data (5 bits including identification of an internal font or an external font), line spacing and inter-character spacing information (4 bits). The line head mark is generally shown as a highlighted numeral representing a line number, as described later. After the display process of step 230, the program goes to 'NEXT' and exits from the routine.

When the printing information specification mode is selected, the program goes to step 240 at which required printing information is specified, and either 'AUTO' mode or 'MANUAL' mode is selected for plural-line printing. The required printing information includes a number of printing lines, a font style (for example, bold, italic or slant, underlined, outlined, and highlighted), an inter-character spacing (narrow, standard, wide), a line spacing (narrow, standard, wide), and font data representing an internal font or an external ROM font. Each printing information is specified by selecting a desirable one out of a plurality of choices previously prepared. For example, the number of printing lines is selected among '1', '2', '3', and '4' since the maximum number of printing lines is set equal to four in the embodiment. The auto/manual mode for plural-line printing is determined by selecting either 'AUTO' or 'MANUAL'. The plurality of choices are successively highlighted on the display unit 50D through operation of the cursor keys and the space key. The user presses the 'Select' key on the input unit 50C to settle each printing information selected.

In the structure of the embodiment, when print data exist in a plurality of lines in the print data buffer, a number of lines set at step 240 should be equal to or greater than the plurality of lines. When no print data exist in one or more lines after specification of plural-line printing, on the contrary, the line number set at step 240 may be less than the line number previously specified. For example, when print data exists only in one line under such a condition that three-line printing is previously specified as shown in FIG. 20A, the number of lines set at step 240 may be any number between 1 and 4. When print data exists in two lines as shown in FIG. 20B, the number of lines set at step 240 may be equal to 2, 3, or 4. In the tape printing device 1 of the embodiment, 'Style' includes specification of the number of printing lines and horizontal or vertical printing, and 'Mode' denotes specification of other printing data such as inter-character spacing as shown in FIG. 16.

When plural-line printing is specified, the program goes to step 250 at which a desirable font combination is determined. The tape printing device 1 of the embodiment includes four different font data of 16×16 dots to 48×48 dots as basic fonts in the mask ROM 118 as shown in FIG. 21. In each font, the height and the width are respectively expandable by two times and four times. There are thus ten possible combinations of printable dots or fonts including the maximum font of 96×192 dots as shown in FIG. 21. When a series of characters are printed in a plurality of lines, specification of the font for printing characters on each line is required as well as input of characters to be printed on the line.

In the embodiment, there is a specific mode for inputting a relative size of characters to be printed on each line through key operation of the input unit 50C, instead of directly specifying the character font. For example, in three-line printing, the character size is relatively large on the first line and the second line, and relatively small on the third line. The tape printing device 1 of the embodiment is further provided with a simpler mode, wherein the user selects an optimal combination of relative character sizes out of a plurality of standard combinations. There are five options for three-line printing as shown in FIG. 22; that is, (1) same character size x3, (2) small, small, large, (3) small, large, large, (4) large, small, small, and (5) large, large, small. The user selects one of these five options instead of inputting the relative character size of each line. The device 1 of the embodiment also has a manual mode wherein the user manually determines a font size of characters printed on each line. In this manual mode, the user should confirm that a total dot number of plural lines is within 96 in the direction of the height. The desirable font may be specified from a variety of layouts displayed on the display unit 50D as shown in FIG. 23.

After the desirable font combination is specified at step 250, the program proceeds to step 230 for displaying input characters. In the display process of step 230, when two or more line printing is specified, each line has a highlighted line head mark, for example, '1' or '2' as shown in FIG. 24. When 'MANUAL' mode is selected, all the line head marks are shown as highlighted numerals. In 'AUTO' mode, on the other hand, the line head mark for a vacant second or subsequent line with no print data is displayed in a standard style, that is, as a non-highlighted numeral with a frame. In the latter case, after character data are input in the vacant second or subsequent line at steps 210 and 220, the line head mark is changed to a highlighted numeral as shown in the bottom drawing of FIG. 24.

Figure 25A:
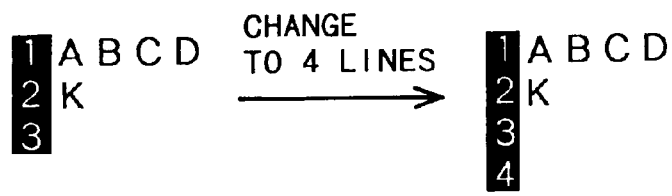
FIGS. 25A and 25B show increase and decrease of printing lines when specification of the line number is changed.
Figure 25B:
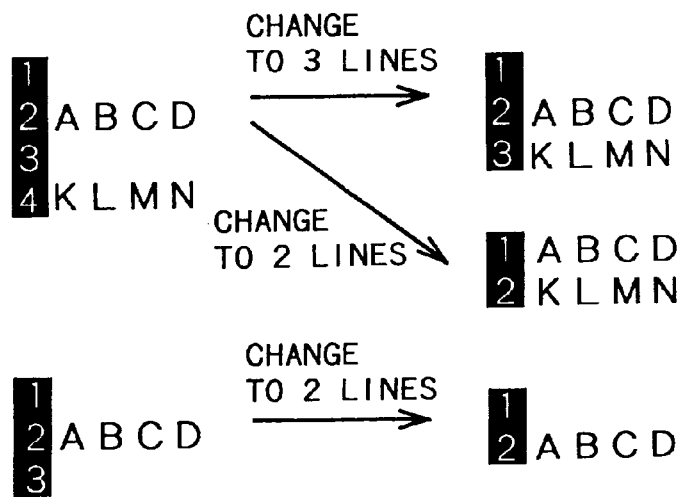

The number of printing lines newly set at step 240 may be different from the number of existing lines previously specified. When the line number is increased, as shown in FIG. 25A, a vacant line with no print data is added to the end of the existing lines. When the smaller number of lines are specified at step 240, on the contrary, there exists at least one line with no print data as described above. In such a case, the line with no print data is deleted. When there are a plurality of lines with no print data, a lower number line with no print data is first deleted as clearly seen in FIG. 25B. In a modified structure, a new line may be added to the top of the existing lines or an upper existing line with no print data may be deleted first.

When the layout display mode is selected at step 200, the program goes to step 260 at which the CPU 110 reads an output of the cartridge discriminating switch 102, which represents the type of tape cartridge 10 set in the tape printing device 1, and more specifically, the printable width of the tape T. After identification of the width of the tape T, the program goes to step 270 to display a layout based on the number of printing lines currently specified and specification of the font combination. A standard layout displayed on the display unit 50D is shown in FIG. 17. FIG. 26A and 26B show other exemplified layouts when no tape cartridge 10 is set in the tape printing device 1 and when the 'Style', and 'Mode' (including the number of lines and the font combination as mentioned above) currently specified do not agree with the tape width of the tape cartridge 10 set in the tape printing device 1.

When the width of the tape T agrees with the 'Style' and 'Mode' as shown in FIG. 17, the tape T is shown black and characters are shown white. When the tape T is not set in the tape printing device 1, the tape T is not displayed and characters (with a frame line according to the requirements) are shown black as seen in FIG. 26A. This black character display distinctively shows no setting of the tape T.

When the width of the tape T is insufficient for the currently specified 'Style' and 'Mode', a portion out of the tape width is highlighted as shown in FIG. 26B. In either case of FIG. 26A or 26B, an acoustic or visual alarm may also inform the user of non-tape setting or inappropriate tape setting. After the layout display process of FIG. 24, the program goes to step 230 for standard character display.

When a print mode is selected at step 200, the program goes to step 280 at which the CPU 110 reads detection signals output from the cartridge discriminating switch 102. The CPU 110 determines the width of the tape T set currently set in the tape printing device 1 based on the detection signals from the cartridge discriminating switch 102, and expands a dot pattern of each printing line according to the tape width and the relative character size of each line by referring to a font map previously stored in the internal ROM at step 290. The dot pattern of each line is expanded in the following manner.

A font of each line is uniquely determined according to the relative character sizes of a plurality of lines and the tape width as shown in FIGS. 21 and 22. For example, in three-line printing, when the tape width is 12 mm and the relative sizes are 'large, small, small', the selected font is S for the first line and P for the second and the third lines. In two-line printing, the font of each line is determined in the same manner as above (its procedure is not described here).

After determination of the font for each line, the CPU 110 successively reads the determined font corresponding to character codes representing a desirable series of characters previously input by the user, out of the mask ROM 118, and expands the font to a dot pattern. After completing the dot pattern expansion at step 290, the program goes to step 300 for printing process. More concretely, the CPU 110 creates 96 bit serial data by extracting the dot pattern by every column, and transfers the serial data to the printer unit 50B.

A series of characters stored in the print data buffer are then printed according to 'AUTO' mode or 'MANUAL' mode. In 'MANUAL' mode, print data stored in the print data buffer are printed according to the number of lines previously specified. After plural-line printing, for example, two-line printing, is specified and print data are input for two lines, print data on the second line may be eliminated according to the requirements. In such a case that the user eliminates print data on the second line, print data for only the first line should be printed. In 'AUTO' mode, when no print data exists on the second line, only the first line is determined as a printing line and a font of a large font size is expanded to a dot pattern as shown in FIG. 27A. When print data exist on both the first and the second lines, on the other hand, another font of a smaller font size is selected for printing data on both the first and the second lines as shown in FIG. 27B. In 'MANUAL' mode shown in FIG. 27C, even when no print data exists on the second line, a selected font is identical with that for the two-line printing of FIG. 27B, and only the first line is printed by the selected font. This printing procedure is applied to any plural-line printing such as three-line printing or four-line printing as well as two-line printing described above.

In the tape printing device 1 of the embodiment, print data input from the input unit 50C can be stored as a file in the internal RAM having a 1,500 character capacity and in the extension unit 50E having a 2,000 character capacity. When a read/write mode is selected at step 200, the program goes to step 310 at which it is determined whether a file is accessible. In the write mode, file accessibility implies existence of a vacant space for storing a new file in the internal RAM or the extension unit 50E. In the read mode, file accessibility denotes existence of a previously recorded file. When the file is not accessible at step 310, the program goes to step 230 (character display step) after displaying error message 'out of access'. When the file is accessible at step 310, on the contrary, the program goes to step 320 at which a series of characters currently stored in the print data buffer are recorded as a file in the write mode, or a series of characters previously recorded are read out to the print data buffer in the read mode.

When a series of characters in the print data buffer are recorded as a file, attribute information of the characters, that is, 'Mode' and 'Style' described above, is recorded together. More concretely, information including the number of printing lines, the specified font, the inter-character spacing, the line spacing, and the font style (bold, outlined, underlined, italic or slant) is recorded with print data. In the read mode, print data are called out with attribute information to the print data buffer. When print data newly input from the input unit 50C exists in the print data buffer, read-out print data are added to the end of the existing print data in the print data buffer. In this case, when attribute information of the read-out print data is different from that of the existing print data, a discrimination mark is given to the read-out print data at step 330.

Figure 28:
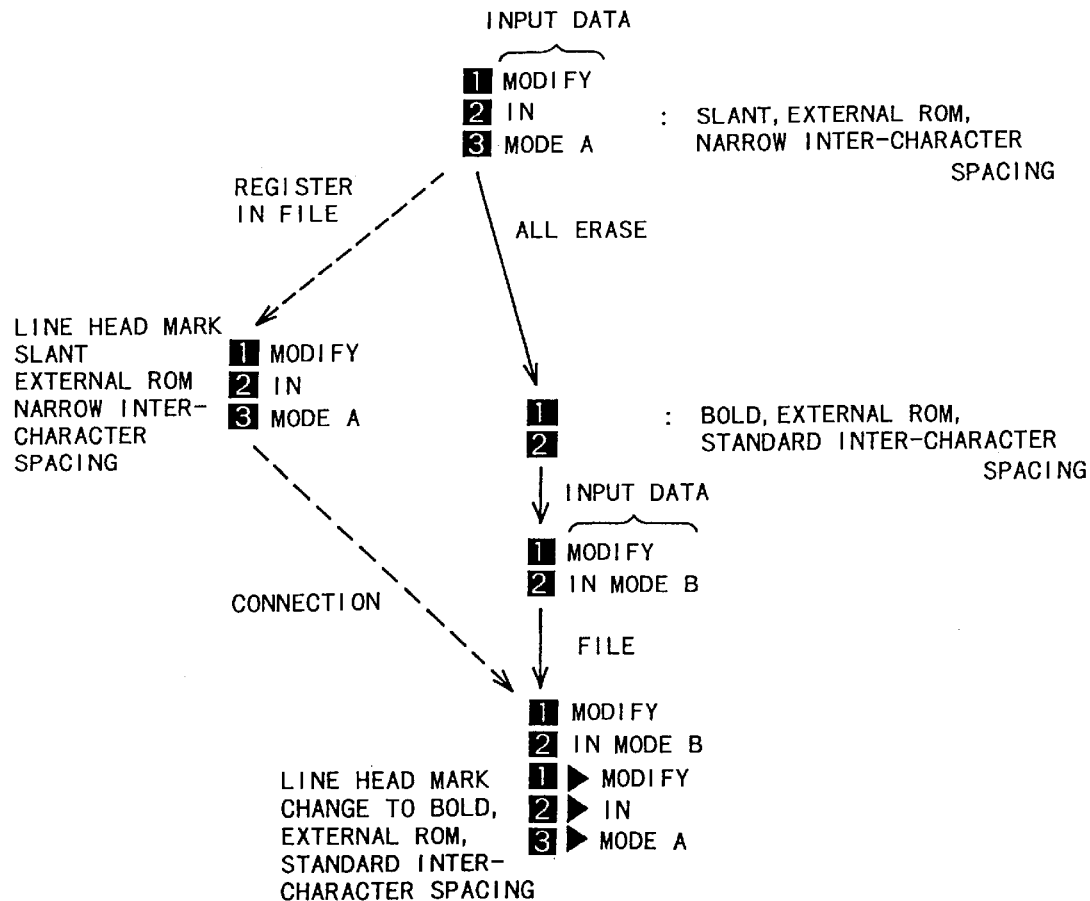
FIG. 28 shows connection of read-out print data recorded in a file with newly input print data in a print data buffer.

The discrimination mark, for example, a rightward closed triangle is placed immediately after the line head mark as shown in FIG. 28. The discrimination mark contains information such as the font style and the inter-character spacing as the line head mark. The read-out print data connected to the existing print data in the print data buffer includes current attribute information set in the line head mark and attribute information recorded in a file in the discrimination mark placed immediately after the line head mark. As a result, the newly input print data are printed according to the current attribute information whereas the read-out print data with the discrimination mark are printed according to the attribute information recorded in the file. When a new paragraph is set after the read-out print data, the attribute information of the read-out print data set in the discrimination mark does not affect attribute of new print data input into the new paragraph. When it is preferable to change the attribute of the read-out print data to be identical with the attribute of print data input from the input unit 50C and stored before the read-out print data in the print data buffer, the discrimination mark is to be eliminated.

The tape printing device 1 of the embodiment may be set and operated in a variety of modes other than the typical operation modes described above (explanation of the other operation modes are omitted here).

In the tape printing device 1 constructed as above, an adequate font for printing each line is determined according to the relative character sizes of a plurality of lines and the tape width specified prior to printing. The tape printing device 1 thus prints out a series of characters according to a suitable font on a tape T of a desirable width without any troublesome management or control.

The user of the tape printing device 1 performs a variety of operations according to his vague image of a printing tape having a series of characters printed thereon, and generally does not have a concrete idea which font or what font size is preferred. In the conventional printing device, the user should specify the exact character size by referring to printing samples. In the tape printing device 1 of the embodiment, on the other hand, the user should determine the relative character size of each line according to his vague image. The printing device 1 then automatically determines a suitable size of the font for printing each line. This structure makes the user free from troublesome management of the tapes T having different widths, complicated calculation of the dot number of the font, or other time-consuming operations required for desirable printing.

In 'AUTO' mode, when two-line printing is specified, different prints can be obtained according to existence of print data on the second line. When the user eliminates print data on the second line after specification of two-line printing, the tape printing device 1 identifies the situation and automatically changes the printing condition to one-line printing. This 'AUTO' mode dramatically improves the usability and working efficiency of the tape printing device 1. The 'AUTO' mode and 'MANUAL' mode are clearly distinguished from each other based on display of the line head mark as described previously.

When the tape T is not set in the tape printing device 1 or when the tape width is insufficient for the specified Style and Mode, the layout display function of the tape printing device 1 distinctively informs the user of the problem. Although printing process is not executed in a latter case in the above embodiment, the device 1 may have a supplementary function of executing automatic reduction or display of possible choices after alarming insufficiency.

In the tape printing device 1 of the embodiment, print data may be recorded with its attribute information in a file or read out and added to existing print data in the print data buffer. When attribute of the read-out print data is different from that of the existing print data, a predetermined discrimination mark is given to the read-out print data for appropriate printing according to the corresponding attribute information. Elimination of this discrimination mark allows printing of both the read-out print data and the existing print data in the same styles and modes.

A second embodiment of the invention is described hereinafter according to the drawings. A tape printing device 501 of the third embodiment is applicable to tapes of five different widths, 6 mm, 9 mm, 12 mm, 18 mm, and 24 mm like the first and the second embodiments. The appearance of the tape printing device 501 is similar to that of the first or the second embodiment.

(A) General Structure

Figure 29:
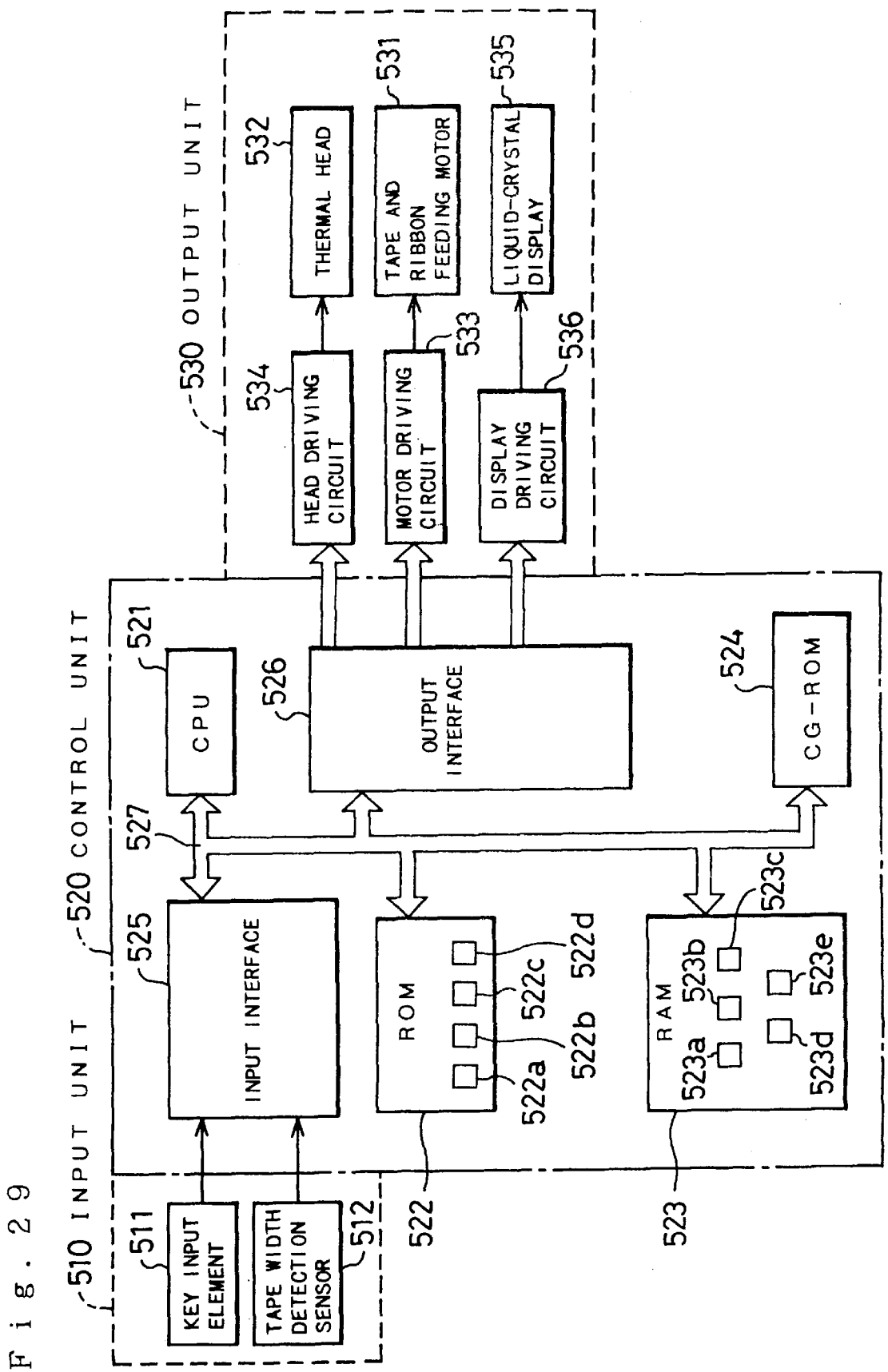
FIG. 29 is a block diagram illustrating a general electric structure of a second embodiment in accordance with the invention.

FIG. 29 is a functional block diagram illustrating a general electric structure of the tape printing device 501.

As shown in FIG. 29, the tape printing device 501 includes an input unit 510, a control unit 520, and an output unit 530 as in the case of a conventional data processing apparatus. The control unit 520 executes required processing based on information from the input unit 510 and activates the output unit 530 to display or print the results of the processing.

The input unit 510 includes a key input element 511 having a plurality of press-down keys and dial keys (not shown in detail), and a tape width detection sensor 512. The key input element 511 generates character code data and various control data sent to the control unit 520. The tape width detection sensor 512 detects the width of a tape T currently set in the tape printing device 501 and gives the tape width information to the control unit 520. Each tape cartridge has a physical discrimination element such as a plurality of holes for defining the width of the tape T accommodated in the tape cartridge. The tape width detection sensor 512 reads the physical discrimination element to output the tape width information. Details of this processing are similar to those of the first embodiment and thereby not described here.

In the tape printing device 501 of the third embodiment, the key input element 511 has a variety of margin setting keys for specifying left and right margins arranged before and after a series of characters printed on the tape T. These margin setting keys may have other functions and be realized as complex-functional keys. The tape width information detected by the tape width detection sensor 512 is utilized as one determining factor for determining the left and right margins.

The output unit 530 consists of a printing structure and a display structure. For example, a tape and ribbon feeding motor 531 constituted as a stepping motor feeds a tape (not shown) and an ink ribbon (not shown) to a predetermined printing position or out of the tape printing device 501. A thermal head 532 is fixed to implement thermal transfer printing onto a running tape. When the thermal head 532 has ninety six thermal resistance elements (hereinafter referred to as dot elements) arranged in a column, a maximum of 96 dots may be printed at once. The tape and ribbon feeding motor 531 and the thermal head 532 are respectively driven by a motor driving circuit 533 and a head driving circuit 534 under control of the control unit 520. Desirable margins may be set in each label by controlling a tape feeding amount by the tape and ribbon feeding motor 531 and a printing timing of a front cut mark by the thermal head 532 as described later. A cutter (not shown) manually operated by the user or driven by the motor is used for cutting the tape at a desirable position. The cutter is naturally disposed a predetermined space apart from the thermal head 532 because of their physical dimensions. The predetermined space (for example, 8 mm) is taken into account when the margins are set on the tape.

The output unit 530 of the tape printing device 501 further includes a liquid-crystal display 535 which shows several characters of a minimum font on a plurality of lines. The liquid-crystal display 535 is driven by a display driving circuit 536 under control of the control unit 520. During a margin length setting process, an image including margins currently set is displayed on the liquid-crystal display 535.

The control unit 520, for example, realized as a microcomputer, includes a CPU 521, a ROM 522, a RAM 523, a character generator ROM (CG-ROM) 524, an input interface element 525, and an output interface element 526, which are connected to one another via a system bus 527.

The ROM 522 stores a variety of processing programs and fixed data such as dictionary data used for conversion of Japanese alphabets into Chinese characters. For example, the ROM 522 stores a print format setting program 522a including a margin length setting process and a printing program 522b including a margin setting process . The ROM 522 further stores a default value 522c of a print format including margin lengths (described later) as well as a margin conversion table 522d used for converting relative margin lengths to absolute values.

The RAM 523 used as a working memory stores fixed data obtained through input operation by the user. The RAM 523 includes a print format area 523a for storing a print format including margin lengths, a printing buffer 523b for expanding a series of printing characters to dots and storing the dots, a display buffer 523c for storing an image displayed for setting margin lengths, a text area 523d for storing character data, and a previous right margin buffer 523e for storing a right margin length in previous printing.

The CG-ROM 524 stores a dot pattern of characters and symbols in the tape printing device 501, and outputs the dot pattern when receiving code data specifying certain characters and symbols. The control unit 520 may include two CG-ROMs, one for display and the other for printing.

The input interface element 525 functions as an interface between the input unit 510 and the control unit 520 while the output interface element 526 works as an interface between the control unit 520 and the output unit 530.

The CPU 521 executes a required processing program stored in the ROM 522 based on input signals from the input unit 510 while using the RAM 523 as a working area and reading the fixed data stored in the ROM 522 and the RAM 523 according to the requirement. The CPU 521 then activates the output unit 530 to display processing conditions or results on the liquid-crystal display 535 or to print the same on a tape.

(B) Concept of 'Paragraph'

A concept of 'paragraph' is explained according to FIG. 30. The paragraph denotes a unit for defining a configuration of characters on a label (a piece of tape cut at a predetermined position) and consists of one or more printing lines (4 lines at the maximum in the embodiment) printed in one column on the label. A label design is determined as collection of paragraphs along a length of the label.

Unlike the concept of a conventional 'Page', insertion or elimination of characters and increase or decrease in the line number in each paragraph do not affect another paragraph at all. Character information in a certain paragraph is thus not moved to another paragraph in printing.

FIG. 30 shows an example of a print on a label, which consists of three paragraphs. A first paragraph includes characters of a smaller size printed horizontally in two lines, a second paragraph includes characters of a larger size printed vertically in one line, and a third paragraph includes characters of a largest size printed horizontally in one line.

In the embodiment, attribute information of each paragraph (hereinafter referred to as style) includes 'Vertical/Horizontal' data, 'Size' data, and 'Ornament' data as shown in FIG. 31. The 'Vertical/Horizontal' data determines whether characters in each paragraph are printed vertically or horizontally. This prevents horizontal printing and vertical printing from being mixed in one paragraph. The 'Size' data first shows whether the number of lines in each paragraph and the character size in each line are determined in 'Auto' setting or manual setting. In the manual setting, the 'Size' data shows the number of lines and a combination of relative character sizes of the lines to ensure adequate printing. The 'Ornament' data defines no ornament, a keyline box, or a combination of a keyline box and screen in each paragraph.

Introduction of such paragraphs require printing and data input processes different from those of the conventional printing device.

(C) Paragraph-related Processing in Response to Power-ON Operation

Figure 32:
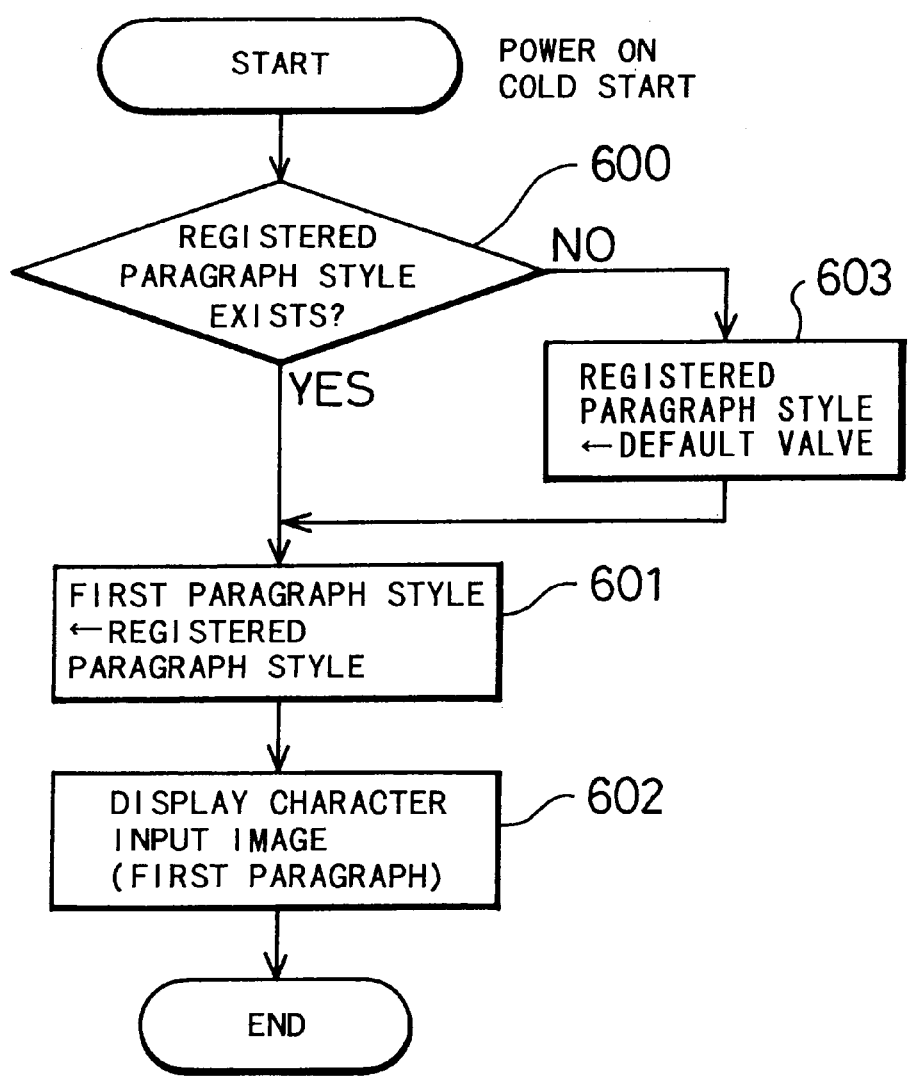
FIG. 32 is a flowchart showing a paragraph-related process routine executed at the time of cold start.

When the power switch of the tape printing device 501 is turned ON, a variety of processes are executed. FIG. 32 is a flowchart showing a paragraph-related process routine executed at the time of cold start.

When the power is ON for cold start, the CPU 521 checks whether a paragraph style is stored in a paragraph style memory buffer of the RAM 523 at step 600. The paragraph style stored in paragraph style memory is hereinafter called as registered paragraph style. When the answer is YES, the program goes to step 601 at which the paragraph style is registered as a specific paragraph style for a first paragraph in the vacant text area 523d of the RAM 523. At step 602, a character input image is displayed according to the specific paragraph style on the liquid-crystal display 535. When no paragraph style is stored in the paragraph style memory buffer, on the other hand, the program goes to step 603 at which a default value of a paragraph style stored in the ROM 522 is transferred to the paragraph style memory buffer, and then goes to step 601.

When the power is ON for hot start, a character input image is displayed on the liquid-crystal display 535 according to a paragraph style stored in the text area 523d of the RAM 523 immediately before a power-OFF operation.

Figure 33:
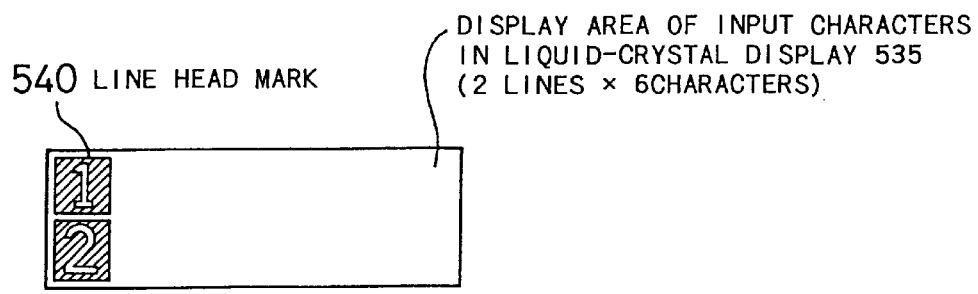
FIG. 33 shows an exemplified character input image.

Since the liquid-crystal display 535 of the embodiment has a size of six characters by two lines, all lines in one paragraph may not be displayed simultaneously. Each line of a certain paragraph in text data thereby has a line head mark representing a start or head of the line and a line number (for example, first line or second line) in the certain paragraph. Each row of characters in a front portion of one line displayed on the liquid-crystal display 535 has a head line mark 540 as shown in FIG. 33. There are two types of the line head mark 540; one for effective lines having some characters and the other for non-effective lines having no character.

The paragraph style is not specified but automatically set for the first paragraph through the process routine executed at the time of power ON as described above.

(D) Modification of Paragraph Style and Deletion of Paragraph

The user can arbitrarily modify the paragraph style for each paragraph with the aid of cursor positioning and operation of the key input element 511.

Figure 34:
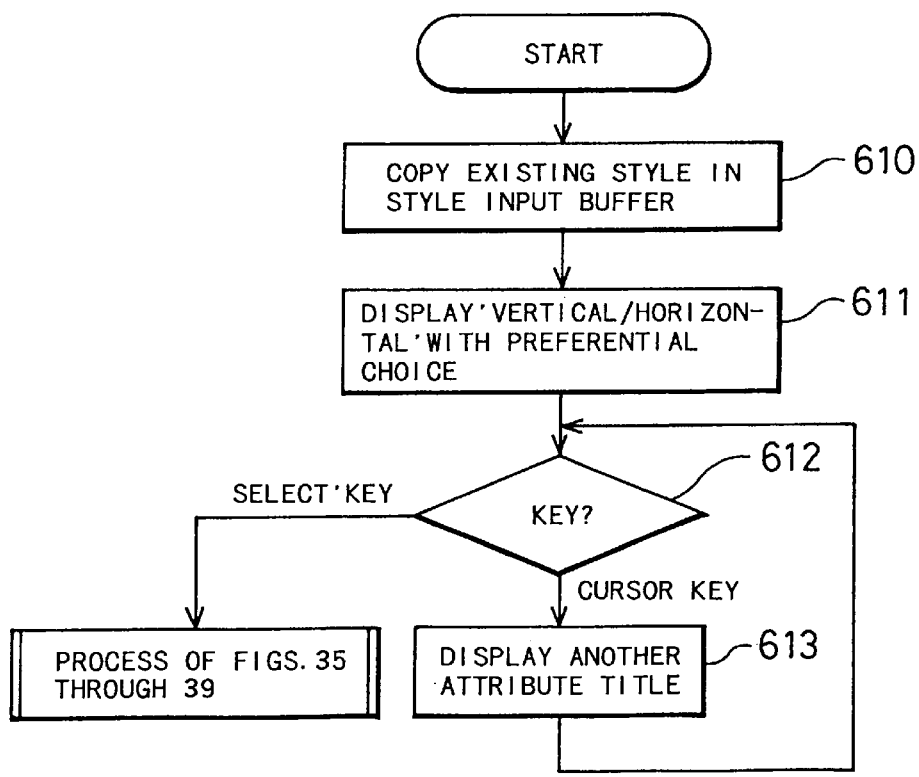
FIG. 34 is a flowchart showing a first part of a process of paragraph style modification.

When the user moves the cursor to a target paragraph for modification and instructs modification of the paragraph style, the CPU 521 starts a paragraph style modification program stored in the ROM 522 as shown in the flowchart of FIG. 34. At step 610, the CPU 521 reads an existing paragraph style for the target paragraph set in the text area 523d and transfers the paragraph style to a style input buffer. The program then proceeds to step 611 at which the cursor is positioned on an attribute title 'Vertical/Horizontal' displayed with previous vertical or horizontal setting as a preferential choice. At step 612, the CPU 521 identifies a key operated. When one of cursor keys is operated, the program proceeds to step 613 at which the cursor is moved to display another attribute title with possible choices, and then returns to step 612 for identification of a next key operated. When the 'Select' key is operated at step 612, the program enters a process routine according to the attribute title with the cursor positioned thereon as shown in the flowcharts of FIGS. 35 through 39.

Figure 35:
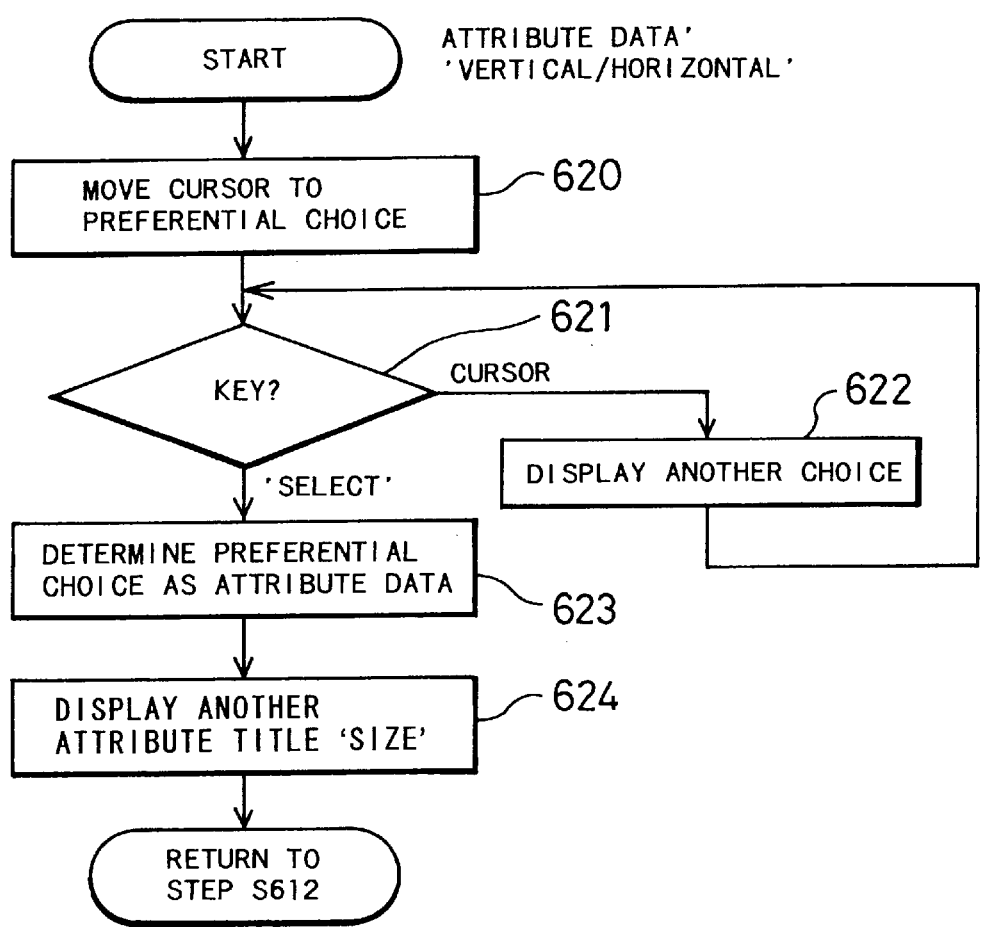
FIG. 35 is a flowchart showing a second part of the process of paragraph style modification.

When the 'Select' key is pressed while the cursor is on the attribute title 'Vertical/Horizontal', the CPU 521 starts a process routine shown in the flowchart of FIG. 35. The CPU 521 moves the cursor to the preferential choice at step 620 and then determines whether the 'Select' key or one of the cursor keys is operated at step 621. When the cursor key is operated, the program goes to step 622 at which vertical or horizontal setting displayed as the preferential choice is changed to the other choice, and then returns to the decision point 621. When the 'Select' key is operated, the program proceeds to step 623 at which vertical or horizontal setting displayed as the preferential choice is set as data of the attribute title 'Vertical/Horizontal'. After the cursor is moved to display another attribute title 'Size' and a subtitle (Auto, 1 Line, 2 Line, 3 Line, or 4 Line) representing a previous paragraph size as a preferential choice at step 624, the program returns to step 612 in the flowchart of FIG. 34.

Figure 36:
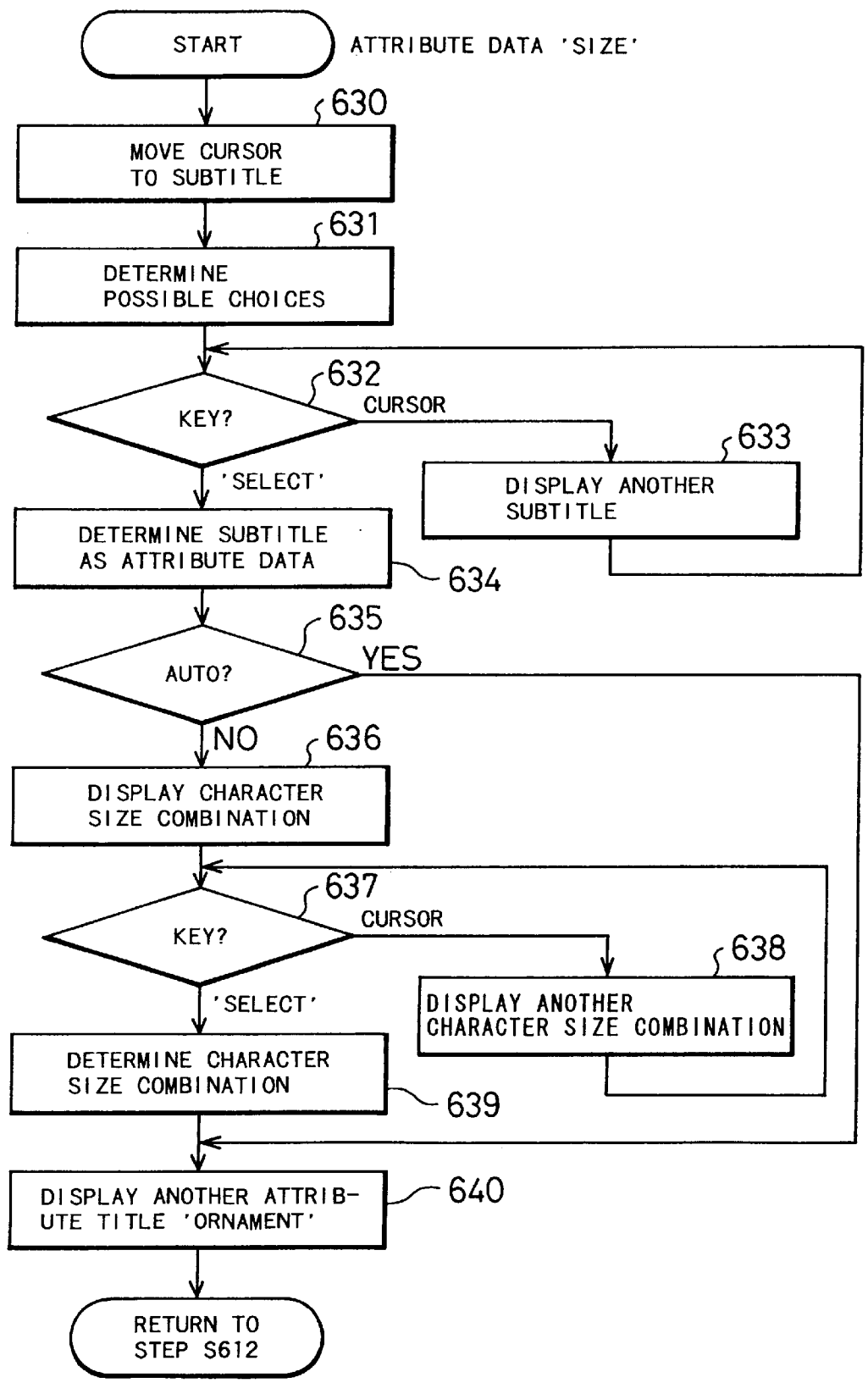
FIG. 36 is a flowchart showing a third part of the process of paragraph style modification.

When the 'Select' key is pressed while the cursor is on the attribute title 'Size', the CPU 521 starts a process routine shown in the flowchart of FIG. 36. After the cursor is moved to the preferential choice at step 630, the CPU 521 determines possible choices of the subtitles (Auto, 1 Line, 2 Line, 3 Line, and 4 Line) at step 631. The program then goes to step 632 at which the CPU 521 determines whether the 'Select' key or one of the cursor keys is operated. When the cursor key is operated, the program goes to step 633 at which the cursor is moved to another possible choice of the subtitles, and then returns to step 632 for identifying a next key operated.

Possible choices denote subtitles each representing a number of lines not less than n determined as below. When n is equal to 1 or 2, the subtitle 'Auto' is one of the possible choices.

n=(number of lines in a paragraph the cursor is positioned)−(number of vacant lines in the paragraph)

This ensures that at least one substantial line with print data exists even after modification of the paragraph style. The possible choice thus represents the number of lines equal to or greater than the number of existing substantial lines.

When the 'Select' key is operated while the cursor is positioned on a certain subtitle, the program goes to step 634 at which the certain subtitle is set as a determined value. At step 635, the CPU 521 determines whether the certain subtitle set at step 634 is 'Auto'. When the certain subtitle is other than 'Auto', the program goes to step 636 at which one of possible character size combinations corresponding to the number of lines set at step 634 is graphically displayed as a preferential choice with the aid of the cursor position. At step 637, it is determined whether the 'Select' key or one of the cursor keys is operated. When the cursor key is operated, the program goes to step 638 at which the cursor is moved to another possible character size combination, and then returns to step 637 to identify a next key operated. When the 'Select' key is operated at step 637, the program goes to step 639 at which the possible character size combination displayed as the preferential choice is set as determined data. After the character size combination is determined at step 639 or when the subtitle 'Auto' is selected, the program goes to step 640 at which the cursor is moved to display another attribute title 'Ornament' with one of possible choices (No ornament, Keyline box, and Keyline box +Screen) representing previous ornamental information as a preferential choice. The program then returns to step 612 in the flowchart of FIG. 34.

In this embodiment, the number of lines in 'Auto' size setting is determined according to input by the user and is set equal to one or two to allow printing on a tape of any width. The user can utilize this 'Auto' size setting according to the requirements, which makes the user free from specifying the number of lines and the character size combination.

In this embodiment, character size combinations corresponding to the predetermined number of lines are shown as relative values. When a certain paragraph is set to contain three lines, five options are shown as possible combinations; 'same character size x3', 'small, small, large', 'small, large, large', 'large, small, small', and 'large, large, small'. This allows the simple procedure of specifying the character sizes without taking account of the tape width.

Each relative character size combination is shown as a graphic display including a plurality of lines each having a thickness corresponding to the relative character size. This allows the user to specify the desirable character size combination according to a printing image shown by the graphic display.

Figure 40:
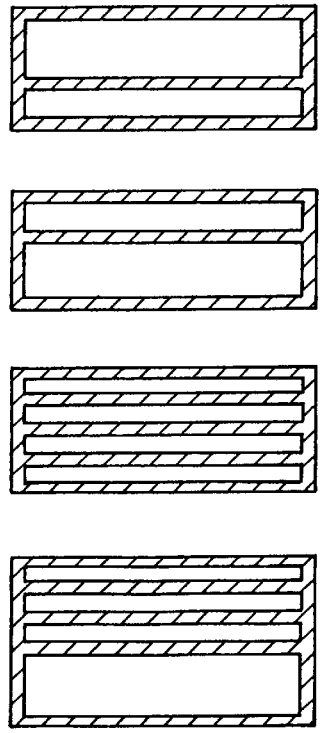
FIG. 40 shows examples of graphic display for selecting a character size combination.

FIG. 40 shows examples of graphic images representing character size combinations; 'small, large' combination in two lines, 'large, small' combination in two lines, identical size combination in four lines, and 'small, small, small, large' combination in four lines. Each graphic display has an identification code for convenience of the telephone information service for the user.

Figure 37:
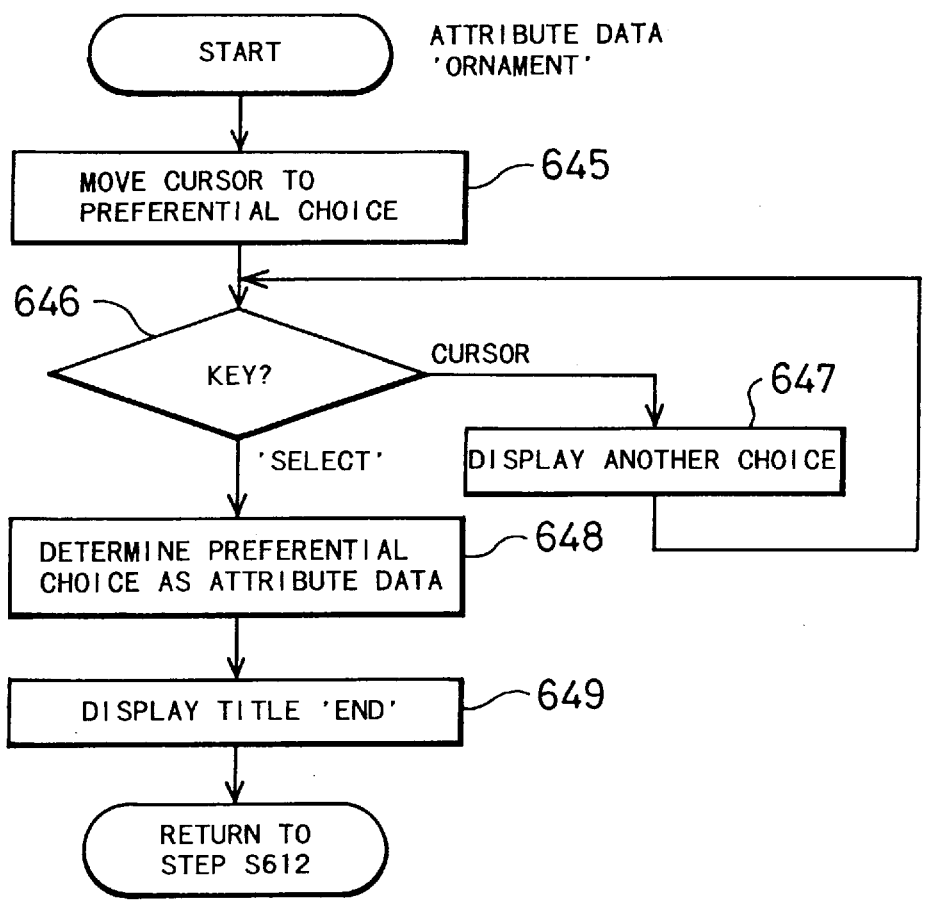
FIG. 37 is a flowchart showing a fourth part of the process of paragraph style modification.

When the 'Select' key is pressed while the cursor is on the attribute title 'Ornament', the CPU 521 starts a process routine shown in the flowchart of FIG. 37. The CPU 521 moves the cursor to the preferential choice at step 645 and then determines whether the 'Select' key or one of the cursor keys is operated at step 646. When the cursor key is operated, the program goes to step 647 at which the cursor is moved to display another choice (No ornament, Keyline box, or Keyline box+Screen) as a new preferential choice, and then returns to the decision point 646. When the 'Select' key is operated at step 646, the program proceeds to step 648 at which the preferential choice is set as determined data. After the cursor is moved to a title 'End of Paragraph Specification' at step 649, the program returns to step 612 in the flowchart of FIG. 34.

In this embodiment, prepared choices of ornamental setting does not include 'Screen only'. The tape applied to the tape printing device has a variety of colors, where the difference between the background color (tape color) and character colors may not be sufficiently large to distinctively show the screening effect. A label (final piece of tape cut at a predetermined position) created by the tape printing device is generally observed from a certain distance unlike an output of a word-processor. Because of the above reasons, screening is always combined with a keyline box in the embodiment.

Figure 38:
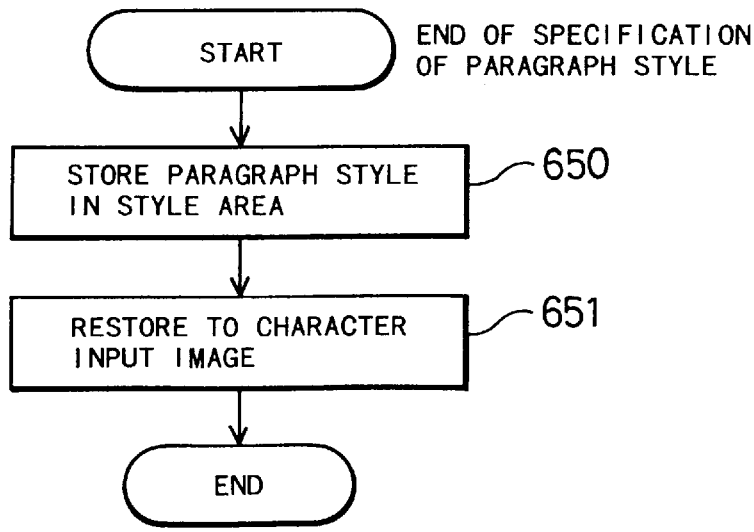
FIG. 38 is a flowchart showing a fifth part of the process of paragraph style modification.

When the 'Select' key is operated while the cursor is on the title 'End of Paragraph Specification', the CPU 521 starts a process routine shown in the flowchart of FIG. 38. The CPU 521 first stores a paragraph style registered in the style input buffer into a style area corresponding to the text area 523*d* containing a target paragraph for modification at step 650. The program then goes to step 651 at which a character input image with a modified paragraph structure is displayed. This completes modification of the paragraph style and makes the tape printing device 501 wait for input of next character data.

Figure 39:
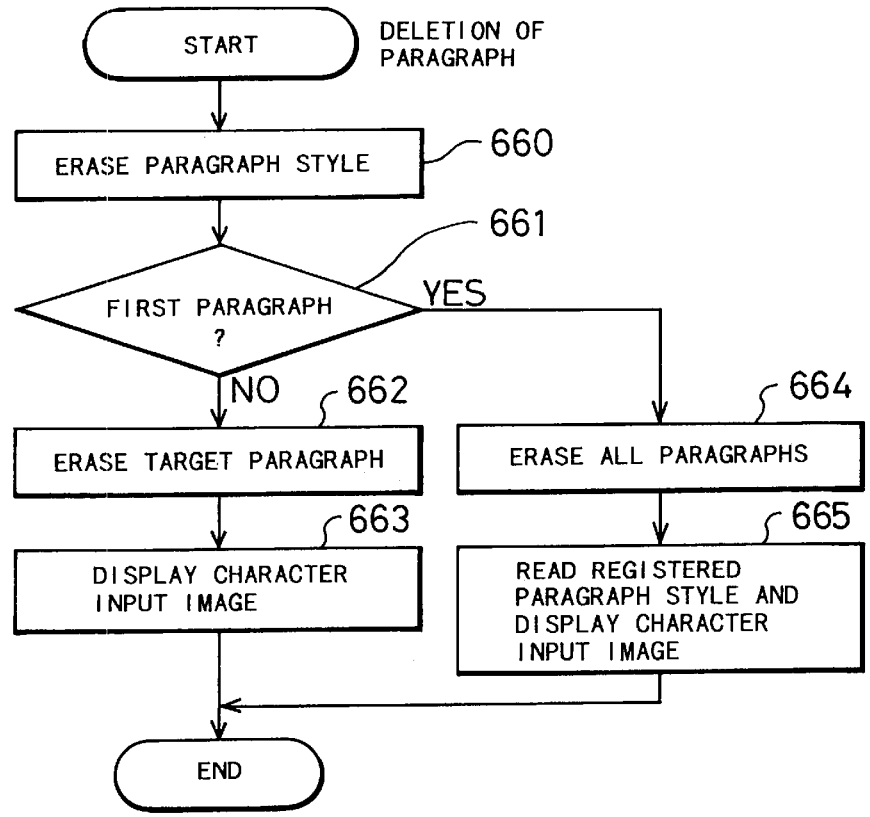
FIG. 39 is a flowchart showing a sixth part of the process of paragraph style modification.

When the 'Select' key is pressed while the cursor is on a title 'Paragraph Delete', the CPU 521 starts a process routine shown in the flowchart of FIG. 39. At step 660, the CPU 521 erases the paragraph style stored in the style input buffer. The program then goes to step 661 at which it is determined whether the cursor is positioned on a line head of a first line in a first paragraph when modification of the paragraph style is instructed. When the cursor is positioned in a second or subsequent paragraph, the program proceeds to step 662 at which all information (text data and paragraph style information) for the paragraph stored in the text area 523*d* is eliminated, and then goes to step 663 to display a character input image. This completes modification of the paragraph style and makes the tape printing device 501 wait for input of next character data. When the cursor is determined to be on the line head of the first line in the first paragraph at step 661, the program goes to step 664 at which all text data and corresponding paragraph style information in the text area 523*d* are eliminated. At step 665, the paragraph style previously registered in the paragraph style memory buffer is read out and set as the paragraph style of a vacant first paragraph with no character data, and a character input image is displayed. This also completes modification of the paragraph style and makes the tape printing device 501 wait for input of next character data.

In the above embodiment, all paragraphs are deleted when the cursor is located at the line head mark of the first line of the first paragraph. Alternatively, there may be another command 'All Paragraphs Delete' distinct from the command 'Paragraph Delete'. In such a case, only the first paragraph is deletes in response to operation of the 'Paragraph Delete' key even when the cursor is positioned on the line head of the first line of the first paragraph.

In this embodiment, deletion of an arbitrary paragraph or all paragraphs is performed only according to the above process routine. The structure of the second embodiment allows simple modification of the style of each paragraph or deletion of one or all existing paragraphs.

(E) Start of New Paragraph

The user can arbitrarily instruct to start a new paragraph through operation of the key input element 511 in input or editing of text data. When start of a new paragraph is instructed, a paragraph style is read out and set for the new paragraph. This procedure is essentially similar to the processing for modification of the paragraph style described above except some difference, which is described below.

1. Possible Choices in Attribute Title 'Size'

A new paragraph may include one or a plurality of substantial lines with character data according to the cursor position where start of the new paragraph is instructed (described later). Possible choices of subtitles in the attribute title 'Size' include line numbers equal to or greater than a number of the substantial lines with character data in the new paragraph.

2. Restoration to Character Input Mode and Division of Text Data

When a 'New Paragraph' key is pressed, new paragraph type information is set (details of this procedure are omitted) according to the cursor position, that is, on a line head of a first line in a first paragraph, in the middle of a paragraph, or on an end of a last line of a last paragraph.

After the paragraph style is set for the new paragraph, the CPU 521 restores the tape printing device 501 to the character input mode and executes a process for dividing text data in a certain paragraph where the cursor is positioned when the 'New Paragraph' key is operated, into two paragraphs, that is, the certain paragraph and a new paragraph, according to the new paragraph type information.

Figure 41:
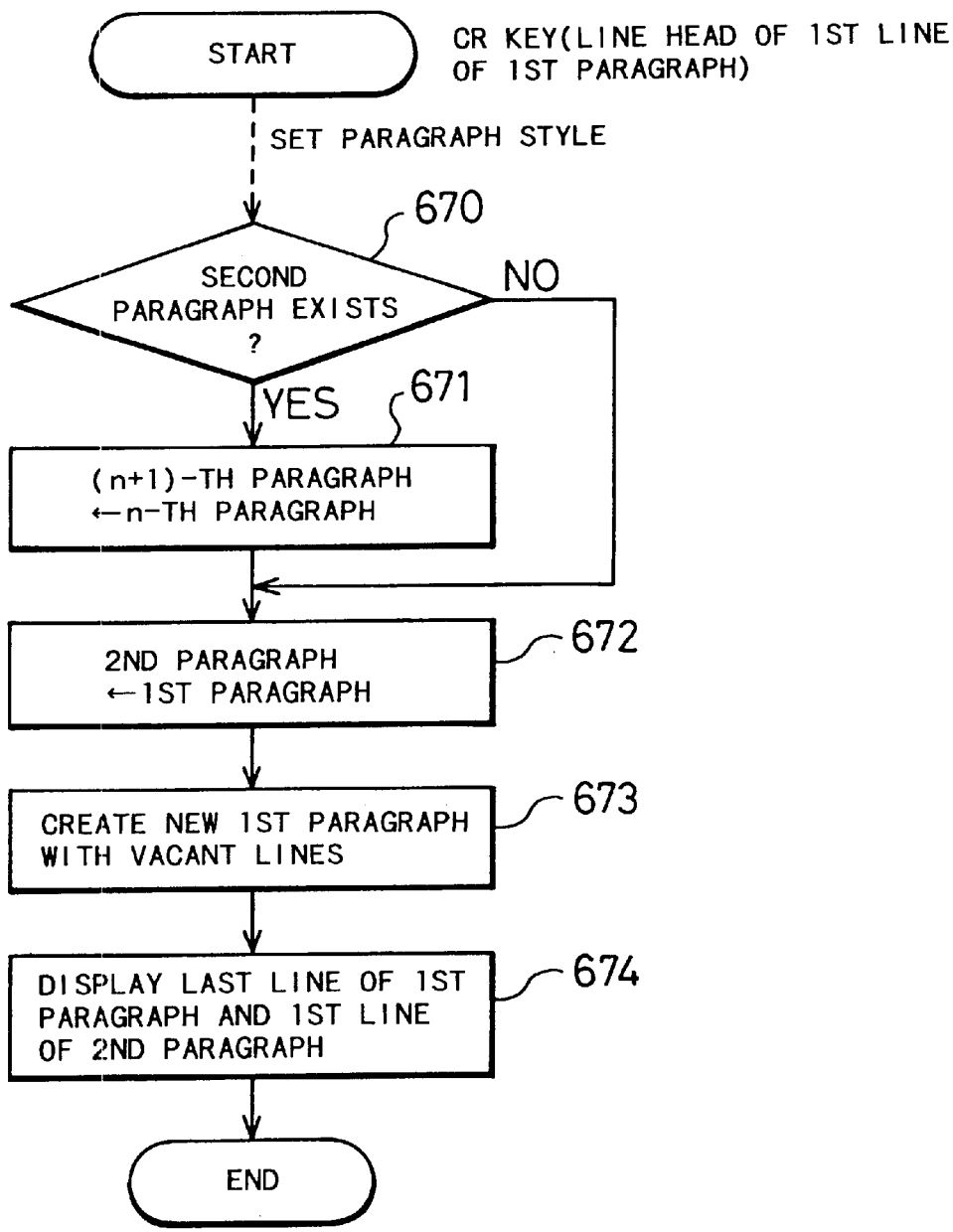
FIG. 41 is a flowchart showing a first process for starting a new paragraph.

When the new paragraph type information represents the cursor position on the line head of a first line of a first paragraph, the CPU 521 starts a process routine shown in the flowchart of FIG. 41. At step 670, it is determined whether at least a second paragraph exists when the 'New Paragraph' key is pressed. When at least a second paragraph exists, the program goes to step 671 at which each paragraph number n (n=2,3, . . . ) is changed to n+1 while the style and text data in the paragraph remains; for example, a second paragraph to a new third paragraph, a third paragraph to a new fourth paragraph. After execution of step 671 or when no second paragraph exists, the program goes to step 672 at which a default style is written in a second paragraph section of the text area 523d, that is, the first paragraph is set as a new second paragraph. After a new paragraph with vacant lines is set as a new first paragraph at step 673, a last line in the new first paragraph and a first line in the new second paragraph are displayed as a character input image at step 674.

Figure 44:
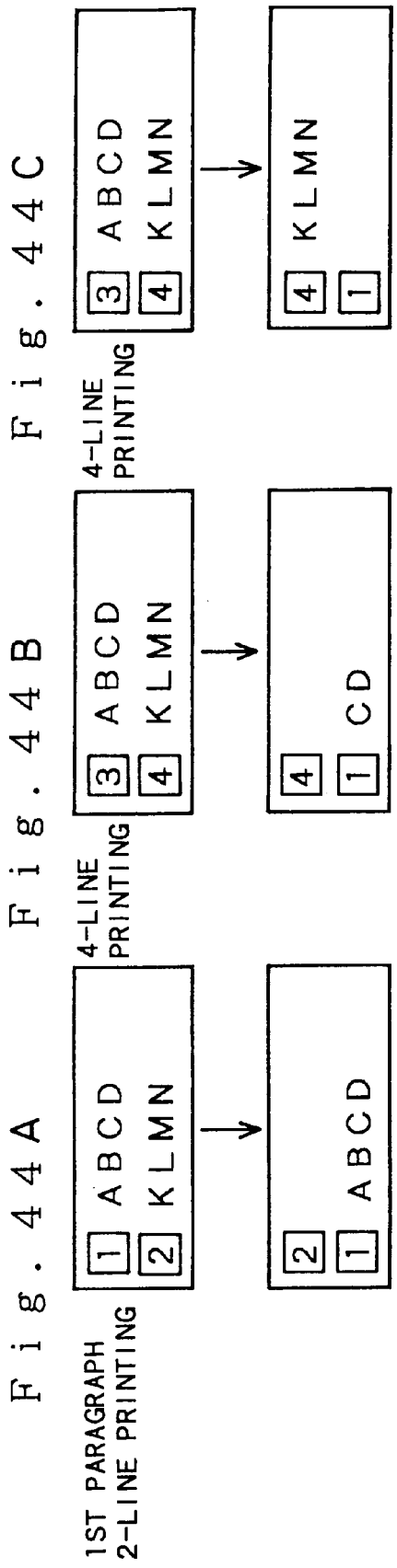
FIGS. 44A through 44C show examples of variation in the character input image according to the new paragraph starting process of FIGS. 41 through 43.

FIG. 44A shows change in the character input image when the 'New Paragraph' key is operated while the cursor is on the line head of the first line of the first paragraph as described above. In another application, when the cursor is located at the line head mark, a paragraph consisting of vacant lines is newly generated unconditionally shift existing paragraphs are respectively shifted by one.

Figure 42:
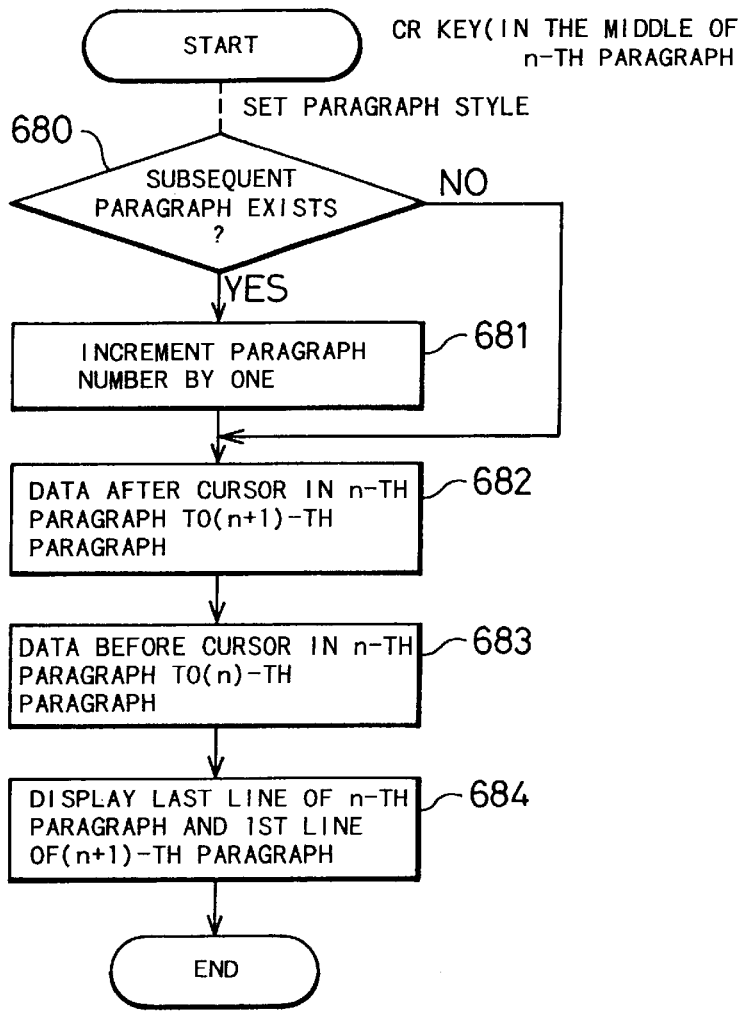
FIG. 42 is a flowchart showing a second process for starting a new paragraph.

When the new paragraph type information represents the cursor position in the middle of a paragraph, the CPU 521 starts a process routine shown in the flowchart of FIG. 42. At step 680, it is determined whether at least one subsequent paragraph exists after a certain paragraph (n) where the cursor is positioned. When one or a plurality of subsequent paragraphs exist, the program goes to step 681 at which the paragraph number of each subsequent paragraph is incremented by one while the style and text data in each subsequent paragraph remains; for example, a third paragraph to a new fourth paragraph. After execution of step 681 or when no subsequent paragraph exists at step 680, the program goes to step 682 at which the default style is written in a new paragraph section of the text area 523d, and text data after the cursor position in the paragraph (n) is input into a new paragraph (n+1). The rest of the text data in the paragraph (n), that is, those before the cursor position remains in the paragraph (n) at step 683. The paragraph (n) thus contains the text data before the cursor position as well as vacant space and lines with no text data after the cursor position. At step 684, a last line of the certain paragraph (n) where the cursor is positioned and a first line of the new paragraph (n+1) are displayed as a character input image. In this manner, the user can divide text data of one paragraph at any desirable position to make two paragraphs.

FIG. 44B shows change in the character input image when the 'New Paragraph' key is operated while the cursor is in the middle of a certain paragraph as described above. The lower drawing of FIG. 44B shows the character input image displayed at step 684, which includes a fourth line (last line) of a certain paragraph where the cursor is positioned and a first line of a new paragraph.

Figure 43:
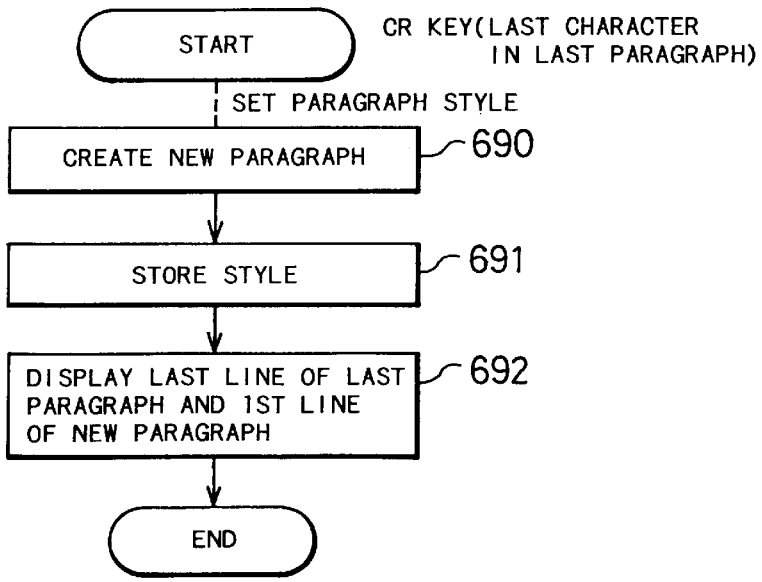
FIG. 43 is a flowchart showing a third process for starting a new paragraph.

When the new paragraph type information represents the cursor position on the end of a last line in a last paragraph, the CPU 521 starts a process routine shown in the flowchart of FIG. 43. At step 690, a new paragraph with vacant lines is set as a new last paragraph. The program then goes to step 691 at which the style of the new last paragraph is written in the corresponding section of the text area 523d. The CPU 521 then displays a last line of a former last paragraph and a first line of a new last paragraph as a character input image at step 692.

FIG. 44C shows change in the character input image when the 'New Paragraph' key is operated while the cursor is at the end of a last line of a last paragraph as described above. The lower drawing of FIG. 44C shows the character input image displayed at step 692, which includes a fourth line (last line) of a former last paragraph and a first line of a new last paragraph.

When a paragraph deleting operation is instructed under such a condition that a style of a new paragraph is read out and set, the CPU 521 restores the state when the 'New Paragraph' key is operated (details of this procedure are omitted).

(F) Modification of Paragraph Style When No Text Data Exists

When modification of the paragraph style is instructed while no text data exists, a registered paragraph style is modified in a similar manner to the process for modifying the style of each paragraph described above, except some difference (details of this procedure are omitted).

The difference includes that a modified paragraph style is stored in the paragraph style memory buffer, that the modified paragraph style is set as a style of a first paragraph with no text data, that all subtitles of the attribute title 'Size' are set as possible choices, and that the user may optionally set a registered paragraph style as a default value instead of executing paragraph deletion.

(G) Operation of Compulsory Return Key

Figure 45:
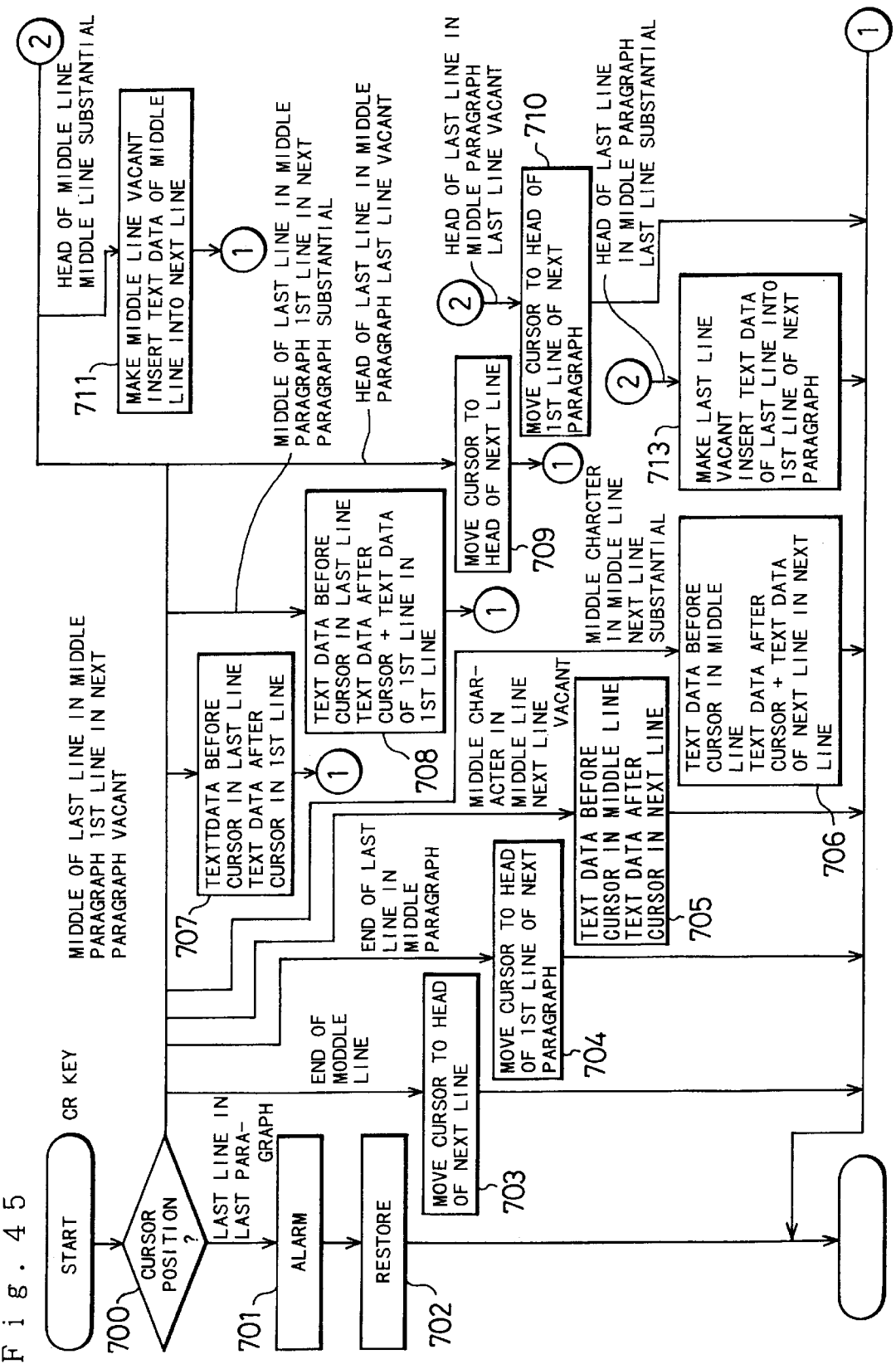
FIG. 45 is a flowchart showing a process when the 'Compulsory Return' key is operated.

The number of lines in a paragraph can not be changed through operation of a 'Compulsory Return (CR)' key, but is changed according to the processing for the new paragraph or modification of the paragraph style described above. Namely, a process executed by a press of the 'CR' key does not change the number of lines in a paragraph as shown in the flowchart of FIG. 45. In the following explanation and the flowchart of FIG. 45, a middle line means a line other than a last line and a middle paragraph denotes a paragraph other than a last paragraph.

In the flowchart of FIG. 45, the CPU 521 first detects the cursor position at step 700. When the cursor is positioned on a last line of a last paragraph, the program goes to step 701 at which an alarm of non-valid information tells that the press of the 'CR' key is ignored, and to step 702 to restore initial conditions before operation of the 'CR' key.

When the cursor is positioned on an end of a middle line, the program goes to step 703 at which the cursor is moved to a line head mark of a next line. When the cursor key is positioned on an end of a last line of a middle paragraph, the program goes to step 704 at which the cursor is moved to a line head mark of a first line of a next paragraph.

When the cursor is in the middle of a middle line where a next line is vacant with no text data, the program goes to step 705 at which a row of characters before the cursor are kept in the middle line whereas a subsequent row of characters after the cursor are inserted into the vacant next line, and the cursor is moved to a line head of the next line.

When the cursor is in the middle of a middle line where a next line is substantial with text data, the program goes to step 706 at which a row of characters before the cursor are kept in the middle line whereas a subsequent row of characters after the cursor are inserted before text data in the substantial next line, and the cursor is moved to a line head of the next line.

When the cursor is in the middle of a last line of a middle paragraph where a first line of a next paragraph is vacant with no text data, the program goes to step 707 at which a row of characters before the cursor are kept in the last line whereas a subsequent row of characters after the cursor are inserted into the vacant first line of the next paragraph, and the cursor is moved to a line head of the first line of the next paragraph.

When the cursor is in the middle of a last line of a middle paragraph where a first line of a next paragraph is substantial with text data, the program goes to step 708 at which a row of characters before the cursor are kept in the last line whereas a subsequent row of characters after the cursor are inserted before text data in the substantial first line of the next paragraph, and the cursor is moved to a line head of the first line of the next paragraph.

When the cursor is on a line head of a middle line which is vacant with no text data, the program goes to step 709 at which the cursor is moved to a line head mark of a next line.

When the cursor is on a line head of a last line of a middle paragraph where the last line is vacant with no text data, the program goes to step 710 at which the cursor is positioned to a line head mark of a first line of a next paragraph.

When the cursor is on a line head of a middle line which is substantial with text data, the program goes to step 711 at which the middle line is made vacant with no text data whereas a row of characters in the middle line are inserted before text data (if exists) in a next line, and the cursor is moved to a line head of a next line.

When the cursor is on a line head of a last line of a middle paragraph where the last line is substantial with text data, the program goes to step 713 at which the last line is made vacant with no text data whereas a row of characters in the last line are inserted before text data (if exists) in a first line of a next paragraph, and the cursor is moved to a line head of a first line of a next paragraph.

Under such a restriction that the number of lines in a paragraph is not changed, a variety of processes are executed as described above. The variety of processes include creation of a vacant line, line division and line connection in one paragraph, and line division and line connection between two paragraphs.

(H) Line Deletion When Cursor is on Line Head Mark

Figure 46:
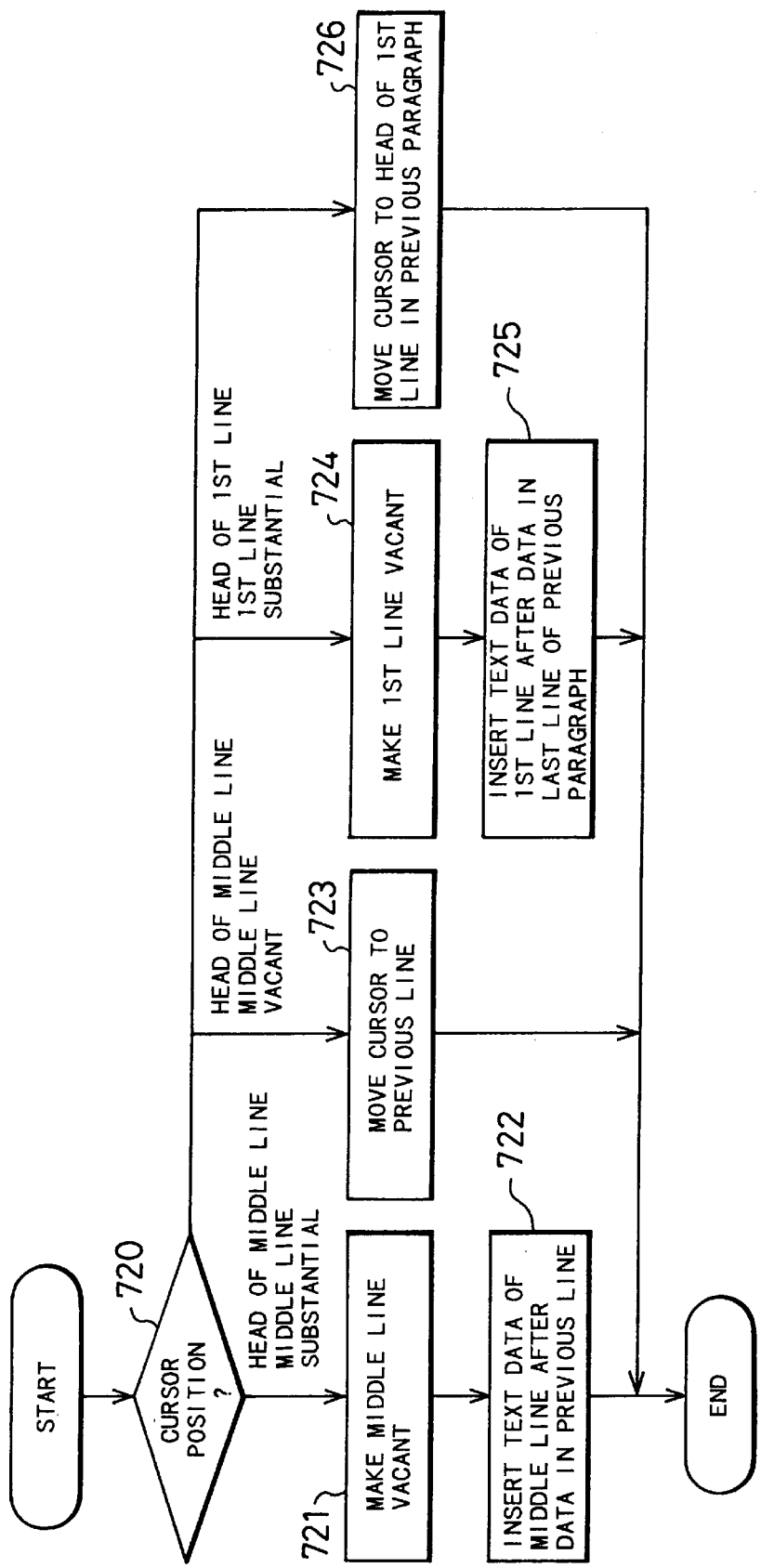
FIG. 46 is a flowchart showing a line deletion process.

In the conventional tape printing device, when line deletion is instructed (when a 'Delete' key is pressed) while the cursor is on a line head of a certain line, the certain line is deleted. In the structure of the embodiment, on the other hand, the number of lines in a paragraph is not changed but maintained unless the paragraph style is modified according to the procedure described above. Even when line deletion is instructed while the cursor is on a line head mark of a certain line, the CPU 521 executes processing according to this principle. A line deletion process executed by the CPU 521 of the embodiment is described according to the flowchart of FIG. 46. In the following explanation and the flowchart of FIG. 46, a middle line denotes a line other than a first line.

When the program enters the routine, the CPU 521 first detects the cursor position at step 720.

When the cursor is on a line head of a middle line which is substantial with text data, the program goes to step 721 at which the middle line is made vacant, and then to step 722 at which a row of characters in the middle line are inserted after text data (if exists) of a previous line, and the cursor is moved to a character immediately before the row of characters inserted.

When the cursor is on a line head of a middle line which is vacant with no text data, no line division or connection is executed between the middle line and a previous line, and the program goes to step 723 at which the cursor is moved to a last character of a substantial previous line or to a line head of a vacant previous line.

When the cursor is on a line head of a first line which is substantial with text data, the program goes to step 724 at which the first data is made vacant, and then to step 725 at which a row of characters in the first paragraph are inserted after text data (if exists) of a last line of a previous paragraph, and the cursor is moved to a character immediately before the row of characters inserted.

When the cursor is on a line head of a first line which is vacant with no text data, no line division or connection is executed between the first line and a last line of a previous paragraph, and the program goes to step 726 at which the cursor is moved to a last character of a substantial last line of the previous paragraph or to a line head of a vacant last line of the previous paragraph.

As described above, the structure of the embodiment effectively prevents the number of lines from being changed even when the 'Delete' key is operated while the cursor is on a line head of a certain line.

(I) Specification of Character Mode

The user can arbitrarily specifies attribute information of each character including ornamental information (hereinafter referred to as character mode).

Figures 47, 48:
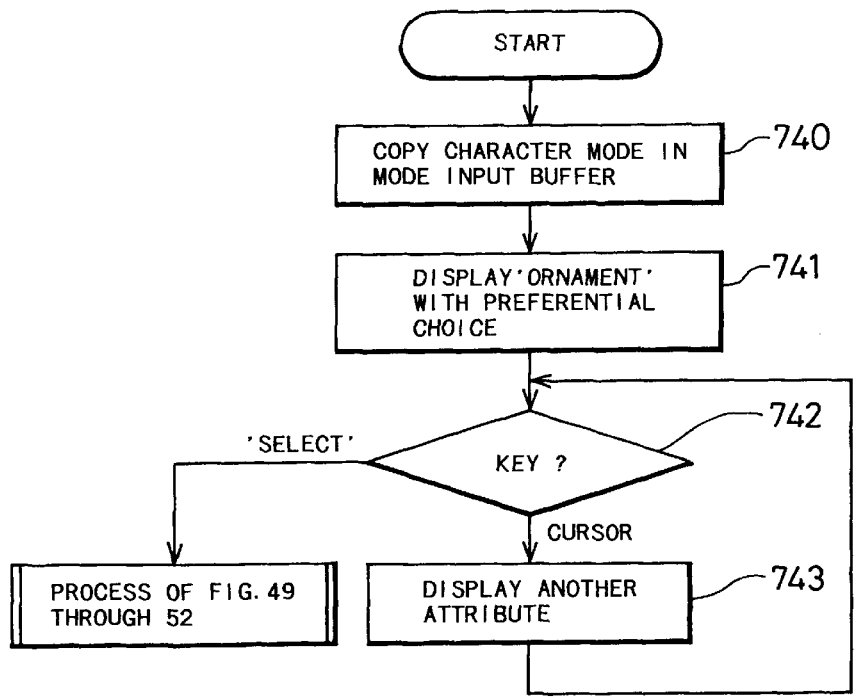
FIG. 47 shows character attribute data or character mode.
FIG. 48 is a flowchart showing a first part of a process for modifying the character mode.

FIG. 47 shows a typical example of the character mode, which includes attribute titles 'Ornament', 'ROM', and 'Inter-Character'. The attribute title 'Ornament' has a variety of choices including 'Smallest Size', 'Small Size', 'Standard Size' determined according to the number of lines in each paragraph, 'Bold', 'Italic', 'Highlighted', 'Shade', and 'Highlighted+Shade'. The attribute title 'ROM' determines whether an applied font is in an internal ROM (CG-ROM) or in an external ROM. The attribute title 'Inter-Character' includes four choices of an inter-character pitch, that is, 'Very narrow', 'Narrow', 'Standard', and 'Wide'.

The character mode is stored in a character mode memory buffer irrespective of character input. The character mode is in principle applied to all characters on each line of a paragraph stored in the text area 523*d*. The character mode is not shown in the liquid-crystal display 535. The character mode data applied to the whole line is stored next to a line head mark in the text area 523*d*.

When another character mode is to be applied to a part of characters on one line, the user specifies a mode modification process and the CPU 521 starts a mode modification process routine shown in the flowchart of FIG. 48.

When the program enters the routine, the CPU 521 reads an existing character mode for a target row of characters previously registered in the text area 523*d* and transfers the character mode to a mode input buffer at step 740. The program then proceeds to step 741 at which the cursor is positioned on an attribute title 'Ornament' displayed with previous ornamental data as a preferential choice. At step 742, the CPU 521 identifies a key operated. When one of cursor keys is operated, the program proceeds to step 743 at which the cursor is moved to display another attribute title with possible choices, and then returns to step 742 for identification of a next key operated. When the 'Select' key is operated at step 742, the program enters a process routine according to the attribute title with the cursor positioned thereon as shown in the flowcharts of FIGS. 49 through 52.

Figure 49:
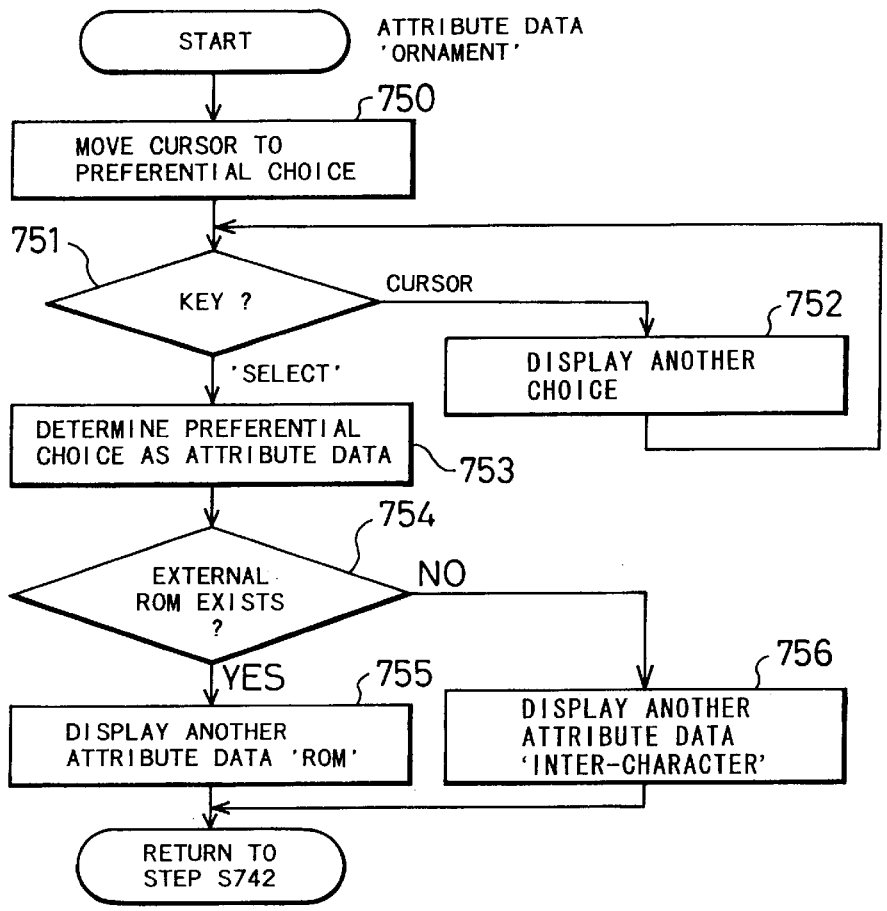
FIG. 49 is a flowchart showing a second part of the process for modifying the character mode.

When the 'Select' key is pressed while the cursor is on the attribute title 'Ornament', the CPU 521 starts a process routine shown in the flowchart of FIG. 49. The CPU 521 moves the cursor to the preferential choice or displays the preferential choic at step 750 and then determines whether the 'Select' key or one of the cursor keys is operated at step 751. When the cursor key is operated, the program goes to step 752 at which the cursor is moved to display another option as a new preferential choice, and then returns to the decision point 751. When the 'Select' key is operated at step 751, the program proceeds to step 753 at which the preferential choice is set as determined ornamental data. The CPU 521 then determines whether an external ROM is attached to the tape printing device 501, that is, whether a second font exists, at step 754. When the external ROM is attached, the program goes to step 755 at which the cursor is moved to display another attribute title 'ROM' with previous ROM selection as a preferential choice. The program then returns to step 742 in the flowchart of FIG. 48. When the external ROM does not exist, on the other hand, the program goes to step 756 at which the cursor is moved to display another attribute title 'Inter-Character' with previous inter-character information as a preferential choice. The program then returns to step 742 in the flowchart of FIG. 48.

Figure 50:
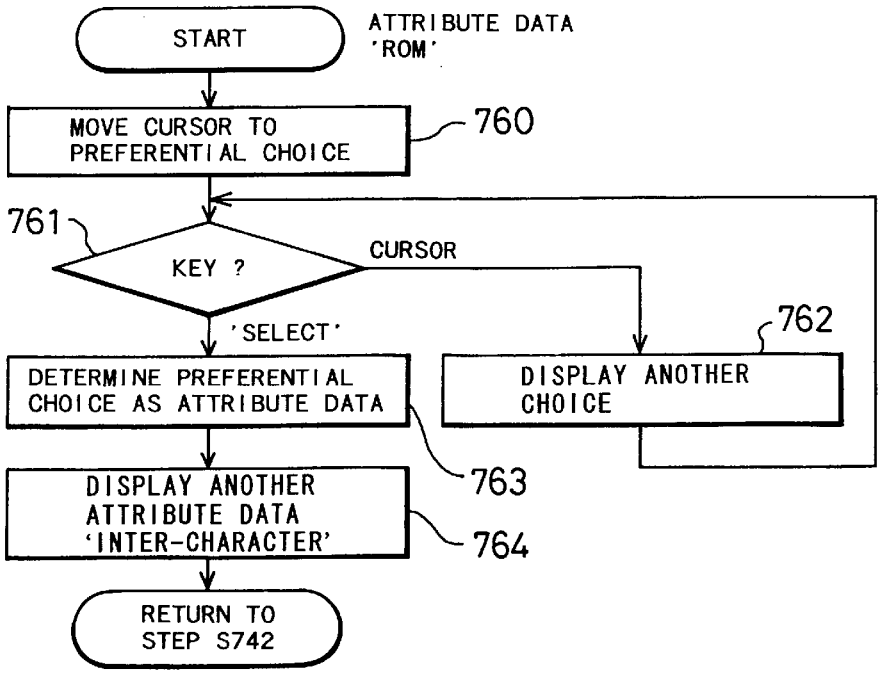
FIG. 50 is a flowchart showing a third part of the process for modifying the character mode.

When the 'Select' key is pressed while the cursor is on the attribute title 'ROM', the CPU 521 starts a process routine shown in the flowchart of FIG. 50. The CPU 521 moves the cursor to the preferential choice or displays the preferential choic at step 760 and then determines whether the 'Select' key or one of the cursor keys is operated at step 761. When the cursor key is operated, the program goes to step 762 at which the cursor is moved to display another option as a new preferential choice, and then returns to the decision point 761. When the 'Select' key is operated at step 761, the program proceeds to step 763 at which the preferential choice is set as determined ROM selection. The program then goes to step 764 at which the cursor is moved to display another attribute title 'Inter-Character' with previous inter-character information as a preferential choice, and returns to step 742 in the flowchart of FIG. 48.

Figure 51:
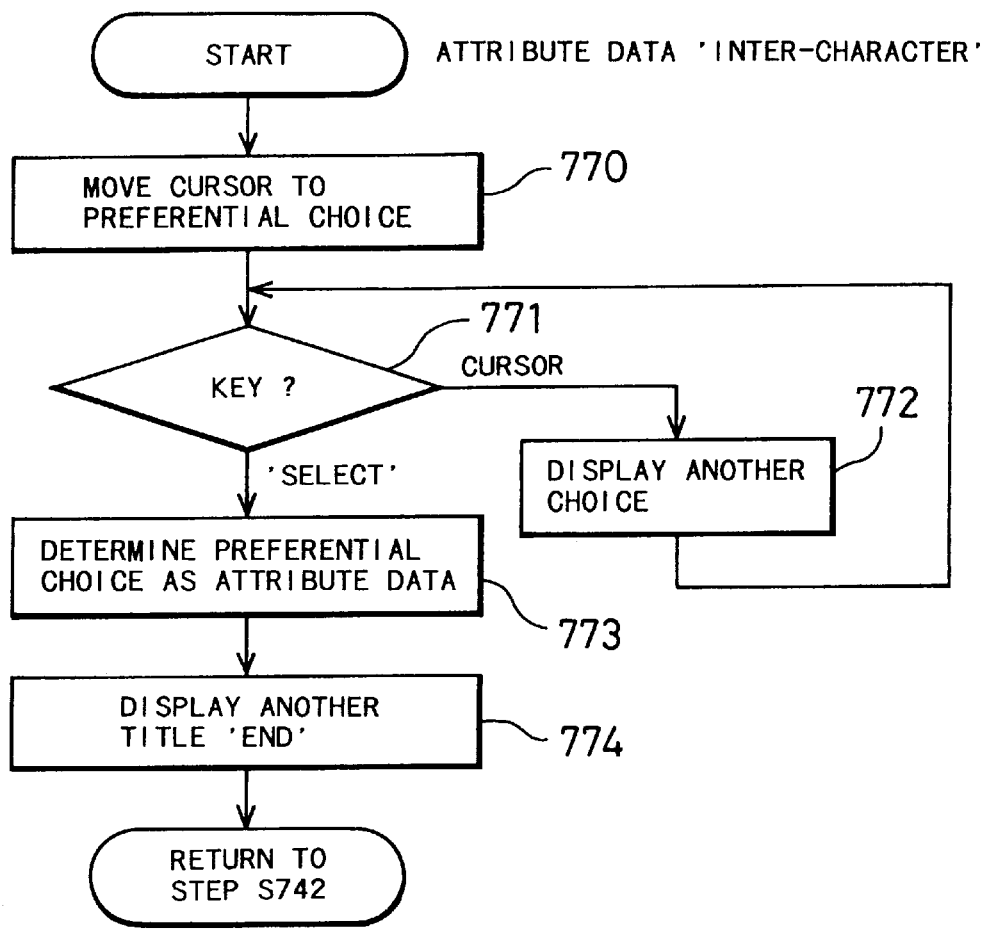
FIG. 51 is a flowchart showing a fourth part of the process for modifying the character mode.

When the 'Select' key is pressed while the cursor is on the attribute title 'Inter-Character', the CPU 521 starts a process routine shown in the flowchart of FIG. 51. The CPU 521 moves the cursor to the preferential choice or displays the preferential choic at step 770 and then determines whether the 'Select' key or one of the cursor keys is operated at step 771. When the cursor key is operated, the program goes to step 772 at which the cursor is moved to display another option as a new preferential choice, and then returns to the decision point 771. When the 'Select' key is operated at step 771, the program proceeds to step 773 at which the preferential choice is set as determined inter-character information. The program then goes to step 774 at which the cursor is moved to display a title 'End of Character Mode Modification', and returns to step 742 in the flowchart of FIG. 48.

Figure 52:
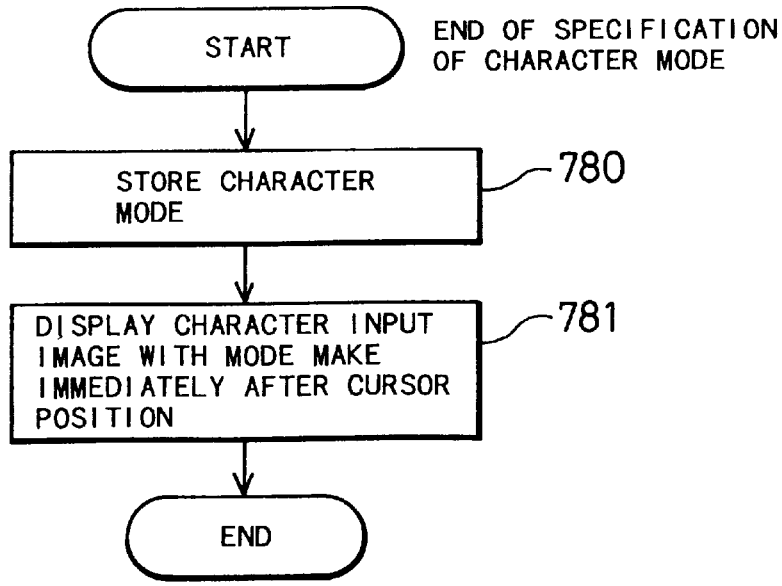
FIG. 52 is a flowchart showing a fifth part of the process for modifying the character mode.

When the 'Select' key is operated while the cursor is on the title 'End of Character Mode Modification', the CPU 521 starts a process routine shown in the flowchart of FIG. 52. The CPU 521 first assigns a character mode registered in the mode input buffer to the target row of characters in the text area 523*d* at step 780. The program then goes to step 781 at which the CPU 521 displays a character input image with a mode mark placed immediately after a character where the cursor is positioned before instruction of the character mode modification process and waits for input of next character data. In this embodiment, the mode mark is displayed as a triangle character.

The character mode thus modified is applied to the target row of characters after the mode mark in a certain line until a next mode mark appears in the certain line. When a new character mode is identical with an old character mode applied to a character immediately before the target row of characters, the mode mark is not inserted (this procedure is omitted in the flowchart of FIG. 52).

The user may prefer substantially the same printing lengths on a plurality of lines in one paragraph. This requirement is implemented through the character mode modification process for changing the inter-character pitch or the character size.

The attribute title 'Ornament' includes only the character sizes smaller than the standard size determined according to the paragraph style. Larger character sizes are omitted from options since they may cause overlapping of characters or the insufficient tape width.

(J) Processing of Second Line in 'Auto' Setting of 'Size' Attribute Information

Figure 53A:
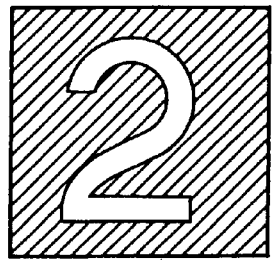
FIGS. 53A and 53B show two exemplified displays of the line head mark.
Figure 53B:
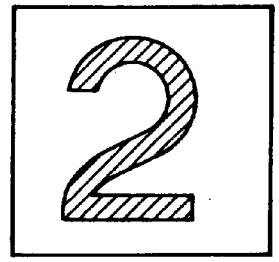

When the attribute title 'Size' of the paragraph style is set in 'Auto', the number of lines is set equal to one or two according to key operation, for example, press of the 'CR' key. In this embodiment, even when a second line is a non-effective line, a line head mark of the second line is displayed on the liquid-crystal display 535. Effective lines include both substantial and vacant lines which a number of dots corresponding to the character size are allocated to in printing. When the same line head mark is used for both effective lines and non-effective lines, the user can not identify whether the second line is non-effective or effective. When the second line is non-effective, the line head mark of the second line is highlighted in a different way as shown in FIGS. 53A and 53B. FIG. 53A shows a line head mark for an effective line displayed as a highlighted numeral, and FIG. 53B shows a line head mark for a non-effective line displayed as a black numeral with a frame box.

Figure 54:
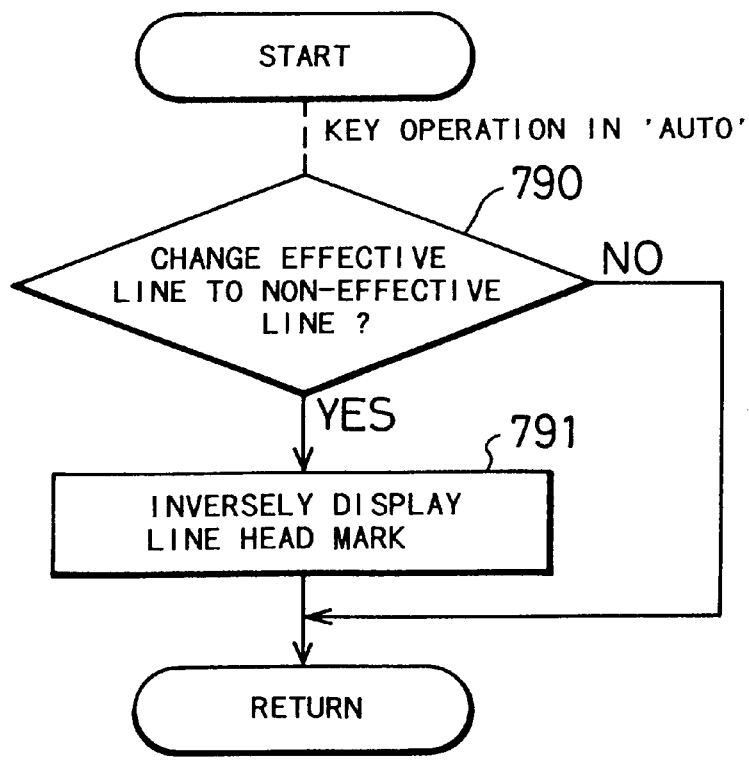
FIG. 54 is a flowchart showing a process for inverting display of the line head mark.

FIG. 54 is a flowchart showing a second line process routine in the above 'Auto' setting. This process routine is incorporated as one step in a variety of processing programs described above although being omitted from the flowcharts and the corresponding description above.

When a key, for example, the 'CR' key or the 'New Paragraph' key, is operated for processing a specific paragraph with the 'Auto' size setting or a paragraph before or after the specific paragraph, the program exits from a main routine and enters the process routine of FIG. 54 in the middle of or after completion of the processing. At step 790, it is determined whether the second line is changed from an effective line to a non-effective line or vice versa. When no change is detected, the program goes back to the main routine. When a change is detected, the program proceeds to step 791 at which display of the line head mark for the second line in the text area 523d is inverted.

(K) Printing Process

Figure 55:
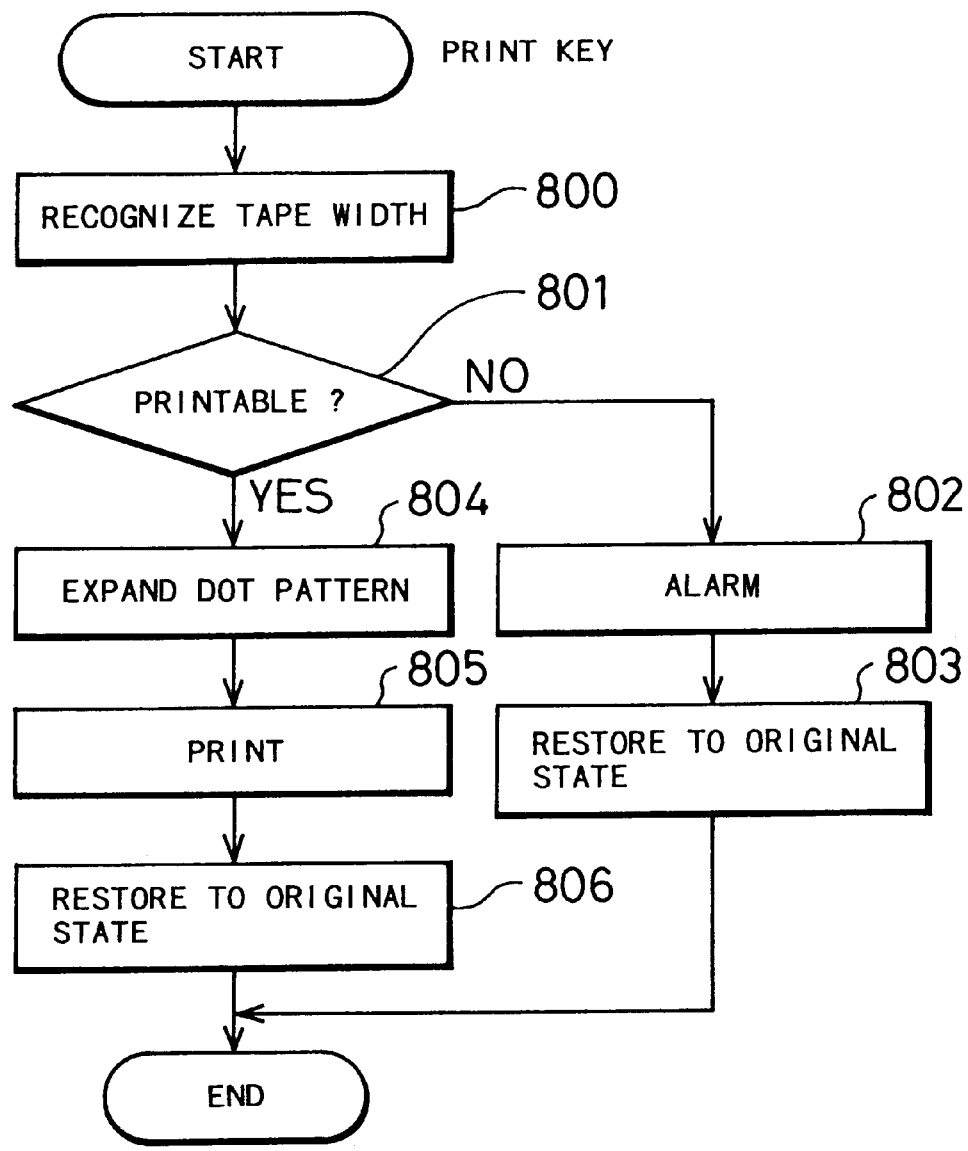
FIG. 55 is a flowchart showing a printing process.

FIG. 55 is a flowchart showing a printing process. The user can print text data stored in the text area 523d at any desirable time.

When a 'Print' key is pressed, the CPU 521 reads out tape width information corresponding to a tape width of a tape cartridge set in the tape printing device 501 at step 800. The CPU 521 then converts relative values in a paragraph style and a character mode previously determined and set to absolute values by referring to a relative values-absolute values conversion table, and determines whether it is possible to print text data according to the paragraph style and the character mode within the tape width at step 801. When printing is determined to be impossible, the program goes to step 802 at which an alarm informs the user of impossible printing, and to step 803 at which the tape printing device 501 is restored to the original state before the printing instruction. When printing is determined to be possible at step 801, on the other hand, the program goes to step 804 at which the CPU 521 expands text data stored in the text area 523d to a dot pattern in the printing buffer 523b according to the absolute values of the paragraph style and the character mode. After the CPU 521 executes actual printing of the text data on the tape at step 805, the tape printing device 501 is restored to the original state before the printing instruction at step 806. In the dot expansion process at step 804, a plurality of paragraphs are arranged in series along a predetermined length of the tape.

This dot or pixel expansion process is executed by taking account of label attribute information (for example, the length of a label and right and left margins) and character attribute (for example, slant or highlighted) as well as paragraph attribute information (paragraph style).

The CPU 521 may directly receive the tape width information from the tape width detection sensor 512 at the beginning of this printing process, or alternatively may read tape printing information out of the RAM 523, which is input from the tape width detection sensor 512 and stored in the RAM 523 when the tape cartridge is set in the tape printing device 501.

FIG. 56 shows an example of the relative values-absolute values conversion table used for three-line printing (subtitle '3Line' in attribute title 'Size') and stored in the ROM 522. The CPU 521 converts a combination of relative character sizes of the three lines in each paragraph to the absolute character sizes according to this table.

In this example, a 6-mm tape or a 9-mm tape are not applicable to printing. When a 12-mm tape is set in the tape printing device 501 and 'small, small, large' without keylines is determined as the paragraph style, the absolute character size is 16×16 dots for the first and second lines and 32×32 dots for the third line. The absolute values-relative values conversion table also defines line spacing information including upper and bottom margins and inter-line spaces (not shown in FIG. 56). Such line spacing information is, however, not given to the user during specification of the paragraph style.

Alternatively, a number of dots obtained by subtracting a required dot number for character printing from a total dot number along the tape width may be allocated to the upper and bottom margins and inter-line spaces according to a predetermined rule in relative-absolute conversion. When the subtitle 'Auto' is selected as the 'Size' attribute information, a fixed conversion method for the subtitle '1 Line' is applied to one-line printing in 'Auto' and the same for the subtitle '2 Line' to two-line printing in 'Auto'.

FIG. 57 shows another example of the relative values-absolute values conversion table, which is applied to the relative character sizes set in the attribute information 'Ornament' of the character mode. For example, when a basic character size is set equal to 32×32 dots, the character size applied is 32×32 dots for 'Standard Size', 24×24 dots for 'Small Size', and 16×16 dots for 'Smallest Size'. The 'Standard Size' or 'Small Size' may not be applicable according to the basic character size.

As described above, the concept of 'paragraph' is introduced in this embodiment. The paragraph includes one or a plurality of lines printed in one column on the tape and defines an arrangement of text data on a label. Each paragraph has attribute information, which is previously set and fixed unless modification of the paragraph style is instructed. Text data are input and printed according to a predetermined paragraph style representing the attribute information. This allows the user to obtain a label with text data printed thereon in a desirable arrangement.

In this embodiment, a press of the 'Compulsory Return (CR)' key does not increase the number of lines previously set in each paragraph nor substantially delete a row of characters, thus not changing the paragraph attribute information. This ensures that the paragraph attribute information is modified only by the above setting or modification process, and not changed against intention of the user.

When the user instructs deletion of a certain line in a paragraph, that is, deletion of the line head mark, the tape printing device 501 of the embodiment keeps the certain line as a vacant line not to change the predetermined number of lines of the paragraph, thus allowing desirable label printing according to the predetermined paragraph attribute information.

When a target paragraph for setting or modification of the paragraph style has at least one substantial line with text data, the possible choice of the 'Size' attribute information is the number of lines equal to or greater than the number of the substantial lines. This effectively prevents the substantial lines from being erased in setting or modification of the paragraph style. The user is thus not required to input the same row of characters again.

The tape printing device 501 stores character size information for one-line paragraphs and combination of character size and line spacing information for plural-line paragraphs as a menu. The user can readily specify the character size by selecting a desirable character size attribute among choices of the menu.

The menu contains information not as absolute values but as relative values, where the relative values are converted to absolute values according to the width of the tape set in the tape printing device 501. This simplifies the selection procedure.

The system of the embodiment displays each relative character size combination in graphics, this further simplifying the selection procedure. The menu includes plural choices of relative character size combinations, that is, plural layout choices, for each number of lines. The user can select a desirable layout among the plural choices.

In the structure of the embodiment, the user specifies the character size attribute as relative values, which are converted to absolute values according to the tape width in the printing process. This effectively prevents printing out of the tape width, which is sometimes found in the conventional printing device to cause stains on a label or change the diameter of the platen due to ink applied on the platen.

When substantially the same lengths of lines are preferable in one paragraph, the size of each character may be specified. In this case, however, the possible choices of the character size are those not greater than a specific character size previously determined for the lines. This allows appropriate printing even after change in the character size.

The attribute title 'Size' includes a subtitle 'Auto' as a possible choice, wherein the paragraph attribute is determined according to the tape width and input text data. In this 'Auto' setting, the user is not required to specify details of attribute information for each paragraph.

In the 'Auto' setting, the user can distinctively distinguish effective vacant lines from non-effective vacant lines which are virtually displayed but do not exist substantially.

The character size attribute information may be set as absolute values instead of relative values in the embodiment. Although the menu has to include a greater number of character size combinations such absolute value specification, the printing process is simplified.

Although relative values of the character size attribute are converted to absolute values according to the conversion table in the embodiment, conversion may be implemented according to a predetermined operation. For example, when the maximum dot number along the tape width (12-mm tape) is 72 dots and three-line printing of 'large, small, small' is specified, a dot number x for the relative size 'large' satisfies the relationship expressed as [x+0.5x+0.5x=or <72] and is the maximum among prepared character sizes. When the prepared character sizes include 16×16 dots, 24×24 dots, 32×32 dots, and 48×48 dots, x is equal to 32. The relative size 'large' is thus equal to 32×32 dots whereas 'small' is equal to 16×16 dots. The remaining dots, that is, 72−64=8 dots, are allocated to the upper and bottom margins and the inter-line spaces.

The structure of the second embodiment may be changed or modified in any other way: for example, the maximum number of printing lines is set equal to five or greater; tape cartridges of six or more different tape widths are applicable to the tape printing device; the liquid-crystal display 535 has a large screen to display a plurality of choices in the menu simultaneously, paragraph attribute information does not include 'Ornament' data, and the inter-paragraph spaces along a predetermined length of the tape are specified as attribute data.

A third embodiment of the invention is described according to the drawings.

(A) Hardware Structure

Figure 58:
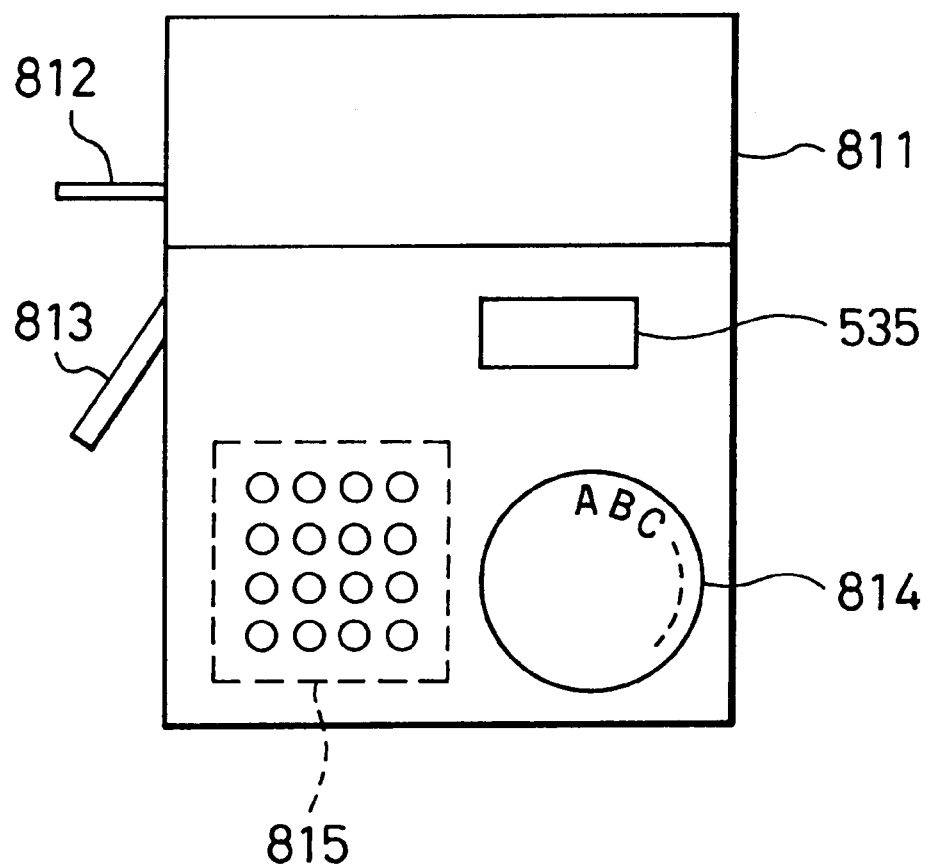
FIG. 58 is a plan view showing an appearance of a third embodiment according to the invention.

FIG. 58 shows general appearance of a tape printing device of the third embodiment, which has an electric structure similar to that of the second embodiment.

As shown in FIG. 58, a tape 812 mounted on a tape cartridge holder unit 811 is cut at an arbitrary position to a label through operation of a cut lever 813. The user can input a desirable series of characters by operating a dial key 814 and specify required information or instruct a variety of processes through operation of a keyboard 815 which includes a character size key, an inter-character space key, a line spacing key, a margin key, a scroll key, a printing image display key, and a print key. Text data consisting of a series of characters or a printing image of the text data is displayed in a black and white liquid-crystal display 535.

Operation of the tape printing device of the third embodiment are described briefly.

Figure 59:
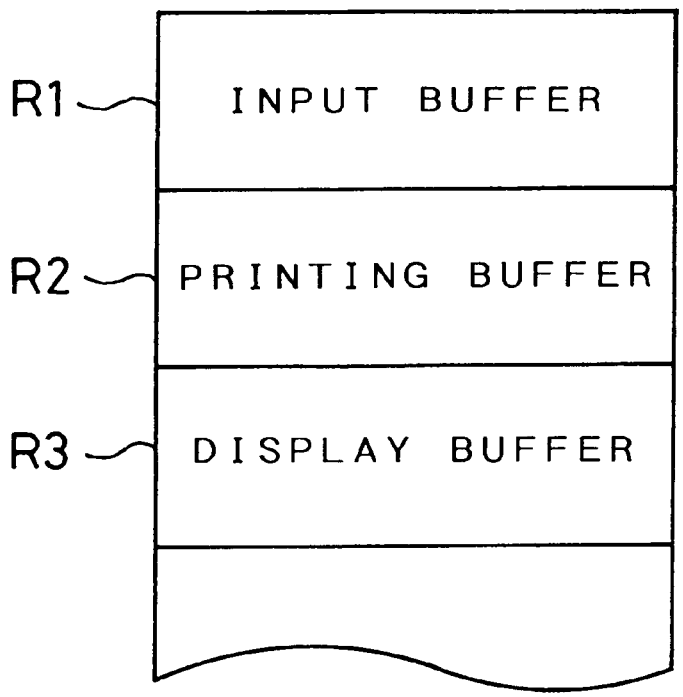
FIG. 59 shows an exemplified structure of a RAM for storing data.

When the user operates the dial key 814, a CPU 521 receives code data corresponding to an input character from a key input element 511, and reads pattern data corresponding to the code data out of a CG-ROM 524 to write the pattern data in a text display buffer R3 of a RAM 523 shown in FIG. 59. The pattern data written in the text display buffer R3 is read out synchronously with display operation and supplied to a display driving circuit 536. The input character is then displayed on the screen of the liquid-crystal display 535. When the user checks the input character displayed on the screen and presses a 'Registration' key, the CPU 521 writes the code data in an input buffer R1 of the RAM 523 (see FIG. 59). A series of characters constituting a desirable text are successively input and displayed in the above manner.

While text data are input with the dial key 814, the character size, the inter-character spacing, the line spacing, the margins, and other required information are specified through operation of the keyboard 815. The CPU 521 then writes attribute data such as the character size and the inter-character spacing output from the key input element 511 into the input buffer R1 of the RAM 523.

When the user operates the 'Printing Image Display' key after input of text data, the CPU 521 expands pattern data for displaying a printing image in a printing image display buffer R2 of the RAM 523 (details of this process will be described later).

The pattern data expanded in the printing image display buffer R3 is read out synchronously with display operation and supplied to the display driving circuit 536. The printing image of text data is then displayed on the screen of the liquid-crystal display 535.

When the user checks the printing image and operates the 'Print' key, the CPU 521 reads pattern data for printing a text out of the CG-ROM 524 according to registration in the input buffer R1 and writes the pattern data into a printing buffer R2 of the RAM 523.

The pattern data written in the printing buffer R2 is read out synchronously with tape feeding operation and supplied to a head driving circuit 534. The text is then printed on the tape 812.

The user finally cuts the tape 812 with the text printed thereon at a predetermined position to a label.

Display of the printing image is described more in detail. When the character size, the line spacing, and other attribute information can be specified irrespective of the width of the tape 812 set in the tape printing device, it is preferable to show a printing image having text data within the tape width and that having text data partly out of the tape width. When text data can be input whether the tape 812 is set in the printing device or not, it is preferable to show a printing image under a condition that the tape 812 is set in the device and that under a condition without the tape 812. In this embodiment, these three printing images are thereby displayed.

FIG. 60 shows a printing image where a text is within a predetermined tape width, FIG. 61 shows a printing image where the text is partly out of the predetermined tape width, and FIG. 62 shows a printing image of the text under a condition that the tape 812 is not set in the tape printing device. An example of such a text is shown in FIG. 63. In the drawings, the numerals 851, 852, and 853 respectively show a background, a label, and a series of characters (A, B, . . . ) of the text.

When the whole text is within the predetermined tape width as in the example of FIG. 60, the label is shown in a specific color different from that of the background. For example, the background is displayed in white whereas the label is shown in black. Each character display 853 of the text is shown in a certain color, for example, in white, as a square block having a size corresponding to the specified character size.

When the text is partly out of the predetermined tape width as in the example of FIG. 61, the characters display 853 of the text are displayed in a different way whereas the background display 851 and the label display 852 are shown in the same way as in the example of FIG. 60. A portion 'a' of each character display 853 placed within the label display 852 is shown in white while another portion 'b' out of the label display 852 is displayed in black.

When no tape 812 is set in the tape printing device as in the example of FIG. 62, the label display 852 is not displayed whereas all the characters display 853 are shown in black. This means that all the characters display 853 are out of the tape width.

Figure 64:
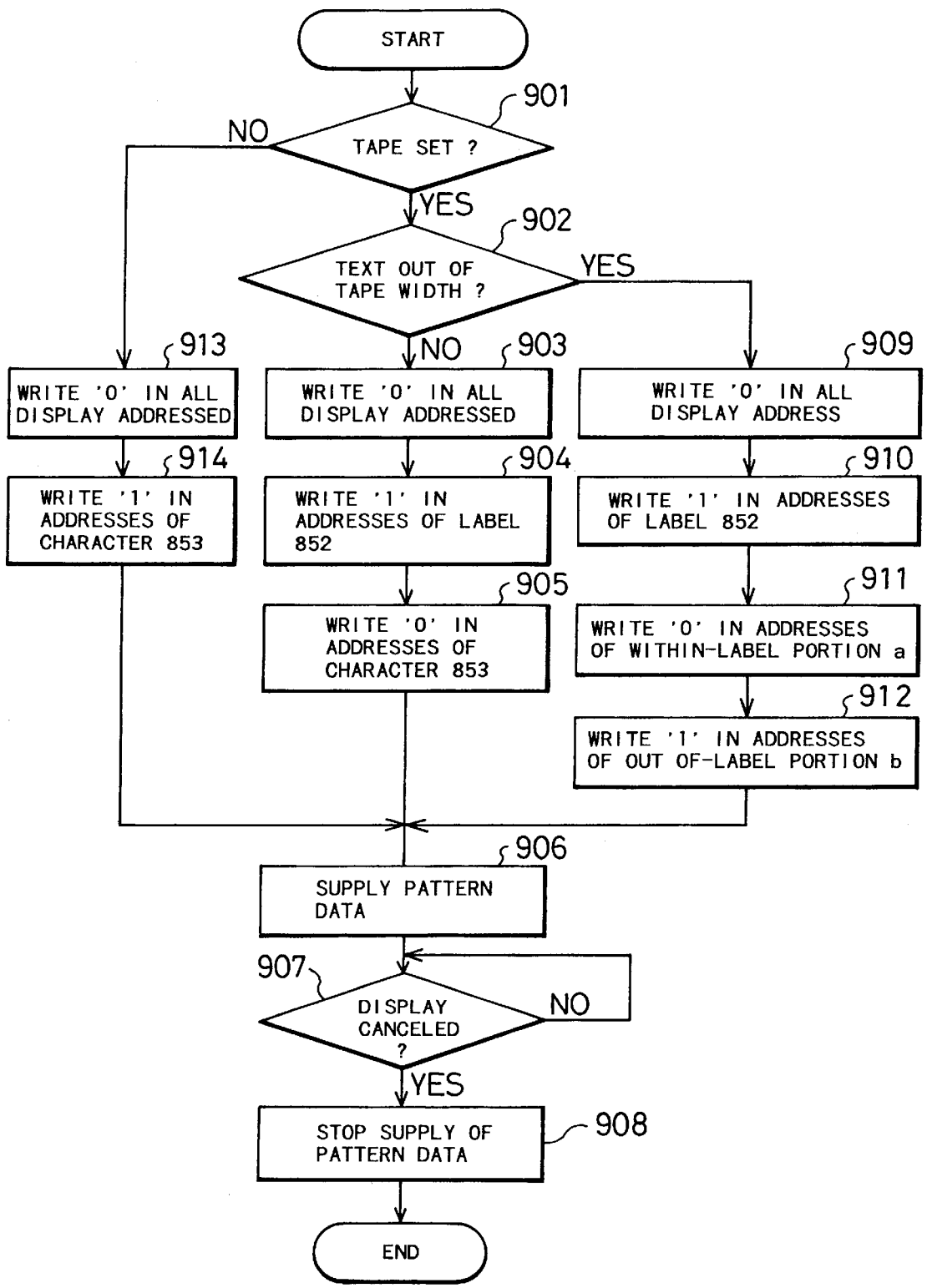
FIG. 64 is a flowchart showing a printing image display process executed by the CPU 521.

A process routine for displaying these three printing images executed by the CPU 521 is described hereinafter according to the flowchart of FIG. 64.

When the user presses the 'Printing Image Display' key, the program enters the routine and the CPU 521 determines whether the tape 812 is set in the tape printing device based on an output from the tape width detection sensor 512 at step 901. When the tape width detected by the tape width detection sensor 512 output zero signal, the CPU 521 determines that no tape 812 is set in the device. When the tape width detection sensor 512 output non-zero signal, on the contrary, the CPU 521 determines that the tape 812 is set in the device.

In the latter case, the program goes to step 902 at which the CPU 521 determines whether a text is within a predetermined width of the label display 852 based on an output from the tape width detection sensor 512 and character size data and line spacing data stored in the input buffer R1 of the RAM 523 at step 902. In the example of FIG. 63, when S1+S2+L (S1: size specified for the characters A, B, . . . ; S2: size specified for the characters a, b, . . . : L: specified line spacing) is not greater than a tape width W, the CPU 521 determines that all the text is within the predetermined width of the label. When S1+S2+L is greater than W, on the other hand, the CPU 521 determines that the text is partly out of the predetermined width.

When the text is within the predetermined width, the program goes to steps 903 through 905 to expand pattern data for displaying a printing image of FIG. 60 in the printing image display buffer R2.

Figures 65A, 65B, 65C:
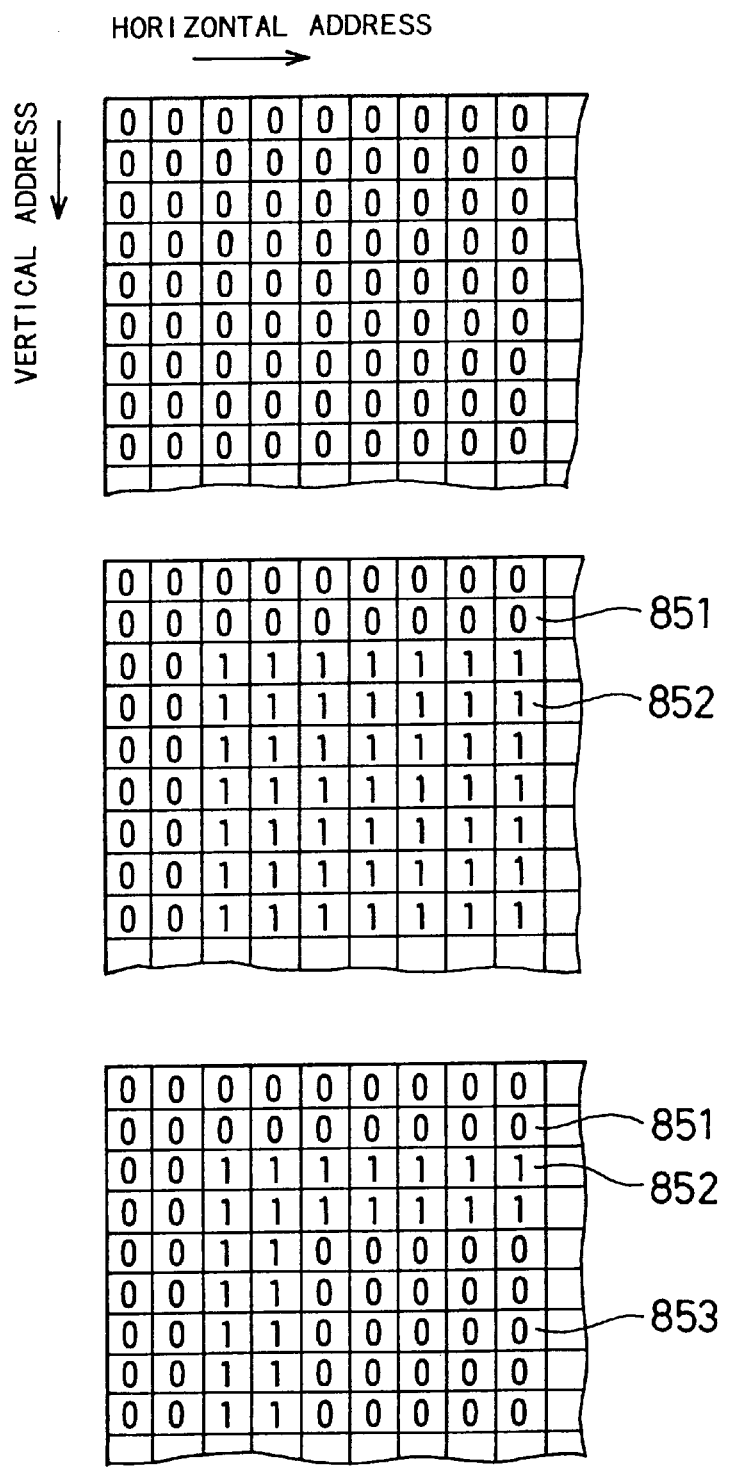

More concretely, at step 903, white data '0' is written in all addresses of the printing image display buffer R2 as shown in FIG. 65A. At step 904, black data '1' is written in addresses corresponding to the label display 852 as shown in FIG. 65B. The program then goes to step 905 at which white data '0' is again written in addresses corresponding to each character display 853 as shown in FIG. 65C.

After the pattern data for displaying a printing image as in the example of FIG. 60 is written in the printing image display buffer R3, the program goes to step 906 at which the CPU 521 supplies the pattern data to the display driving circuit 536 to display the printing image. When a 'Display Cancel' key is pressed at step 907, the program goes to step 908 at which the CPU 521 stops supply of the pattern data to the display driving circuit 536 to cancel display of the printing image.

When it is determined that the text is partly out of the predetermined width of the label at step 902, the program goes to steps 909 through 912 to expand pattern data for displaying a printing image of FIG. 61 in the printing image display buffer R2.

Figure 66A:
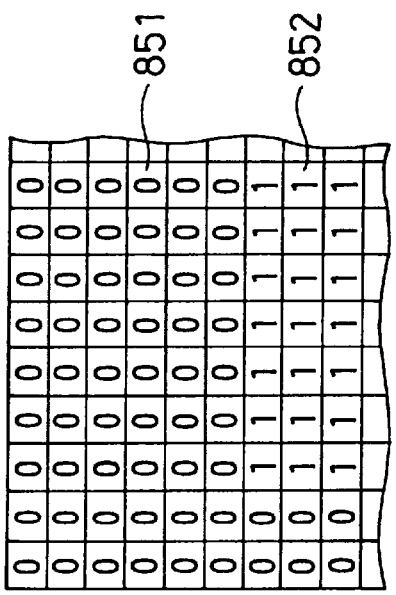
FIGS. 66A through 66D show expansion of pattern data where the text is partly out of the tape width.
Figure 66B:
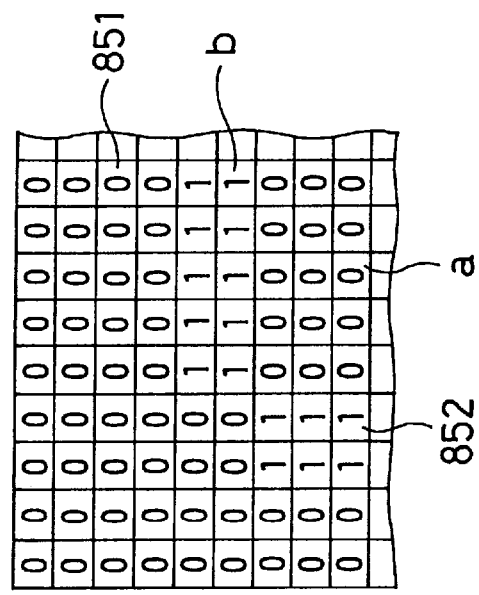
Figure 66C:
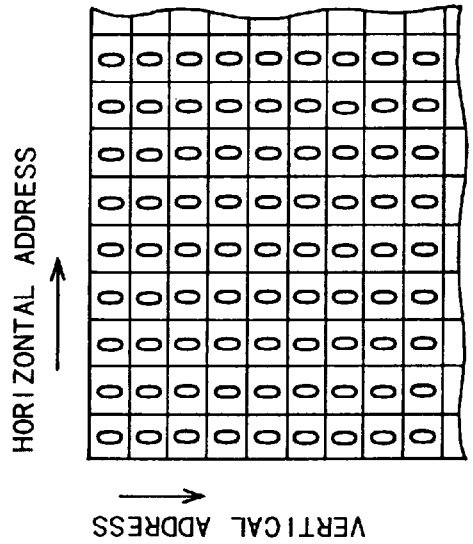
Figure 66D:
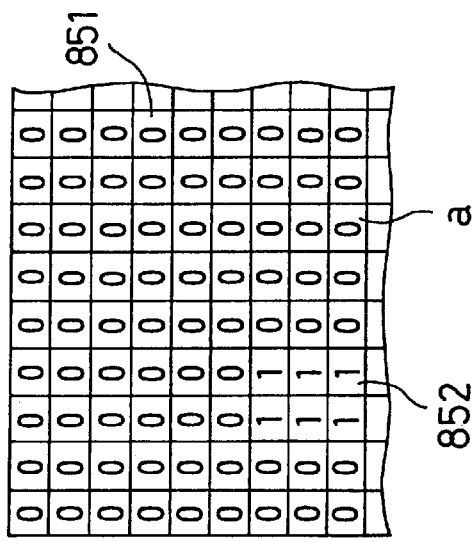

More concretely, at step 909, white data '0' is written in all addresses of the printing image display buffer R2 as shown in FIG. 66A. At step 910, black data '1' is written in addresses corresponding to the label display 852 as shown in FIG. 66B. The program then goes to step 911 at which white data '0' is written in addresses corresponding to the within-label portion 'a' of each character display 853 as shown in FIG. 66C, and to step 912 at which black data '1' is written in addresses corresponding to the out of label portion 'b' of each character display 853 as shown in FIG. 66D. After the pattern data for displaying a printing image as in the example of FIG. 61 is prepared, the program goes to step 906 to display the printing image as described above.

Figure 67A:
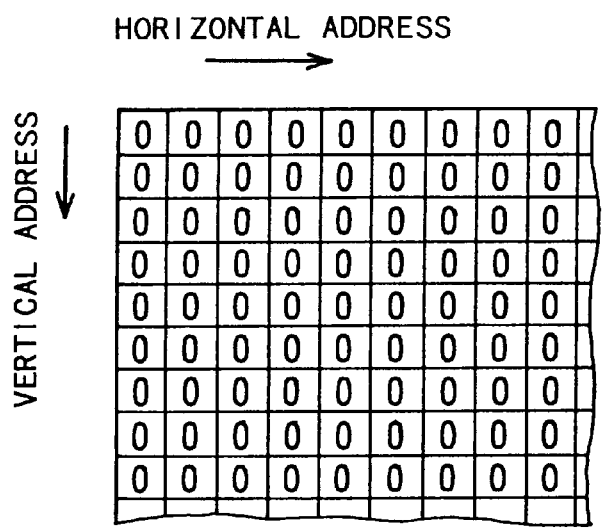
FIGS. 67A and 67B show expansion of pattern data where no tape is set in the tape printing device.
Figure 67B:
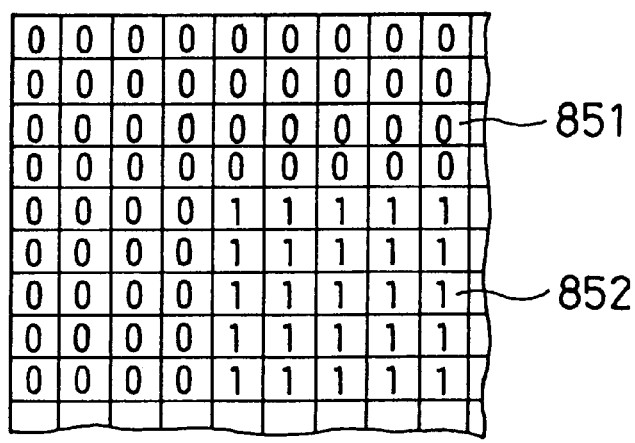

When the CPU 521 determines that no tape 812 is set in the tape printing device at step 901, the program goes to step 913 at which white data '0' is written in all addresses of the printing image display buffer R2 as shown in FIG. 67A, and to step 914 at which black data '1' is written in all addresses corresponding to each character display 853 as shown in FIG. 67B. After the pattern data for displaying a printing image as in the example of FIG. 62 is prepared, the program goes to step 906 to display the printing image as described above.

Display start positions and display sizes of the label display 852 and each character display 853, that is, writing start positions and writing sizes of display data, are determined according to the tape width detected by the tape width detection sensor 22 and character size data, inter-character spacing data, line spacing data, and margin data stored in the input buffer R1. The display start position and display size of each character display 853 are determined by regarding display dots overlapped for both the label display 852 and the character display 853 as the dots of the label display 852. This allows the narrow inter-character spacing or line spacing to be appropriately displayed in the printing image.

The character size, the inter-character spacing, the line spacing, and the margins are defined not by the number of display dots but by the number of printing dots. One display dot is generally larger than one printing dot in dimensions. All the display dots corresponding to the inter-character space or line space may also represent part of the character display 853 when the character space or the line space is significantly narrow. When these overlapped display dots are regarded as those for the character 852, the printing image displayed on the screen does not have any character space or line space. In the structure of the embodiment, all the display dots overlapped for both the label display 852 and the character display 853 are accordingly regarded as those for the label display 852. This allows the inter-character space or the line space to be appropriately displayed in the printing image even when the specified inter-character space or line space is significantly narrow.

Figure 68:
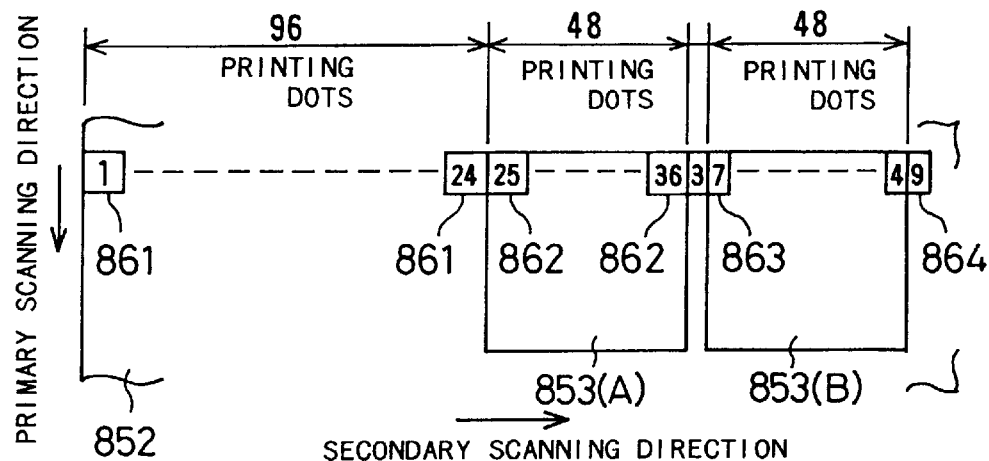
FIG. 68 shows an example of sizes specified for characters and an inter-character space as the number of printing dots.

FIG. 68 shows an example of sizes specified for a left margin, characters A and B, and an inter-character space as the number of printing dots. The method of determining the display start position and display size (in horizontal direction) of the characters A and B is explained according to the drawing of FIG. 68.

Figure 69:
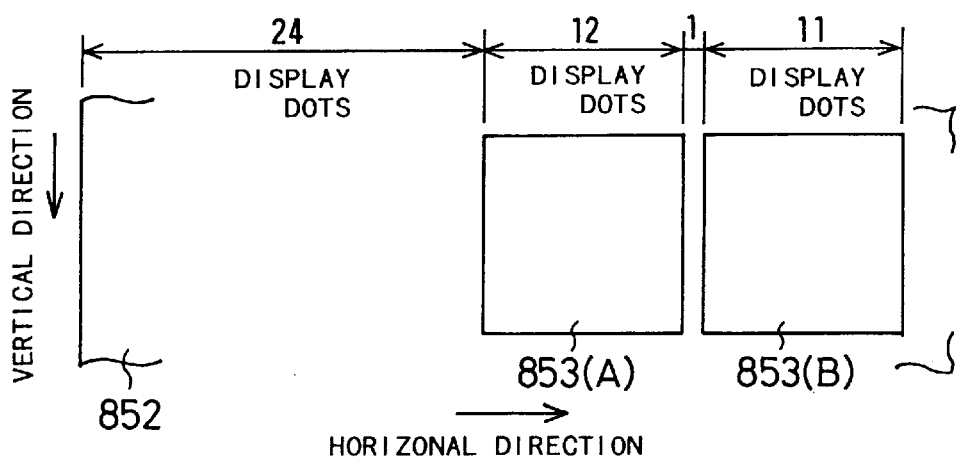
FIG. 69 shows a method of specifying a display start position and a display size.

In this example, the size of the left margin is specified as 96 printing dots, where one display dot corresponds to printing dots of 4 (in primary scanning direction) by 4 (in secondary scanning direction). All display dots 61 corresponding to the left margin do not represent any other part. The display size of the left margin in the horizontal direction is thereby equal to 24 display dots, and the display start position of the character A in the horizontal direction is at a 25-th display dot from the left end of the label display 852 as shown in FIGS. 68 and 69.

The size of the character A is specified as 48 printing dots. All display dots 862 corresponding to the character A do not represent any other part. The display size of the character A in the horizontal direction is thereby equal to 12 display dots as shown in FIG. 69.

In this example, the inter-character space is specified as 2 printing dots as shown in FIG. 68. All display dots 863 corresponding to the inter-character space also represent part of the character B, where the overlapping width is equal to two printing dots. Since all such display dots 863 are regarded as dots for the label display 852 in the structure of the embodiment, a space of one display dot width is set between the characters A and B as shown in FIG. 69, and the display start position of the character B in the horizontal direction is at a 38-th display dot from the left end of the label display 852. Although the size of the character B is specified as 48 printing dots, two printing dots are used for the inter-character space as described above. The effective size of the character B is 46 printing dots, accordingly. In the same manner, all display dots 64 placed at the right end of the character B also represent an inter-character space between the characters B and C, where the overlapping width is 2 printing dots. This further reduces the effective size of the character B to 44 printing dots and makes the display size of the character B equal to 11 display dots as shown in FIG. 69.

Figure 70:
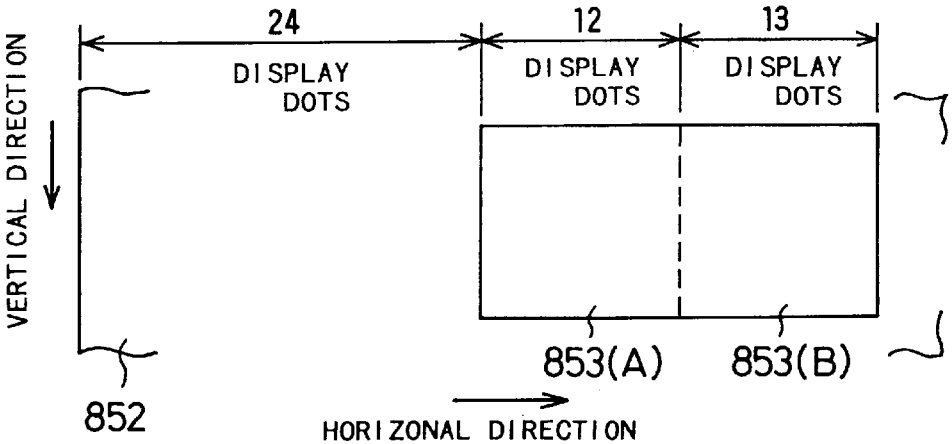
FIG. 70 shows another method of specifying a display start position and a display size.

When all the display dots overlapped for both the label display 852 and the character display 853 are regarded as those for the character display 853, no inter-character space is displayed between the characters A and B as shown in FIG. 70.

The structure of the third embodiment has advantages as described below.

(1) Pattern data for displaying a printing image of the label and the characters display 853 has a structure similar to that of pattern data for printing a text, except an inverted display. The pattern data for displaying a printing image is thereby prepared by inverting the polarity of the text-printing pattern data generated according to a printing software. This structure does not require a separate software for displaying a printing image and effectively saves the memory capacity.

(2) The printing image displayed on the screen does not include a contour of the label display 852. The user can thus distinctively identify a keyline, which is otherwise made unclear due to overlapping or close arrangement of the keyline and the label contour.

(3) The printing image has a wider effective display area by a width of the label contour.

(4) When the text is partly out of the predetermined width of the label, the printing image includes the out of label portion 'b' of each character display 853 displayed inversely to inform the user of the inappropriate tape width or character attribute information.

(5) When no tape 812 is set in the tape printing device, the printing image does not include the label but has all the characters displayed inversely to inform the user of no setting of the tape 812.

(6) All display dots overlapped for both the character and the label are regarded as those for the label. This allows the inter-character space or the line space to be appropriately displayed in the printing image even when the specified inter-character space or line space is significantly narrow. The plurality of characters display 853 are always displayed via a predetermined inter-character space.

(7) The structure of the embodiment displays each character as a square block having a size corresponding to that of the character. The user can thus distinctively identify even a very small character in the printing image.

(8) The pattern data for displaying a printing image is expanded by overwriting black or white data in the background display 851, the label display 852, and the character display 853 in this order. This effectively shortens the time required for data expansion.

The structure of the third embodiment may be modified or changed in various ways. Some examples of modification are given below.

(1) Although the display sizes of both the label and the character are determined according to the tape width and attribute information such as character size data in the embodiment, the size of either the label display 852 or the character display 853 may be changed with respect to the other display size previously fixed.

(2) In the tape printing device of the embodiment, character size data and other attribute information required for displaying a printing image are specified irrespective of the tape 812 set in the device. The essential features of the embodiment may, however, be applicable to another tape printing device where attribute information is defined by the tape width. In this case, the function for displaying text data out of the tape width is not required.

The character may be displayed as a real character image in place of the square box. The printing image may be displayed in color instead of in black and white.

A fourth embodiment of the invention is described hereinafter according to the drawings. A tape printing device of the fourth embodiment has an appearance, an internal mechanism and an electric structure identical with those of the third embodiment.

Figure 71:
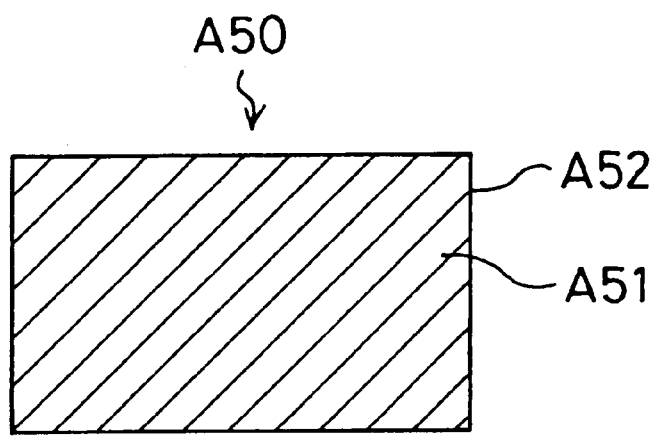
FIG. 71 shows an example of a framed shade pattern in a fourth embodiment.

A process of giving ornamental effects to characters including letters and symbols is explained. In an example, a character is decorated by a framed shade pattern A50, which consists of a shade A51 and a frame A52 surrounding the shade A51 as shown in FIG.71. The user first operates a 'Character Ornament' key on the keyboard 815 to display a menu including a choice 'Framed Shade Pattern' on the liquid-crystal display 535. When the user selects the choice 'Framed Shade Pattern', a plurality of framed shade patterns A50 having different shapes and densities of the shade A51 and different thickness of the frame A52 are displayed on the screen. After the user selects a desirable framed shade pattern A50 out of the plural choices, the screen changes to display an image with input character data. The user then defines an ornament range with the aid of cursor positioning and operates the 'Print' key on the keyboard 815 to implement printing of the character data according to the specified character ornament information.

Figure 72:
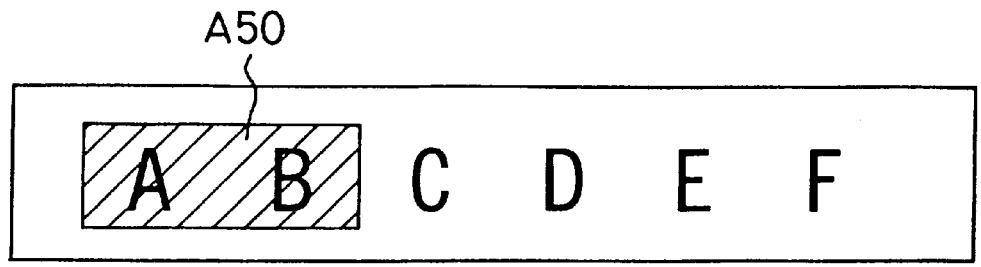
FIG. 72 shows an exemplified print with a framed shade pattern.

FIG. 72 shows a label obtained by such a printing process. In this example, the framed shade pattern A50 is printed over two characters A and B out of six characters A through F.

Figure 73:
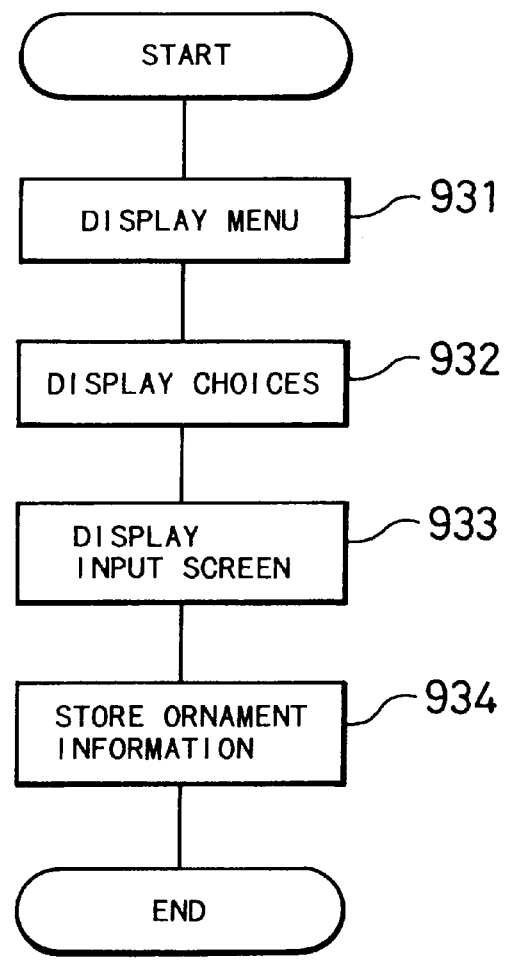
FIG. 73 is a flowchart showing control of the CPU 521 in character ornament process.

FIG. 73 is a flowchart showing control of the CPU 521 in specification of character ornament information. When the user presses the 'Character Ornament' key, the CPU 521 first displays a menu on the liquid-crystal display 535 at step 931. For example, the CPU 521 expands pattern data for the menu stored in the CG-ROM 524 in a display buffer R3 of the RAM 523 to show the menu.

When the user selects the choice 'Framed Shade Pattern' from the menu, the program then goes to step 932 at which a plurality of framed shade patterns A50 are shown on the liquid-crystal display 535. For example, the CPU 521 expands pattern data for the plurality of patterns A50 stored in the CG-ROM 524 in the display buffer R3 of the RAM 523 to show the plurality of patterns A50.

After the user selects a desirable framed shade pattern A50, the program goes to step 933 at which the CPU 521 expands pattern data stored in the CG-ROM 524 in the display buffer R3 based on code data stored in an input buffer R1 to show an image with input character data on the liquid-crystal display 535.

When the user specifies an ornament range, the program goes to step 934 at which character ornament information is stored in the input buffer R1 for printing the desirable framed shade pattern A50. The character ornament information includes type data representing the framed shade pattern A50 selected by the user and range data representing the ornament range specified by the user.

Figure 74:
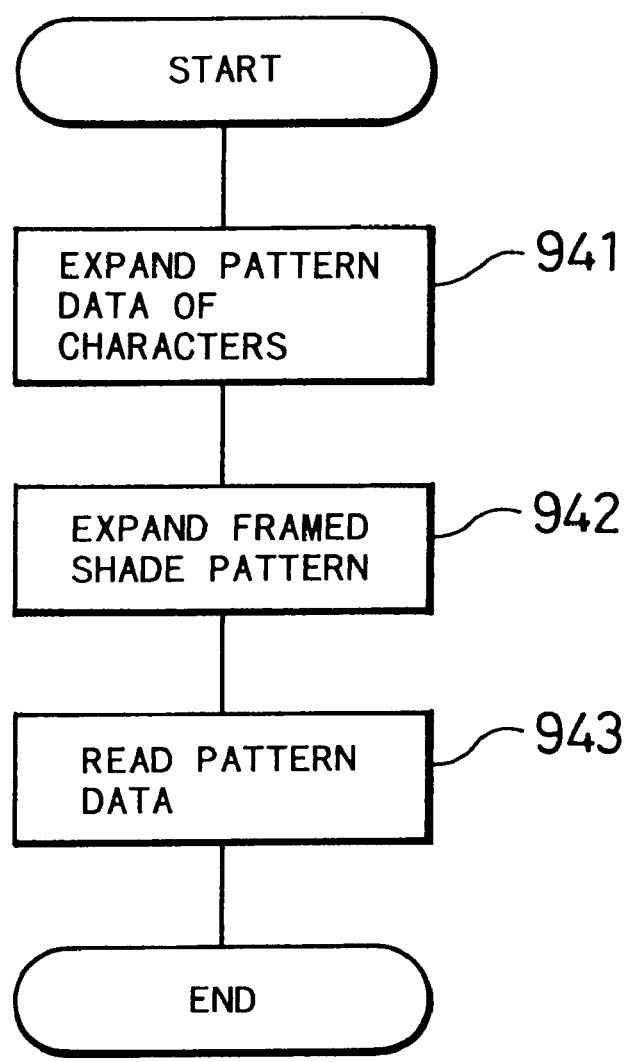
FIG. 74 is a flowchart showing control of the CPU 521 in printing process.

FIG. 74 is a flowchart showing control of the CPU 521 in the printing process. At step 941, the CPU 521 reads pattern data corresponding to input characters from the CG-ROM 524 and expands the pattern data in a printing buffer R2 of the RAM 523 according to code data stored in the input buffer R1.

Figure 75:
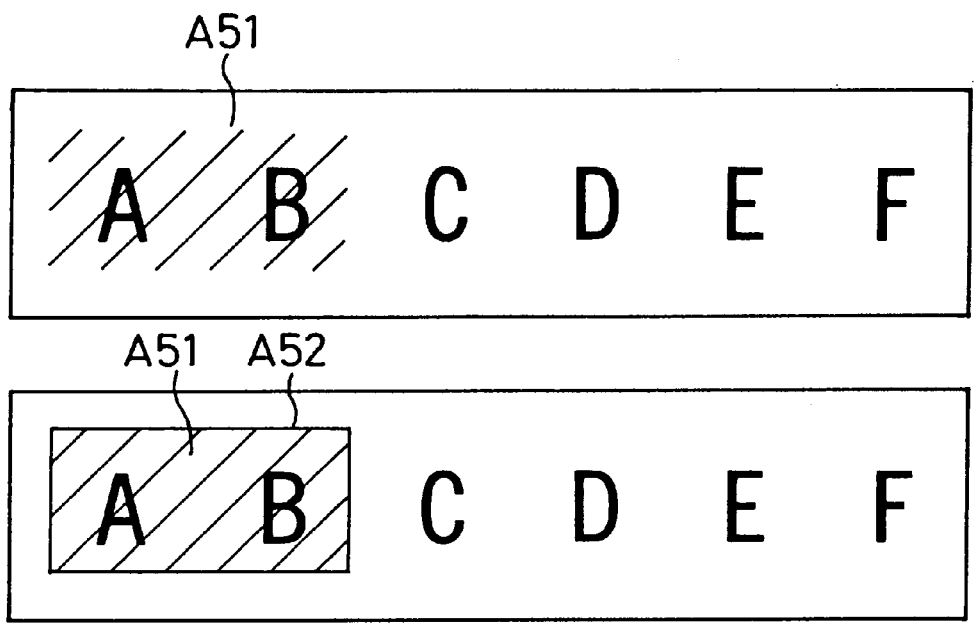
FIGS. 75A and 75B show an expansion of pattern data of the framed shade pattern.

The program then goes to step 942 at which pattern data for the selected framed shade pattern A50 is expanded in the printing buffer R2 of the RAM 523. First, the CPU 521 reads pattern data for the shade A51 from the CG-ROM 524 based on the character ornament information stored in the input buffer R1 and expands the pattern data in the printing buffer R2 as shown in FIG. 75A. The CPU 521 then successively writes pattern data for the frame A52 by each dot in the printing buffer R2 as shown in FIG. 75B.

After completion of this expansion process, the program proceeds to step 943 at which the CPU 521 reads the pattern data out of the printing buffer R2 synchronously with motor activation by the motor driving circuit 533 to start printing the input characters and the framed shade pattern A50.

Figure 76:
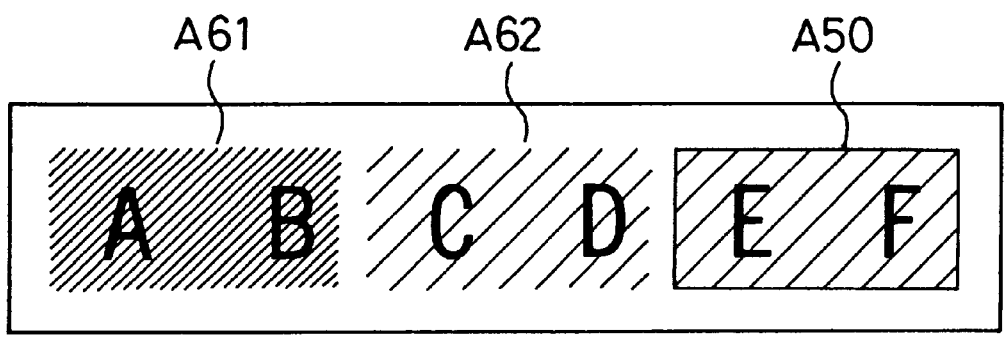
FIG. 76 shows comparison between characters having different ornament patterns.

In the structure of the fourth embodiment, the framed shade pattern A50 is used to make certain characters sufficiently prominent irrespective of the density of the shade. A keyline generally makes the difference between two parts across the keyline distinctly observable. The frame A52 of the framed shade pattern A50 functions as such a keyline to emphasize the characters in the framed shade pattern A50 even when the shade A51 has a relatively low density. FIG. 76 shows comparison between characters screened by a thick shade A61, a thin shade A62, and the framed shade pattern A50 of the embodiment. As clearly seen in FIG. 76, the thick shade A61 makes the characters indistinct whereas the thin shade A62 can not sufficiently emphasize the characters. The framed shade pattern A50 including the thin shade A51 surrounded by the frame A52 makes the characters effectively distinct and prominent.

The structure of the fourth embodiment includes the choice 'Framed Shade Pattern' in the menu, thus allowing the user to specify a desirable framed shade pattern by simple selection.

The structure of the fourth embodiment may be modified and changed in various ways. Some examples of modification are given below.

(1) Although the framed shade pattern A50 is printed over two characters in the embodiment, only one character or any number of characters in one line or characters in a plurality of lines may be processed by the screening.

(2) The type of the framed shade pattern A50 may be specified automatically according to character size data and other attribute information not by selection of the user.

A fifth embodiment of the invention is now described according to the drawings. The hardware structure of the fifth embodiment is the same as those of the above embodiments.

Figure 77:
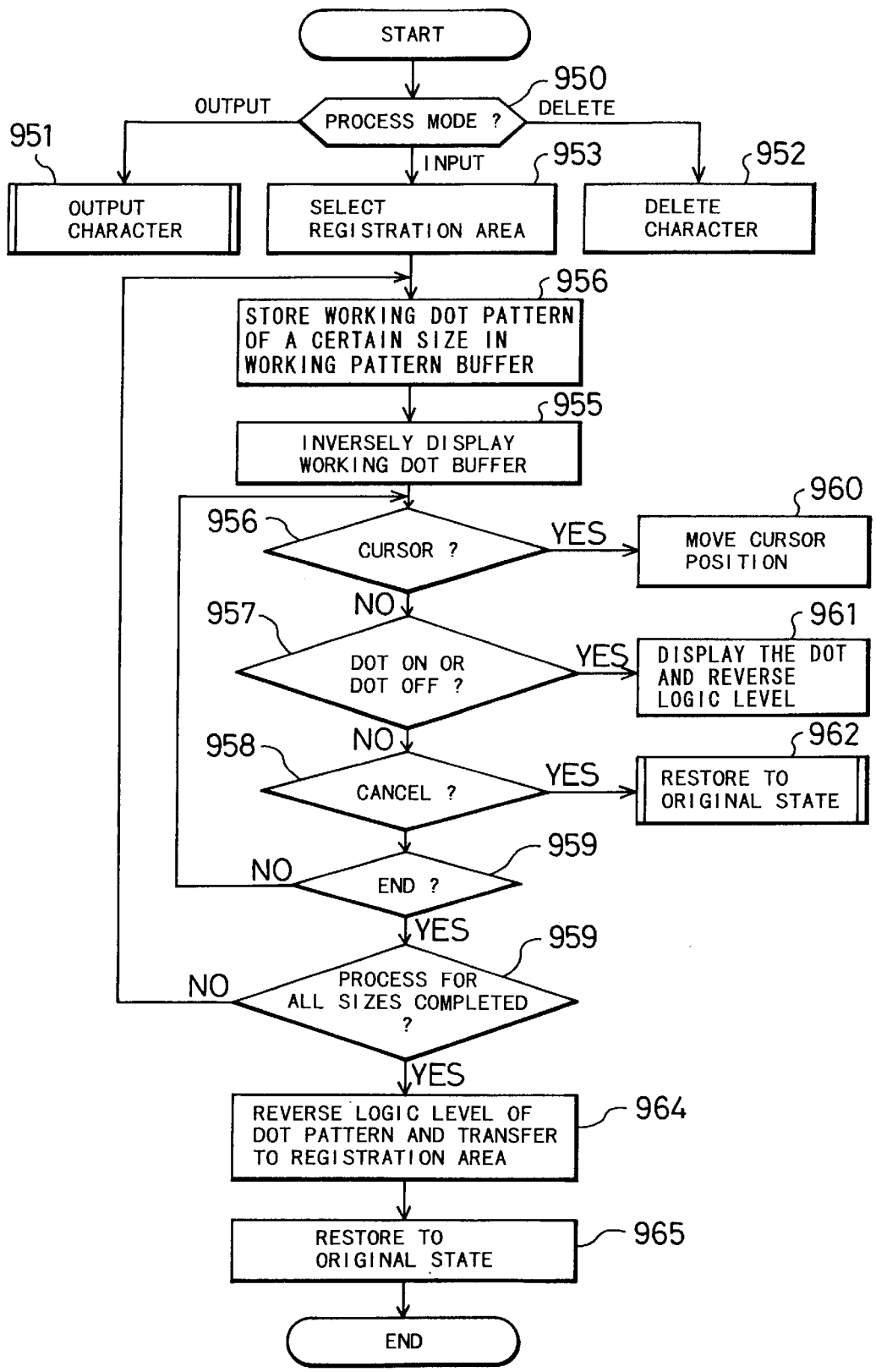
FIG. 77 is a flowchart showing a foreign character registration process in a fifth embodiment.

In the fifth embodiment, when the user selects a foreign character mode, the CPU 521 starts a process routine shown in the flowchart of FIG. 77. Foreign character is a character which the user independently determines and defines. At step 950, the CPU 521 first determines whether the user instructs a foreign character input process, a foreign character output process, or a foreign character deletion process.

When the user selects the foreign character output process, the program goes to step 951 to read a specified foreign character out of a plurality of foreign characters previously stored in a foreign character registration area 523a of the RAM 523. When the user selects the foreign character deletion process, the program goes to step 952 to delete a specified foreign character previously input in the foreign character registration area 523a. These output process and deletion process are not essential features of the embodiment and thereby not described in detail.

When the user selects the foreign character input process, the program goes to step 953 at which the CPU 521 reads section data (a foreign character identification number) in the foreign character registration area 523a. The tape printing device has a relatively small memory capacity and stores only several foreign characters. The foreign character registration area 523a of the RAM 523 is divided into a plurality of sections corresponding to the maximum foreign character number. Each section has a foreign character identification number. In other words, each section corresponds to a foreign character identification number.

When a foreign character identification number is input, the program goes to step 954 at which the CPU 521 reads a dot pattern of a specific size stored in the selected section of the foreign character registration area 523a and inversely writes the dot pattern into an area of the specific size in a working pattern buffer 523b of the RAM 523. When no foreign character is previously registered, a dot pattern representing a background is stored in the area. The program then goes to step 955 at which the CPU 521 inputs the dot pattern written in the working pattern buffer 523b as a working dot pattern for creating a foreign character as well as control information into a display buffer 523c to inversely display the working dot pattern on the liquid-crystal display 535.

In the tape printing device, a plurality of sizes are applied to each character. A plurality of dot patterns of different sizes are thereby generated for each foreign character through repeated input operation for each size.

Figure 78:
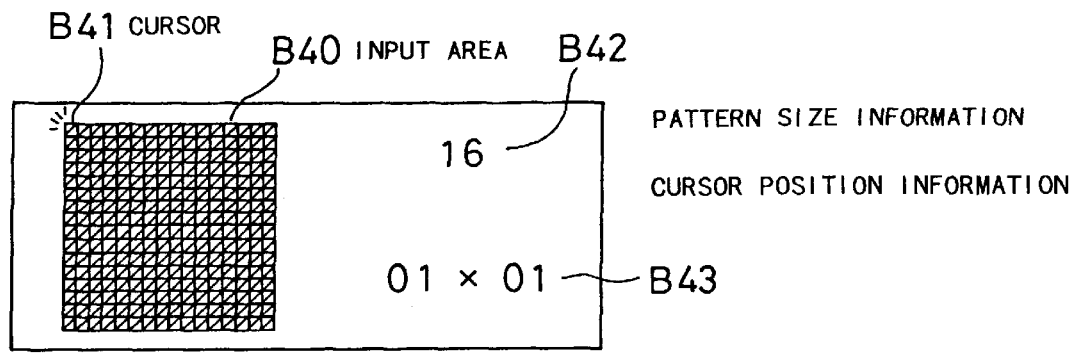
FIG. 78 shows an exemplified display of a working dot pattern for creating a foreign character.

FIG. 78 shows an exemplified screen displayed at step 955. The working dot pattern is inversely or negatively displayed as an input area B40, where a cursor B41 is displayed in flickering manner. The screen also includes pattern size information B42 for defining a registration pattern size (16×16 dots in the example of FIG. 78), and cursor position information B43 for defining a cursor position as counts in a primary scanning direction and a secondary scanning direction from a left-upper dot of the input area B40.

The CPU 521 then determines whether the user operates certain keys on the input unit 510 at steps 956 through 959. More concretely, it is repeatedly determined in this order whether the user operates one of the cursor keys (step 956), the 'Dot-on' or 'Dot-off' key (step 957), the 'Mode Cancel' key for cancellation of the foreign character mode (step 958), and the 'End' key showing completed generation of the dot pattern of a target size (step 959).

When one of the cursor keys is operated, the program goes to step 960 at which the CPU 521 moves the displayed position of the cursor B41 on the liquid-crystal display 535 according to operation of the cursor keys and modifies the cursor position information B43, and then goes to step 957 to determine operation of the 'Dot-on' key or 'Dot-off' key.

When the 'Dot-on' key is operated, the program goes to step 961 at which the CPU 521 displays a dot with the cursor B41 placed thereon positively (in the background color) on the liquid-crystal display 535, and changes a logic level of the dot in the working pattern buffer 523b to that of a foreign character structure. When the 'Dot-off' key is operated, the program also goes to step 961 at which the CPU 521 displays a dot with the cursor B41 placed thereon negatively or inversely on the liquid-crystal display 535, and changes a logic level of the dot in the working pattern buffer 523b to that of a background section. After execution of step 961, the program goes to step 958 to determine operation of the 'Foreign Character Mode Cancel' key.

When the 'Mode Cancel' key is operated, the program goes to step 962 at which the CPU 521 is restored to the original state before selection of the foreign character mode.

When the 'End' key is operated, the program goes to step 963 at which generation of dot patterns is completed for all sizes. When it is not completed, the program returns to step 954 to input a dot pattern of another size.

When the dot patterns have been generated for all the sizes, the program goes to step 964 at which the CPU 521 shows a display of 'In Registration', reverse the logic level (bit value) of all the dots in the dot patterns for all the sizes stored in the working pattern buffer 523b, and transfer the inverted dot patterns to a section corresponding to the selected foreign character identification number in the foreign character registration area 523a. After completion of the dot pattern transfer, the CPU 521 is restored to the original state before selection of the foreign character mode at step 965.

In this manner, while checking the working dot pattern inversely displayed, the user generates and registers a dot pattern of a foreign character through operation of the cursor keys, the 'Dot-on' key, the 'Dot-off' key, and 'End' key.

The working dot pattern is inversely displayed during generation of a foreign character dot pattern. This allows the user to generate a foreign character dot pattern well balanced with dot patterns of characters and symbols originally prepared in the CG-ROM 524.

Figure 79A:
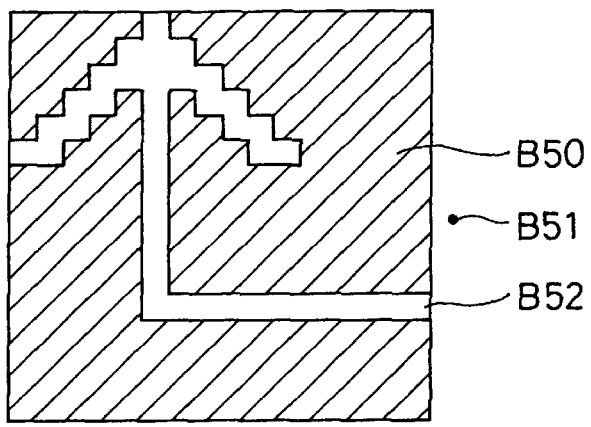
FIGS. 79A and 79B show comparison between foreign characters generated by the method of the fifth embodiment and a conventional method.
Figure 79B:
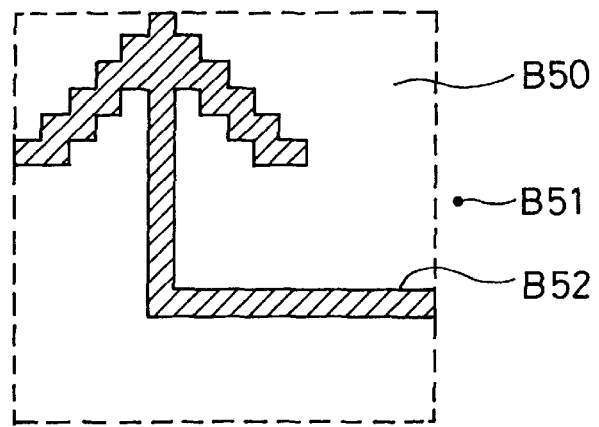

FIGS. 79A and 79B show comparison of foreign characters generated by the method of the embodiment and a conventional method.

When a foreign character is generated in a predetermined input area by the conventional method, a background section B50 in a foreign character dot pattern is displayed in a color the same as that of a background B51 out of the predetermined input area on the liquid-crystal display 535 as shown in FIG. 79B. Under such a condition, the user tends to create the foreign character larger than original characters.

When a foreign character is generated in a predetermined input area by the method of the embodiment, on the other hand, a foreign character structure B52 in a foreign character dot pattern is displayed in a color the same as that of a background B51 out of the predetermined input area on the liquid-crystal display 535 as shown in FIG. 79A. Under such a condition, the user easily recognizes the size of the foreign character dot pattern and creates the foreign character well balanced with the original characters.

In the structure of the embodiment, the working dot pattern, that is, the predetermined input area for creating a foreign character dot pattern, is inversely displayed. The inverse display distinctly defines the input area and makes a frame conventionally required for defining the input area unnecessary, thus preventing the user from confusing the frame with part of a foreign character and allowing generation of a foreign character dot pattern well balanced with other characters. The frame naturally requires a certain number of dots for display and undesirably reduces the number of dots used for displaying the working dot pattern. The method of this embodiment does not require dots for frame display and increases the dots usable for displaying the dot pattern. Most working dot patterns can accordingly be displayed in one screen even when a liquid-crystal display having a small display area is used as in the embodiment. For example, when a 32-dot liquid-crystal display is used, two screens are required for generating a 32×32 or 48×48 dot pattern in the conventional display method with a frame. In the display without the frame according to the embodiment, only a 48×48 dot pattern requires two screens.

In this embodiment, when the foreign character dot pattern stored in the working pattern buffer 523b is transferred to and stored into the foreign character registration area 523a, the logic level of each dot is reversed to meet definition of bit levels in dot patterns of characters originally stored in the CG-ROM 524 (for example, the logic level '1' for character structures and the logic level '0' for background sections). Another method may, however, be applied to coordinate the foreign character dot pattern with those of other characters. For example, the logic level in the working pattern buffer 523b is kept non-inverted while the working dot pattern is inversely displayed. In another example, the dot pattern with the inverted logic level is stored in the foreign character registration area 523a and is reversed when the pattern is read out of the foreign character registration area 523a for printing.

The essential features of the invention may be applicable to other character information processing apparatuses other than tape printing devices of the embodiments. The display unit may include, in place of the liquid-crystal display, any other flat display or CRT having an inverse display function.

There may be many other changes, modifications, and alterations without departing from the scope or spirit of essential characteristics of the invention, and it is thereby clearly understood that the above embodiments are only illustrative and not restrictive in any sense. The spirit and scope of the present invention is only limited by the terms of the appended claims.

What is claimed is:

1. A tape printing device for printing data on a tape, said tape printing device comprising:
   input means for inputting data;
   attribute specification means for specifying attribute information of said input data;

data display means for displaying said input data on a main display unit along a longitudinal direction of said main display unit;

attribute display means for displaying said attribute information on an auxiliary display unit disposed proximate to said main display unit; and print means for printing said input data on said tape in a shape specified by said attribute information.

2. The tape printing device in accordance with claim 1 wherein, said auxiliary display unit comprises a plurality of indicators, said indicators display a plurality of attributes included in said attribute information.

3. The tape printing device in accordance with claim 2 wherein, said main display unit is formed in the shape of a rectangle, and said indicators are arranged along a long side of said main display unit.

4. The tape printing device in accordance with claim 2 wherein, said tape printing device comprising a display area which is placed in a vicinity of said main display unit, and has words representing said respective attributes shown by said respective indicators printed thereon in such a way that the words correspond to said respective indicators.

5. The tape printing device in accordance with claim 2 wherein, said indicator indicates printing size of said input data as one of said attributes.

6. The tape printing device in accordance with claim 2 wherein, said indicator indicates printing style of said input data as one of said attributes.

7. The tape printing device in accordance with claim 2 wherein, said indicator indicates mode of said input data as one of said attributes.

8. The tape printing device in accordance with claim 2 wherein, said indicator indicates printing format of said input data as one of said attributes.

9. A tape printing device for printing data on a tape comprising:

an input device configured to input data;

an attribute specification mechanism adapted to specify attribute information of said input data;

a main display unit configured to display said input data along a longitudinal direction thereof;

an attribute display device configured to display said attribute information on an auxiliary display unit disposed proximate to said main display unit; and a printing device adapted to print said input data on said tape in a shape specified by said attribute information.

10. The tape printing device in accordance with claim 7 wherein, said auxiliary display unit includes a plurality of indicators which display a plurality of attributes included in said attribute information.

11. The tape printing device in accordance with claim 10 wherein, said main display unit is rectangular-shaped, and said indicators are disposed along one side of said main display unit.

12. The tape printing device in accordance with claim 10 wherein, said tape printing device includes a display area which is oriented in a vicinity of said main display unit, and includes characters representing said respective attributes shown by said respective indicators printed thereon in such that the characters correspond to said respective indicators.

13. The tape printing device in accordance with claim 10 wherein, said indicator indicates printing size of said input data as one of said attributes.

14. A method for printing data on a tape from a tape printing device comprising the steps of:

inputting data into the tape printing device;

specifying attribute information of the input data;

displaying the input data on a main display unit of the tape printing device along a longitudinal direction of said main display unit;

displaying said attribute information on an auxiliary display unit of the tape printing device positioned proximate to said main display unit; and printing said input data on the tape in a shape specified by said attribute information.

* * * * *